United States Patent
Galitsky

(10) Patent No.: US 10,949,623 B2
(45) Date of Patent: Mar. 16, 2021

(54) USING COMMUNICATIVE DISCOURSE TREES TO DETECT A REQUEST FOR AN EXPLANATION

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 123 days.

(21) Appl. No.: 16/260,930

(22) Filed: Jan. 29, 2019

(65) Prior Publication Data
US 2019/0236134 A1    Aug. 1, 2019

Related U.S. Application Data

(60) Provisional application No. 62/646,711, filed on Mar. 22, 2018, provisional application No. 62/624,001, filed on Jan. 30, 2018.

(51) Int. Cl.
| | |
|---|---|
| G06F 40/35 | (2020.01) |
| G06F 16/35 | (2019.01) |
| G06N 20/10 | (2019.01) |
| G06F 40/131 | (2020.01) |

(52) U.S. Cl.
CPC .............. G06F 40/35 (2020.01); G06F 16/35 (2019.01); G06F 40/131 (2020.01); G06N 20/10 (2019.01)

(58) Field of Classification Search
None
See application file for complete search history.

(56) References Cited

U.S. PATENT DOCUMENTS

| | | |
|---|---|---|
| 5,495,605 A | 2/1996 | Cadot |
| 6,112,168 A | 8/2000 | Corston et al. |
| 6,181,909 B1 | 1/2001 | Burstein et al. |
| 6,731,307 B1 | 5/2004 | Strubbe et al. |
| 7,152,031 B1 | 12/2006 | Jensen et al. |
| 7,519,529 B1 | 4/2009 | Horvitz |

(Continued)

FOREIGN PATENT DOCUMENTS

WO    2015089822    6/2015

OTHER PUBLICATIONS

U.S. Appl. No. 15/975,683, "Non-Final Office Action", dated Mar. 19, 2020, 16 pages.

(Continued)

*Primary Examiner* — Stella L. Woo
(74) *Attorney, Agent, or Firm* — Kilpatrick Townsend & Stockton LLP

(57) ABSTRACT

Systems, devices, and methods of the present invention relate to detecting a request for explanation in text. In an example, a method creates a discourse tree from a subset of text. The discourse tree includes nodes, each nonterminal node representing a rhetorical relationship between two of the fragments and each terminal node of the nodes of the discourse tree is associated with one of the fragments. The method forms a communicative discourse tree from the discourse tree by matching each fragment that has a verb to a verb signature. The method further identifies that the subset of text comprises a request for an explanation by applying a classification model trained to detect a request for an explanation to the communicative discourse tree.

18 Claims, 28 Drawing Sheets

(56) References Cited

U.S. PATENT DOCUMENTS

| | | | |
|---|---|---|---|
| 7,840,556 | B1 | 11/2010 | Dayal et al. |
| 9,037,464 | B1 | 5/2015 | Mikolov et al. |
| 9,292,490 | B2 | 3/2016 | Kimelfeld et al. |
| 9,559,993 | B2 | 1/2017 | Palakovich et al. |
| 9,582,501 | B1 | 2/2017 | Salmon et al. |
| 10,019,716 | B1 | 7/2018 | Ainslie et al. |
| 10,599,885 | B2 | 3/2020 | Galitsky |
| 10,679,011 | B2* | 6/2020 | Galitsky ............... G06N 3/006 |
| 2001/0007987 | A1 | 7/2001 | Igata |
| 2002/0040292 | A1 | 4/2002 | Marcu |
| 2002/0046018 | A1 | 4/2002 | Marcu et al. |
| 2003/0138758 | A1 | 7/2003 | Burstein et al. |
| 2004/0044519 | A1 | 3/2004 | Polanyi et al. |
| 2004/0148170 | A1 | 7/2004 | Acero et al. |
| 2005/0086592 | A1 | 4/2005 | Polanyi et al. |
| 2007/0073533 | A1 | 3/2007 | Thione et al. |
| 2007/0136284 | A1 | 6/2007 | Cobb et al. |
| 2007/0192306 | A1 | 8/2007 | Papakonstantinou et al. |
| 2007/0294229 | A1 | 12/2007 | Au |
| 2008/0228467 | A1 | 9/2008 | Womack et al. |
| 2009/0100053 | A1 | 4/2009 | Boschee et al. |
| 2009/0248399 | A1 | 10/2009 | Au |
| 2010/0169359 | A1 | 7/2010 | Barrett et al. |
| 2011/0119049 | A1 | 5/2011 | Ylonen |
| 2011/0153673 | A1 | 6/2011 | Boschee et al. |
| 2013/0046757 | A1 | 2/2013 | Salvetti et al. |
| 2013/0204611 | A1 | 8/2013 | Tsuchida et al. |
| 2014/0040288 | A1 | 2/2014 | Galitsky |
| 2014/0122083 | A1 | 5/2014 | Xiaojiang |
| 2014/0136188 | A1 | 5/2014 | Wroczynski et al. |
| 2015/0039295 | A1 | 2/2015 | Soschen |
| 2015/0046492 | A1 | 2/2015 | Balachandran |
| 2015/0149461 | A1 | 5/2015 | Aguilar Lemarroy et al. |
| 2015/0161512 | A1 | 6/2015 | Byron et al. |
| 2016/0034457 | A1 | 2/2016 | Bradley et al. |
| 2016/0055240 | A1 | 2/2016 | Tur et al. |
| 2016/0085743 | A1 | 3/2016 | Haley |
| 2016/0086601 | A1 | 3/2016 | Chotimongkol et al. |
| 2016/0232152 | A1 | 8/2016 | Mahamood |
| 2016/0245779 | A1 | 8/2016 | Khalaj Amineh et al. |
| 2016/0246779 | A1 | 8/2016 | Ho et al. |
| 2016/0247068 | A1 | 8/2016 | Lin |
| 2017/0032053 | A1 | 2/2017 | LeTourneau |
| 2017/0116982 | A1 | 4/2017 | Gelfenbeyn et al. |
| 2017/0228368 | A1 | 8/2017 | Carter et al. |
| 2017/0286390 | A1 | 10/2017 | Yashpe et al. |
| 2018/0181648 | A1 | 6/2018 | Chen |
| 2018/0189385 | A1 | 7/2018 | Sun et al. |
| 2018/0314689 | A1 | 11/2018 | Wang et al. |
| 2018/0365228 | A1 | 12/2018 | Galitsky |
| 2019/0005027 | A1* | 1/2019 | He ..................... G06F 40/40 |
| 2019/0057157 | A1* | 2/2019 | Mandal ............. G06F 16/3329 |
| 2019/0103111 | A1* | 4/2019 | Tiwari ............... G06F 16/3334 |

OTHER PUBLICATIONS

U.S. Appl. No. 15/975,685, "Non-Final Office Action", dated Apr. 1, 2020, 23 pages.

U.S. Appl. No. 16/010,091, "Notice of Allowance", dated Mar. 19, 2020, 13 pages.

U.S. Appl. No. 16/145,702, "Final Office Action", dated May 6, 2020, 19 pages.

U.S. Appl. No. 16/145,777, "Non-Final Office Action", dated Apr. 3, 2020, 18 pages.

U.S. Appl. No. 16/260,939, "Non-Final Office Action", dated May 1, 2020, 10 pages.

Galitsky et al., "Finding Maximal Common Sub-Parse Thickets for Multi-Sentence Search", Graph Structures for Knowledge Representation and Reasoning, 2014, 19 pages.

Galitsky et al., "Text Classification Based on Deep Textual Parsing", Available Online at: http://ceur-ws.org/Vol-1886/paper_8.pdf, 2011, 9 pages.

Hara et al., "Exploring Difficulties in Parsing Imperatives and Questions", Proceedings of the 5th International Joint Conference on Natural Language Processing, Nov. 8-13, 2011, pp. 749-757.

Johnson et al., "The FrameNet Tagset for Frame-Semantic and Syntactic Coding of Predicate-Argument Structure", Proceedings of the First Meeting of the North American Chapter of the Association for Computational. Linguistics, Apr. 2000, pp. 56-62.

International Application No. PCT/US2018/053392, "International Preliminary Report on Patentability", dated Apr. 9, 2020, 7 pages.

2009 Annual Study: Global Cost of a Data Breach, Ponemon Institute, LLC, PGP, Apr. 2010, 36 pages.

Data Loss Prevention, Trend Micro, Available online at: http://www.trendmicro.co.in/cloud-content/us/pdfs/business/datasheets/ds_data-loss-prevention.pdf, 2010, 2 pages.

Data Loss Prevention & Protection, Symantec, Available online at: http://www.symantec.com/business/theme.jsp?themeid=vontu, Accessed from Internet on Aug. 30, 2018, 6 pages.

Exploring Dialog Management for Bots, Chatbots Magazine, Available online at: https://chatbotsmagazine.com/exploring-dialog-management-for-bots-cbb8665a2fd3, Jul. 11, 2016, 7 pages.

Global Security Report 2010, Trustwave, Available online at: https://www.trustwave.com/Resources/Library/Documents/2010-Trustwave-Global-Security-Report/, 2010, 49 pages.

Ignore, Deny, Downplay: Accounts of Syrians from Douma Have No Place in Western Narrative, Russia Today, Available online at: https://www.rt.com/news/425438-douma-witnesses-gas-attack-syria/, Apr. 28, 2018, pp. 1-8.

Malaysia Airlines Flight 17, Wikipedia, 2016, pp. 1-38.

Shadow Chairman of Investigative Committee, Crime Russia, Available online at: https://crimerussia.com/corruption/tenovoy-direktor-skr/, Aug. 25, 2016, 5 pages.

Welcome to Apache Lucene, Apache Lucene 7.5.0 and Apache Solr 7.5.0, Available online at: www.lucene.apache.org, Sep. 24, 2018, 38 pages.

U.S. Appl. No. 16/145,702, Final Office Action dated Sep. 10, 2019, 25 pages.

U.S. Appl. No. 16/145,702, First Action Interview Office Action Summary dated Apr. 29, 2019, 8 pages.

U.S. Appl. No. 16/145,702, First Action Interview Pilot Program Pre-Interview Communication dated Feb. 7, 2019, 6 pages.

Airenti et al., Conversation and Behavior Games in the Pragmatics of Dialogue, Cognitive Science, vol. 17, No. 2, Apr.-Jun. 1993, pp. 197-256.

Allen et al., Analyzing Intention in Utterances, Artificial Intelligence, vol. 15, No. 3, Dec. 1980, pp. 143-178.

Arras et al., What is Relevant in a Text Document?: An Interpretable Machine Learning Approach, PLOS ONE, Available online at: https://journals.plos.org/plosone/article/file?id=10.1371/journal.pone.0181142&type=printable, Aug. 11, 2017, 23 pages.

Bengio et al., A Neural Probabilistic Language Model, Journal of Machine Learning Research, vol. 3, Feb. 3, 2003, pp. 1137-1155.

Blaylock, Managing Communicative Intentions in Dialogue Using a Collaborative Problem-Solving Model, The University of Rochester, Computer Science Department, Technical Report 774, Apr. 2002, 56 pages.

Blaylock et al., Managing Communicative Intentions with Collaborative Problem Solving, Current and New Directions in Discourse and Dialogue, 2003, pp. 63-84.

Boyer et al., MJRTY-A Fast Majority Vote Algorithm, Chapter 5, Automated Reasoning, 1991, pp. 105-117.

Carlson et al., Discourse Tagging Reference Manual, Available online at: https://www.isi.edu/~marcu/discourse/tagging-ref-manual.pdf, Sep. 11, 2001, 87 pages.

Chali et al., Complex Question Answering: Unsupervised Learning Approaches and Experiments, Journal of Artificial Intelligence Research, vol. 35, May 2009, pp. 1-47.

Chen, Understanding Mental States in Natural Language, Proceedings of the 8th International Conference on Computational Semantics, Jan. 2009, pp. 61-72.

Cohen, Enron Email Dataset, Available online at: https://www.cs.cmu.edu/~enron/, Jul. 10, 2016, 1 page.

Cohen et al., Intention is Choice with Commitment, Artificial Intelligence, vol. 42, No. 2-3, Mar. 1990, pp. 213-261.

(56) References Cited

OTHER PUBLICATIONS

Collins et al., "New Ranking Algorithms for Parsing and Tagging: Kernels Over Discrete Structures, and The Voted Perceptron", Proceedings of the 40th Annual Meeting of the Association for Computational Linguistics (ACL), Philadelphia, Jul. 2002, pp. 263-270.
Cristea et al., Veins Theory: A Model of Global Discourse Cohesion and Coherence, Research Report TR98-Dept. of Computer Science, 1998, pp. 281-285.
Croft et al., Search Engines-Information Retrieval in Practice, Pearson Education, 2010, 542 pages.
De Boni, Using Logical Relevance for Question Answering, Journal of Applied Logic, vol. 5, No. 1, Mar. 2007, pp. 92-103.
De Mori et al., Spoken Language Understanding, IEEE Signal Processing Magazine, vol. 25, No. 3, May 2008, pp. 50-58.
Dijkstra, Programming Considered as a Human Activity, Proc. IFIP Congress, 1965, 7 pages.
Ebrahim, NPL Tutorial Using Python NLTK (Simple Examples), Available online at: https://dzone.com/articles/nlp-tutorial-using-python-nltk-simple-examples, Sep. 24, 2017, pp. 1-10.
Endres-Niggemeyer et al., Summarizing Text for Intelligent Communication, Dagstuhl Seminar Report 79, 1995, 36 pages.
Feng et al., A Linear-Time Bottom-Up Discourse Parser with Constraints and Post-Editing, Proceedings of the 52nd Annual Meeting of the Association for Computational Linguistics, Jun. 23-25, 2014, pp. 511-521.
Feng et al., Classifying Arguments by Scheme, Proceedings of the 49th Annual Meeting of the Association for Computational Linguistics, vol. 1, Jun. 19-24, 2011, pp. 987-996.
Feng et al., Distributional Footprints of Deceptive Product Reviews, Proceedings of the Sixth International AAAI Conference on Weblogs and Social Media, The AAAI Press, Jan. 2012, pp. 98-105.
Feng, RST-Style Discourse Parsing and Its Applications in Discourse Analysis, University of Toronto, Jun. 2015, 189 pages.
Feng et al., Syntactic Stylometry for Deception Detection, in ACL 12, Proceedings of the 50th Annual Meeting of the Association for Computational Linguistics, Jul. 8-14, 2012, pp. 171-175.
Ferraiolo et al., Role-Based Access Controls, Proceedings of the 15th NIST-NSA National Computer Security Conference, Oct. 13-16, 1992, pp. 554-563.
Finn, A Question Writing Algorithm, Journal of Reading Behavior, VII, vol. 4, 1975, pp. 341-367.
Fornaciari et al., Identifying Fake Amazon Reviews as Learning from Crowds, Proceedings of the 14th Conference of the European Chapter of the Association for Computational Linguistics, Apr. 26-30, 2014, pp. 279-287.
Galitsky et al., A Novel Approach for Classifying Customer Complaints Through Graphs Similarities in Argumentative Dialogues, Decision Support Systems, vol. 46, No. 3, Nov. 4, 2008, 28 pages.
Galitsky et al., Chatbot with a Discourse Structure-Driven Dialogue Management, Proceedings of the Software Demonstrations of the 15th Conference of the European Chapter of the Association for Computational Linguistics Available online at: https://pdfs.semanticscholar.org/439f/cbe14dbc84b694bae2ee42a914d743126d12.pdf, Apr. 2017, pp. 87-90.
Galitsky et al., Concept-Based Learning of Human Behavior for Customer Relationship Management, Information Sciences, vol. 181, No. 10, May 15, 2011, pp. 2016-2035.
Galitsky, Customers Retention Requires an Explainability Feature in Machine Learning Systems They Use, AAAI Spring Symposium Series, 2018, pp. 214-220.
Galitsky et al., Improving Text Retrieval Efficiency with Pattern Structures on Parse Thickets, Formal Concept Analysis Meets Information Retrieval, ECIR, 2013, 16 pages.
Galitsky et al., Improving Trust in Automation of Social Promotion, Association for the Advancement of Artificial Intelligence, 2014, pp. 28-35.
Galitsky et al., Inferring the Semantic Properties of Sentences by Mining Syntactic Parse Trees, Data & Knowledge Engineering, vols. 81-82, Nov.-Dec. 2012, 44 pages.
Galitsky et al., Learning Communicative Actions of Conflicting Human Agents, Journal of Experimental & Theoretical Artificial Intelligence, vol. 20, No. 4, Dec. 2008, pp. 277-317.
Galitsky, Learning Noisy Discourse Trees, Computational Linguistics and Intellectual Technologies, Proceedings of the International Conference "Dialogue 2017". Available online at: http://www.dialog-21.ru/media/3911/galitskyb.pdf, May 31-Jun. 3, 2017, 14 pages.
Galitsky, Learning Parse Structure of Paragraphs and its Applications in Search, Engineering Applications of Artificial Intelligence, vol. 32, Jun. 2014, pp. 160-184.
Galitsky, Machine Learning of Syntactic Parse Trees for Search and Classification of Text, Engineering Applications of Artificial Intelligence, vol. 26, No. 3, Mar. 2013, pp. 1072-1091.
Galitsky, Matching Parse Thickets for Open Domain Question Answering, Data & Knowledge Engineering, vol. 107, Dec. 9, 2016, pp. 24-50.
Galitsky et al., Matching Sets of Parse Trees for Answering Multi-Sentence Questions, Proceedings of Recent Advances in Natural Language Processing, Sep. 7-13, 2013, pp. 285-293.
Galitsky, Natural Language Question Answering System, Technique of Semantic Headers, Advanced Knowledge International, vol. 2, Apr. 2003, 333 pages.
Galitsky et al., On a Chat Bot Finding Answers with Optimal Rhetoric Representation, RANLP-Recent Advances in Natural Language Processing Meet Deep Learning, Nov. 10, 2017, pp. 253-259.
Galitsky et al., Parse Thicket Representations for Answering Multi-Sentence Search, International Conference on Conceptual Structures, 2013, 13 pages.
Galitsky et al., Rhetoric Map of an Answer to Compound Queries, Proceedings of the 53rd Annual Meeting of the 20 Association for Computational Linguistics and the 7th International Joint Conference of Natural Language Processing, Jul. 26-31, 2015, pp. 681-686.
Galitsky et al., Text Classification into Abstract Classes Based on Discourse Structure, Proceedings of Recent Advances in Natural Language Processing, Sep. 7-9, 2015, pp. 200-207.
Galitsky et al., Text Integrity Assessment: Sentiment Profile vs Rhetoric Structure, CICLing, Springer International Publishing, Apr. 14-20, 2015, pp. 126-139.
Galitsky, Using Extended Tree Kernels to Recognize Metalanguage in Text, Studies in Computational Intelligence, Feb. 2017, 26 pages.
Grefenstette et al., Multi-Step Regression Learning for Compositional Distributional Semantics, Proceedings of the 26 Tenth International Conference on Computational Semantics. Association for Computational Linguistics, Mar. 2013, 11 pages.
Grefenstette, Towards a Formal Distributional Semantics: Simulating Logical Calculi with Tensors, University of Oxford, Apr. 2013, 10 pages.
Grosz et al., Attention, Intentions, and the Structure of Discourse, Computational Linguistics, vol. 12, No. 3, Jul.-Sep. 1986, pp. 175-204.
Grosz et al., Discourse Analysis, in Understanding Spoken Language, Elsevier North-Holland, 1978, pp. 234-268.
Hai et al., Deceptive Review Spam Detection via Exploiting Task Relatedness and Unlabeled Data, Proceedings of the 2016 Conference on Empirical Methods in Natural Language Processing, Nov. 1-5, 2016, pp. 1817-1826.
Hart et al., Text Classification for Data Loss Prevention, Proceedings of the 11th International Conference on Privacy Enhancing Technologies, Hewlett-Packard Development Company, L.P., Jul. 27-29, 2011, 21 pages.
Haussler, Convolution Kernels on Discrete Structures UCSC-CRL-99-10, UCSB Technical Report, Jul. 8, 1999, 38 pages.
Hernault et al., A Sequential Model for Discourse Segmentation, Proceedings of the 11th International Conference on Computational Linguistics and Intelligent Text Processing, Mar. 21-27, 2010, pp. 315-326.
Houngbo et al., An Automated Method to Build a Corpus of Rhetorically-Classified Sentences in Biomedical Texts, Proceedings of the First Workshop on Argumentation Mining, Association for Computational Linguistics, Jun. 26, 2014, pp. 19-23.

(56) References Cited

OTHER PUBLICATIONS

Iruskieta et al., A Qualitative Comparison Method for Rhetorical Structures: Identifying Different Discourse Structures in Multilingual Corpora, Lang Resources & Evaluation, vol. 49, No. 2, May 8, 2014, 47 pages.
Jansen et al., Discourse Complements Lexical Semantics for Non-Factoid Answer Reranking, Proceedings of the 52nd Annual Meeting of the Association for Computational Linguistics, Jun. 23-25, 2014, pp. 977-986.
John et al., Estimating Continuous Distributions in Bayesian Classifiers, Proceedings of the Eleventh Conference on Uncertainty in Artificial Intelligence, 1995, pp. 338-345.
Joty et al., A Novel Discriminative Framework for Sentence-Level Discourse Analysis, Proceedings of the Joint Conference on Empirical Methods in Natural Language Processing and Computational Natural Language Learning, Jul. 12-14, 2012, pp. 904-915.
Joty et al., Codra: A Novel Discriminative Framework for Rhetorical Analysis, Computational Linguistics, vol. 41, No. 3, Mar. 18, 2015, pp. 385-435.
Joty et al., Combining Intra- and Multi-Sentential Rhetorical Parsing for Document-Level Discourse Analysis, 51st Annual Meeting of the Association for Computational Linguistics, Aug. 4-9, 2013, pp. 486-496.
Joty et al., Discriminative Reranking of Discourse Parses Using Tree Kernels, Proceedings of the 2014 Conference on Empirical Methods in Natural Language Processing, Oct. 25-29, 2014, pp. 2049-2060.
Jurafsky et al., Speech and Language Processing: An Introduction to Natural Language Processing, Computational Linguistics, and Speech Recognition, Pearson, Prentice Hall, 2000, pp. 719-761.
Kate et al., Learning to Transform Natural to Formal Languages, Proceedings of the 20th National Conference on Artificial Intelligence, Jul. 2005, pp. 1062-1068.
Kipper et al., A Large-Scale Classification of English Verbs, Language Resources and Evaluation, vol. 42, No. 1, Mar. 2008, pp. 21-40.
Kipper et al., VerbNet Overview, Extensions, Mappings and Applications, Proceedings of Human Language Technologies, Annual Conference of the North American Chapter of the Association for Computational Linguistics, Companion, Volume: Tutorial Abstracts, Jun. 2009, pp. 13-14.
Kirschner et al., Linking the Thoughts: Analysis of Argumentation Structures in Scientific Publications, Proceedings of the 2nd Workshop on Argumentation Mining, Jun. 4, 2015, pp. 1-11.
Klenner, A Model for Multi-Perspective Opinion Inferences, Proceedings of IJCAI Workshop Natural Language Meets Journalism, Jul. 9, 2016, pp. 6-11.
Kohavi, A Study of Cross-Validation and Bootstrap for Accuracy Estimation and Model Selection, International Joint Conference on Artificial Intelligence, Aug. 1995, pp. 1137-1143.
Kong et al., Improve Tree Kernel-Based Event Pronoun Resolution with Competitive Information, Proceedings of the Twenty-Second International Joint Conference on Artificial Intelligence, vol. 3, Jul. 16-22, 2011, pp. 1814-1819.
Kontos et al., Question Answering and Rhetoric Analysis of Biomedical Texts in the Aroma System, National and Kapodistrian University of Athens, Unpublished Manuscript, 2006, 6 pages.
Krakovna et al., Increasing the Interpretability of Recurrent Neural Networks Using Hidden Markov Models, ICML Workshop on Human Interpretability in Machine Learning, Sep. 30, 2016, pp. 46-50.
Lake et al., Human-Level Concept Learning Through Probabilistic Program Induction, Science, vol. 350, No. 6266, Dec. 11, 2015, pp. 1332-1338.
Lee et al., Deterministic Coreference Resolution Based on Entity-Centric, Precision-Ranked Rules, Computational Linguistics, vol. 39, No. 4, 2013, pp. 885-916.
Levinson, Presumptive Meanings: The Theory of Generalized Conversational Implicature, Cambridge, MA: The MIT Press, 2000, 10 pages.
Li et al., Recursive Deep Models for Discourse Parsing, Computer Science Department, Jan. 2014, 10 pages.
Lin et al., Recognizing Implicit Discourse Relations in the Penn Discourse Treebank, Proceedings of the Conference on Empirical Methods in Natural Language Processing, vol. 1, Aug. 6-7, 2009, pp. 343-351.
Litman et al., A Plan Recognition Model for Subdialogues in Conversations, Cognitive Science, vol. 11, No. 2, Apr. 1987, pp. 163-200.
Liu et al., Towards Better Analysis of Deep Convolutional Neural Networks, IEEE Transactions on Visualization and Computer Graphics, vol. 23, No. 1, May 2016, pp. 1-10.
Makhalova et al., Pattern Structures for News Clustering, Proceedings of the 4th International Conference on What can FCA do for Artificial Intelligence, vol. 1430, Jan. 2015, pp. 35-42.
Mann et al., Discourse Structures for Text Generation, Proceedings of the 10th International Conference on Computational Linguistics and 22nd annual meeting on Association for Computational Linguistics, Jul. 2-6, 1984, pp. 367-375.
Mann et al., Rhetorical Structure Theory and Text Analysis, University of Southern California, Nov. 1989, 66 pages.
Mann et al., Rhetorical Structure Theory: Towards a Functional Theory of Text Organization, Text-Interdisciplinary Journal for the Study of Discourse, vol. 8, No. 3, Jan. 1988, pp. 243-281.
Mercier et al., Why Do Humans Reason? Arguments for an Argumentative Theory, Behavioral and Brain Sciences, vol. 34, No. 2, Apr. 2011, pp. 57-111.
Mikolov et al., Distributed Representations of Words Phrases and their Compositionality, Advances on Neural Information Processing Systems, Oct. 2013, pp. 1-9.
Mitchell et al., Composition in Distributional Models of Semantics, Cognitive Science, vol. 34, No. 8, Mar. 25, 2010, pp. 1388-1429.
Mitocariu et al., Comparing Discourse Tree Structures, Computational Linguistics and Intelligent Text Processing: 14th International Conference, vol. 7816, Mar. 24-30, 2013, 11 pages.
Mochales et al., Argumentation Mining, Artificial Intelligence and Law, vol. 19, No. 1, Mar. 2011, pp. 1-22.
Mukherjee et al., Fake Review Detection: Classification and Analysis of Real and Pseudo Reviews, Technical Report, Department of Computer Science, 2013, 11 pages.
Mukherjee et al., What Yelp Fake Review Filter Might Be Doing?, Proceedings of the Seventh International AAAI Conference on Weblogs and Social Media, Jan. 2013, pp. 409-418.
Ott et al., Finding Deceptive Opinion Spam by Any Stretch of the Imagination, Proceedings of the 49th Annual Meeting of the Association for Computational Linguistics, vol. 1, Jun. 19-24, 2011, pp. 309-319.
Ott et al., Negative Deceptive Opinion Spam, Proceedings of the Conference of the North American Chapter of the Association for Computational Linguistics, Jun. 9-14, 2013, pp. 497-501.
International Application No. PCT/US2018/031890, International Search Report and Written Opinion dated Aug. 17, 2018, 12 pages.
International Application No. PCT/US2018/053392, International Search Report and Written Opinion dated Dec. 17, 2018, 11 pages.
International Application No. PCT/US2019/031580, International Search Report and Written Opinion dated Jul. 5, 2019, 12 pages.
Peldszus et al., From Argument Diagrams to Argumentation Mining in Texts: A Survey, International Journal of Cognitive Informatics and Natural Intelligence, vol. 7, No. 1, Jan. 2013, pp. 1-31.
Pendyala et al., Towards a Truthful World Wide Web from a Humanitarian Perspective, IEEE 2015 Global Humanitarian Technology Conference, Oct. 8-11, 2015, 7 pages.
Ponti, Machine Learning Techniques Applied to Dependency Parsing, University of Pavia, Available online at: https://vision.unipv.it/AI/AIRG/MachineLearningTechniquesAppliedToDependencyParsingRevised.pdf, Oct. 2015, 45 pages.
Popescu et al., Logic-Based Rhetorical Structuring for Natural Language Generation in Human-Computer Dialogue, Proceedings of the 10th International Conference on Text, Speech and Dialogue, Sep. 3-7, 2007, pp. 309-317.
Popescu-Belis, Dialogue Acts: One or More Dimensions?, ISSCO Working Paper No. 62, University of Geneva, Nov. 2005, 46 pages.

(56) References Cited

OTHER PUBLICATIONS

Radev, A Common Theory of Information Fusion from Multiple Text Sources Step One: Cross-document Structure, Proceedings of the 1st SIGDial Workshop on Discourse and Dialogue, vol. 10, Oct. 7-8, 2000, pp. 74-83.
Radev et al., Centroid-Based Summarization of Multiple Documents: Sentence Extraction, Utility-Based Evaluation, 60 and User Studies, Proceedings of the NAACL-ANLP Workshop on Automatic Summarization, vol. 4, 2000, 10 pages.
Rayana et al., Collective Opinion Spam Detection: Bridging Review Networks and Metadata, Proceedings of the 21st ACM SIGKDD International Conference on Knowledge Discovery and Data Mining, Aug. 11-14, 2015, 10 pages.
Recasens et al., The Life and Death of Discourse Entities: Identifying Singleton Mentions, Proceedings of NAACL-HLT, Jun. 9-14, 2013, pp. 627-633.
Reed et al., Language Resources for Studying Argument, Proceedings of the 6th Conference on Language Resources and Evaluation, LREC2008, ELRA, 2010, pp. 2613-2618.
Reichman, Getting Computers to Talk Like You and Me, Discourse Context, Focus and Semantics (An ATN Model), MIT Press, Jul. 1985, pp. 35-49.
Salton et al., On the Specification of Term Values in Automatic Indexing, Journal of Documentation, vol. 29, No. 4, Apr. 1973, pp. 351-372.
Salton et al., Term Weighting Approaches in Automatic Text Retrieval, Information Processing & Management, vol. 24, No. 5, Nov. 1987, 22 pages.
Sjoera, The Linguistics Behind Chat Bots, iCapps, Available online at: http://www.icapps.com/the-linguistics-behind-chatbots/, Feb. 22, 2017, 9 pages.
Sun et al., Exploiting Product Related Review Features for Fake Review Detection, Mathematical Problems in Engineering, vol. 2016, Article ID 4935792, Jul. 4, 2016, 7 pages.
Trstenjak et al., KNN with TF-IDF Based Framework for Text Categorization, Procedia Engineering, vol. 69, 24th DAAAM International Symposium on Intelligent Manufacturing and Automation, 2014, pp. 1356-1364.
Turek, Explainable Artificial Intelligence (XAI), Available online at: https://www.darpa.mil/program/explainable-artificial-intelligence, Accessed from Internet on Aug. 27, 2019, pp. 1-10.
Turner, A Model Explanation System: Latest Updates and Extensions, ICML Workshop on Human Interpretability in Machine Learning, Available online at: https://arxiv.org/pdf/1606.09517v1.pdf, Jun. 30, 2016, pp. 1-5.
Van Der Wees et al., Five Shades of Noise: Analyzing Machine Translation Errors in User-Generated Text, Proceedings of the ACL 2015 Workshop on Noisy User-generated Text, Jul. 31, 2015, pp. 28-37.
Van Dijk, Explorations in the Semantics and Pragmatics of Discourse, Text and Context, Longman Linguistics Library 1977, 274 pages.
Wang et al., Using Learning Analytics to Understand the Design of an Intelligent Language Tutor-Chatbot Lucy, International Journal of Advanced Computer Science and Applications, vol. 4, No. 11, Nov. 2013, pp. 124-131.
Wuchner et al., Data Loss Prevention Based on Data-Driven Usage Control, Proceedings of the IEEE 23rd International Symposium on Software Reliability Engineering, Nov. 27-30, 2012, pp. 151-160.
Yao et al., Online Deception Detection Refueled by Real World Data Collection, Proceedings of Recent Advances in Natural Language Processing, Jul. 28, 2017, 10 pages.
Zeilenga, Lightweight Directory Access Protocol (LDAP) Read Entry Controls, Standards Track, Network Working Group, IETF, RFC 4527, Jun. 2006, 8 pages.
Zhao et al., Facilitating Discourse Analysis with Interactive Visualization, IEEE Transactions on Visualization and Computer Graphics, vol. 18, No. 12, Dec. 2012, pp. 2639-2648.
U.S. Appl. No. 15/975,683, "Non-Final Office Action", dated Oct. 31, 2019, 27 pages.
U.S. Appl. No. 15/975,685, "Non-Final Office Action", dated Nov. 15, 2019, 23 pages.
U.S. Appl. No. 16/010,091, "Non-Final Office Action", dated Nov. 18, 2019, 26 pages.
U.S. Appl. No. 16/010,141, "Non-Final Office Action", dated Feb. 24, 2020, 12 pages.
U.S. Appl. No. 16/010,156, "Notice of Allowance", dated Feb. 6, 2020, 13 pages.
U.S. Appl. No. 16/010,156, "Notice of Allowance", dated Nov. 7, 2019, 13 pages.
U.S. Appl. No. 16/145,702, "Non-Final Office Action", dated Feb. 5, 2020, 30 pages.
Artooras et al., "Stanford NLP-VP vs NP", Stack Overflow Website, Available online at: https://stackoverflow.com/questions/35872324/stanford-nlp-vp-vs-np/35887762, Mar. 8-9, 2016, 2 pages.
Galitsky et al., "Style and Genre Classification by Means of Deep Textual Parsing", Computational Linguistics and Intellectual Technologies: Proceedings of the International Conference "Dialogue 2016", Jun. 2016, pp. 1-45.
Kittredge et al., "An Advanced English Grammar with Exercises", The Athenaeum Press, 1913.
Marcu et al., "An Unsupervised Approach to Recognizing Discourse Relations", Proceedings of the 40th Annual Meeting of the Association for Computational Linguistics (ACL), 2002, 8 pages.
Tai et al., "Improved Semantic Representations from Tree-Structured Long Short-Term Memory Networks", Available Online at: https://arxiv.org/pdf/1503.00075.pdf, May 30, 2015, 11 pages.
Galitsky, "Discovering Rhetorical Agreement between a Request and Response", Dialogue & Discourse, vol. 8, No. 2, Dec. 1, 2017, pp. 167-205.
International Application No. PCT/US2019/015696, International Preliminary Report on Patentability, dated Aug. 13, 2020, 8 pages.
International Application No. PCT/US2019/015696, International Search Report and Written Opinion, dated Apr. 23, 2019, 12 pages.
Santhosh et al., "Discourse Based Advancement on Question Answering System", International Journal on Soft Computing, Artificial Intelligence and Applications (IJSCAI), vol. 1, No. 2, Oct. 2012, 12 pages.
Scholman et al., "A Step-Wise Approach to Discourse Annotation: Towards a Reliable Categorization of Coherence 64 Relations", Categories of Coherence Relations in Discourse Annotation, Dialogue & Discourse, vol. 7, No. 2, Feb. 2016, 28 pages.
Searle, "Speech Acts: An Essay in the Philosophy of Language", Cambridge University Press, Jan. 1969, pp. 22-53.
Socher et al., "Learning Continuous Phrase Representations and Syntactic Parsing With Recursive Neural Networks", Proceedings of the NIPS Deep Learning and Unsupervised Feature Learning Workshop, Jan. 2010, 9 pages.
Sperber et al., "Relevance: Communication and Cognition", Blackwell, Oxford and Harvard University Press, Cambridge, MA, 1986, 331 pages.
Sun et al., "Exploring Syntactic Structural Features for Sub-Tree Alignment Using Bilingual Tree Kernels", Proceedings of the 48th Annual Meeting of the Association for Computational Linguistics, Jul. 2010, pp. 306-315.
Sun et al., "Tree Sequence Kernel for Natural Language", Proceedings of the Twenty-Fifth AAAI Conference on Artificial Intelligence, 2011, 6 pages.
Surdeanu et al., "Two Practical Rhetorical Structure Theory Parsers", Proceedings of the Conference of the North American Chapter of the Association for Computational Linguistics-Human Language Technologies, Jun. 5, 2015, pp. 1-5.
Traum et al., "Conversation Acts in Task-Oriented Spoken Dialogue", University of Rochester Computer Science, Computational Intelligence, vol. 8, No. 3, Aug. 1992, 31 pages.
Traum et al., "Discourse Obligations in Dialogue Processing", Proceedings of the 32nd Annual Meeting on Association for Computational Linguistics, Jun. 27-30, 1994, pp. 1-8.
Traum, "Rhetorical Relations, Action and Intentionality in Conversation", Proceedings ACL SIG Workshop on Intentionality and Structure in Discourse Relations, Jun. 1993, pp. 132-135.
Tsui, "English Conversation. Describing English Language", Oxford University Press, 1994, 37 pages.

(56) References Cited

OTHER PUBLICATIONS

Uliyar, "A Primer: Oracle Intelligent Bots", Powered by Artificial Intelligence, White Paper, Sep. 2017, 28 pages.
Vapnik, "The Nature of Statistical Learning Theory", Springer Science, 1995, 201 pages.
Walker et al., "Quantitative and Qualitative Evaluation of Darpa Communicator Spoken Dialogue Systems", Proceedings of the 39th Annual Meeting of the Association for Computational Linguistics, Jul. 6-11, 2001, pp. 515-522.
Wang et al., "Kernel Based Discourse Relation Recognition with Temporal Ordering Information", Proceedings of the 48th Annual Meeting of the Association for Computational Linguistics, Jul. 11-16, 2010, pp. 710-719.
Wu et al., "Enhancing Text Representation for Classification Tasks with Semantic Graph Structures", International Journal of Innovative Computing, Information and Control, vol. 7, No. 5 (B), May 2011, pp. 2689-2698.
Yessenalina et al., "Compositional Matrix-Space Models for Sentiment Analysis", Proceedings of the 2011 Conference on Empirical Methods in Natural Language Processing, Jul. 27-31, 2011, pp. 172-182.
Zanzotto et al., "Estimating Linear Models for Compositional Distributional Semantics", Proceedings of the 23rd International Conference on Computational Linguistics (COLING 2010), Aug. 23-27, 2010, pp. 1263-1271.
Zhang et al., "Semantic Role Labeling Using a Grammar-Driven Convolution Tree Kernel", IEEE Transactions on Audio Speech and Language Processing, vol. 16, No. 7, Sep. 2008, pp. 1315-1329.
Zhao et al., "Facilitating Discourse Analysis with Interactive Visualization", Institute of Electrical and Electronics Engineers Transactions on Visualization and Computer Graphics, vol. 18, No. 12, Dec. 2012, 10 pages.
U.S. Appl. No. 15/975,683, Notice of Allowance, dated Jun. 12, 2020, 17 pages.
U.S. Appl. No. 15/975,685, Notice of Allowance, dated Jul. 24, 2020, 17 pages.
U.S. Appl. No. 16/010,141, Final Office Action, dated Jul. 30, 2020, 14 pages.
U.S. Appl. No. 16/010,141, Notice of Allowance, dated Sep. 1, 2020, 9 pages.
U.S. Appl. No. 16/142,759, First Action Interview Pilot Program Pre-Interview Communication, dated Oct. 6, 2020, 6 pages.
U.S. Appl. No. 16/145,702, Notice of Allowance, dated Jul. 1, 2020, 11 pages.
U.S. Appl. No. 16/145,777, Notice of Allowance dated Jul. 15, 2020, 17 pages.
U.S. Appl. No. 16/260,939, Notice of Allowance, dated Jun. 12, 2020, 14 pages.
Aurora, "Freudian Metaphor and Surrealist Metalanguage in Michel Leiris' Failles: The Unconscious and the Sea", Litte Realite, vol. 13, 2001, 10 pages.
Collins et al., "Convolution Kernels for Natural Language", NIPS'01 Proceedings of the 14th International Conference on Neural Information Processing Systems: Natural and Synthetic, 2002, 8 pages.
Cumby et al., "On Kernel Methods for Relational Learning", Proceedings of the Twentieth International Conference on Machine Learning, 2003, pp. 107-114.
Galitsky et al., "Assessing Plausibility of Explanation and Meta-Explanation in Inter-Human Conflicts", A Special Issue on Semantic-based Information and Engineering Systems, Engineering Applications of Artificial Intelligence, vol. 24, No. 8, Dec. 2011, pp. 1472-1486.
Galitsky, "Transfer Learning of Syntactic Structures for Building Taxonomies for Search Engines", Engineering Applications of Artificial Intelligence, vol. 26, No. 10, Nov. 2013, pp. 2504-2515.
Kim et al., "Medevi: Retrieving Textual Evidence of Relations Between Biomedical Concepts from Medline", Bioinformatics, vol. 24, No. 11, Jun. 1, 2008, pp. 1410-1412.
Lee, "Genres, Registers, Text Types, Domain, and Styles: Clarifying the Concepts and Navigating a Path Through the BNC Jungle", Language Learning & Technology, vol. 5, No. 3, Sep. 2001, pp. 37-72.
Marcu, "From Discourse Structures to Text Summaries", Proceedings of the ACL Workshop on Intelligent Scalable Text Summarization, 1997, pp. 82-88.
Moschitti, "Efficient Convolution Kernels for Dependency and Constituent Syntactic Trees", European Conference on Machine Learning, Sep. 2006, pp. 318-329.
Plotkin, "A Note on Inductive Generalization", Machine Intelligence 5, Chapter 8, 1970, pp. 153-163.
Ricoeur, "The Rule of Metaphor: The Creation of Meaning in Language", University of Toronto Press, 1975, pp. 65-100.
Russell et al., "Principles of Metareasoning", Artificial Intelligence, 1991, pp. 400-411.

\* cited by examiner

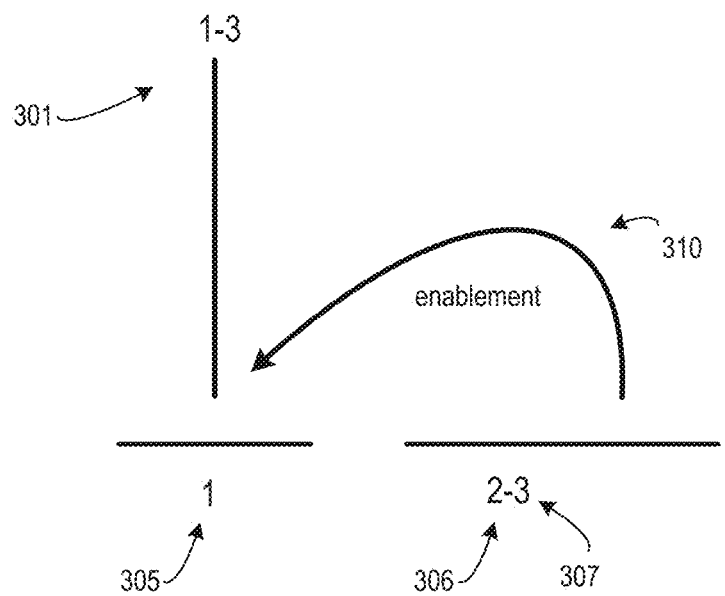
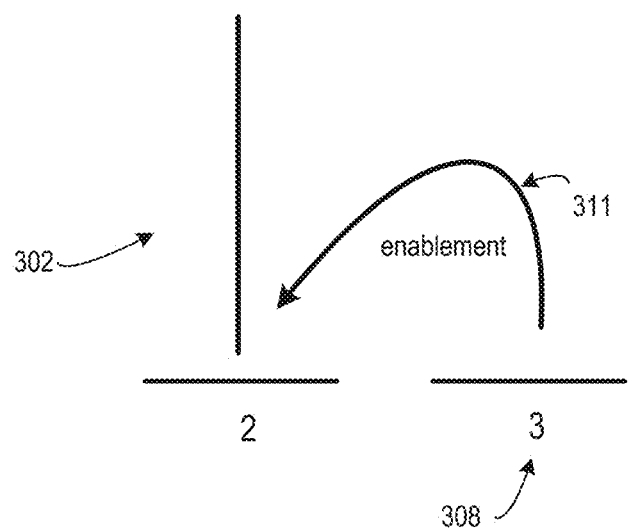
FIG. 3

```
(Elaboration[N][S]
  (Elaboration[N][S]
    (Attribution[S][N]
      "Teikon Corp. said"
      (Joint[N][N]
        "its vice president for manufacturing resigned"
        "and its Houston work force has been trimmed by 40 people, or about 15%.'))
    (Attribution[S][N]
      "The maker of hand-held computers and computer systems said"
      (Enablement[N][S]
        "the personnel changes were needed"
        "to improve the efficiency of its manufacturing operation.")))
  (Attribution[S][N]
    "The company said"
    (Elaboration[N][S]
      "it hasn't named a successor to Ronald Bufton, the vice president"
      (Attribution[S][N]
        "who resigned,"
        "its Houston work force now totals 230.'")))
```

USING COMMUNICATIVE DISCOURSE TREES TO DETECT A REQUEST FOR AN EXPLANATION

CROSS-REFERENCES TO RELATED APPLICATIONS

This application claims priority from provisional application 62/624,001, filed Jan. 30, 2018, and provisional application 62/646,711, filed Mar. 22, 2018, both of which are herein incorporated by reference in their entirety.

TECHNICAL FIELD

This disclosure is generally concerned with linguistics. More specifically, this disclosure relates to using communicative discourse trees to detect a request for an explanation.

STATEMENT AS TO RIGHTS TO INVENTIONS MADE UNDER FEDERALLY SPONSORED RESEARCH AND DEVELOPMENT

Not Applicable

BACKGROUND

Linguistics is the scientific study of language. One aspect of linguistics is the application of computer science to human natural languages such as English. Due to the greatly increased speed of processors and capacity of memory, computer applications of linguistics are on the rise. For example, computer-enabled analysis of language discourse facilitates numerous applications such as automated agents that can answer questions from users. The use of autonomous agents ("chatbots") to answer questions, facilitate discussion, manage dialogues, and provide social promotion is increasingly popular. To address this need, a broad range of technologies including compositional semantics has been developed. Such technologies can support automated agents in the case of simple, short queries and replies.

But current solutions for autonomus agents are unable to determine when an utterance received from a user device includes a request for an explanation. A request for an explanation can be helpful, for example, if an autonomus agent generates a response or takes a decision based on machine learning, which is often not transparent about how a particular decision was reached. When a response by an autonomous agent is unsatisfactory, an explanation may be necessary to help understand the reasoning behind a response or a decision, such as why the user was denied a loan.

Hence, new solutions are needed.

BRIEF SUMMARY

Generally, systems, devices, and methods of the present invention are related to communicative discourse trees. In an example, a method represents text as a communicative discourse tree and uses machine learning to determine whether the text includes a request for an explanation. Based on the text including a request for an explanation, the method can cause a suitable explanation to be generated and provided.

In an aspect, a method accesses text that includes fragments. The method creates a discourse tree from a subset of the text. The discourse tree includes nodes, each nonterminal node representing a rhetorical relationship between two of the fragments and each terminal node of the nodes of the discourse tree is associated with one of the fragments. The method forms a communicative discourse tree that represents the subset of text by matching each fragment that has a verb to a verb signature. The method identifies that the subset of the text includes a request for an explanation by applying a classification model trained to detect a request for an explanation to the communicative discourse tree.

In another aspect, the matching includes accessing verb signatures. Each verb signature includes the verb of the respective fragment and a sequence of thematic roles. Thematic roles describe a relationship between the verb and related words. The matching further includes determining, for each verb signature of the plurality of verb signatures, thematic roles of the signature that matches a role of a word in a respective fragment. The matching further includes selecting a particular verb signature from verb signatures based on the particular verb signature comprising a highest number of matches. The matching further includes associating the particular verb signature with the fragment.

In another aspect, each verb signature of the verb signatures includes one of (i) an adverb, (ii) a noun phrase, or (iii) a noun. Associating the particular verb signature with the fragment further includes identifying thematic role in the particular verb signature and matching, for each of thematic roles in the particular verb signature, a corresponding word in the fragment to the thematic role.

In another aspect, the classification model is a support vector machine with tree kernel learning or uses nearest neighbor learning of maximal common sub-trees.

In another aspect, applying the classification model to the subset of the text further includes determining similarities between the communicative discourse tree and one or more communicative discourse trees from a training set of communicative discourse trees. The applying further includes selecting an additional communicative discourse tree from the one or more communicative discourse trees based on the additional communicative discourse tree having a highest number of similarities with the communicative discourse tree. The applying further includes identifying whether the communicative discourse tree is from a positive set or a negative set by applying a classification model to the communicative discourse tree. The positive set includes communicative discourse trees representing text containing a request for an explanation and the negative set includes communicative discourse trees representing text without a request for an explanation. The applying further includes determining, based on the identifying, whether the text contains a request for an explanation.

In another aspect, accessing the text includes receiving text from a user device, the method further includes adjusting a response based on the determined request for explanation and providing the adjusted response to a user device.

In another aspect, applying the classification model to the subset of the text further includes determining similarities between the communicative discourse tree and one or more communicative discourse trees from a training set of communicative discourse trees.

Applying the classification model further includes selecting an additional communicative discourse tree from the one or more communicative discourse trees based on the additional communicative discourse tree having a highest number of similarities with the communicative discourse tree. Applying the classification model further includes identifying whether the additional communicative discourse tree is from a positive set or a negative set.

The positive set is associated with text containing a request for explanation and the negative set is associated with text not containing a request for explanation. Applying the classification model further includes determining, based on the identifying, whether the text contains a request for explanation.

In another aspect, a method of building a training dataset includes accessing text including fragments. The method includes creating a discourse tree from the text. The discourse tree includes nodes, each nonterminal node representing a rhetorical relationship between two of the fragments and each terminal node of the nodes of the discourse tree is associated with one of the fragments. The method further includes matching each fragment that has a verb to a verb signature, thereby creating a communicative discourse tree. The method further includes accessing a positive communicative discourse tree from a positive set and a negative communicative discourse tree from a negative set. The method further includes identifying whether the communicative discourse tree is from a positive set or a negative set by applying a classification model to the communicative discourse tree. The positive set includes communicative discourse trees representing text containing a request for an explanation and the negative set includes communicative discourse trees representing text without a request for an explanation. The method further includes adding the communicative discourse tree to either the positive training set or the negative training set based on the identifying.

In another aspect, a method trains a classification model by iteratively performing a set of steps. The steps include providing one of a set of training pairs to the classification model. Each training pair includes a communicative discourse tree and an expected strength of a request for an explanation. The steps further include receiving, from the classification model, a classification strength of a request for explanation. The steps further include calculating a loss function by calculating a difference between the expected strength and the classification strength. The steps further include adjusting internal parameters of the classification model to minimize the loss function.

The above methods can be implemented as tangible computer-readable media and/or operating within a computer processor and attached memory.

BRIEF DESCRIPTION OF THE DRAWINGS

FIG. 3 depicts a further example of a discourse tree in accordance with an aspect.

FIG. 6 depicts an exemplary indented text encoding of the representation in FIG. 5 in accordance with an aspect.

DETAILED DESCRIPTION

Figure 1:
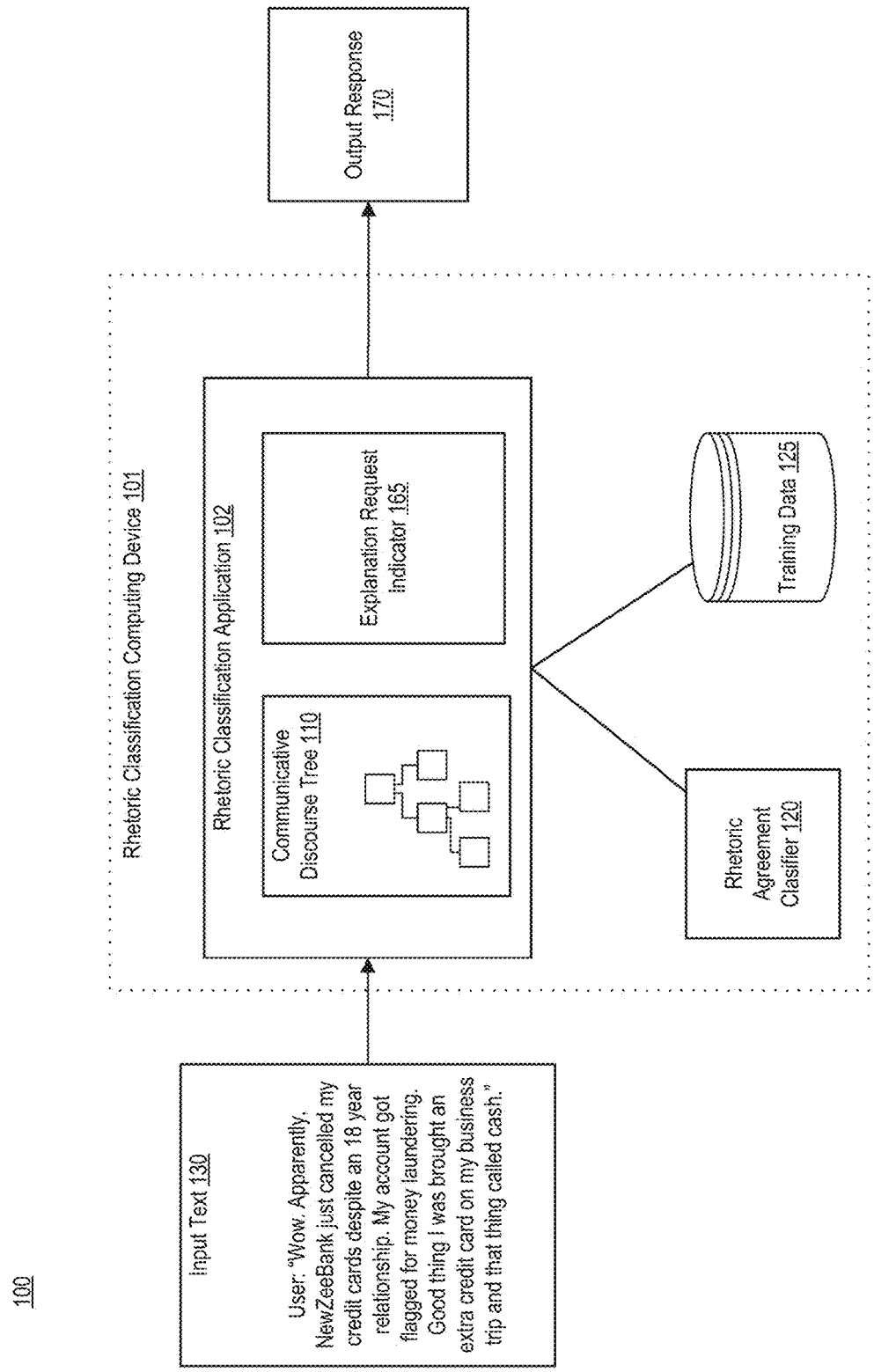
FIG. 1 shows an exemplary rhetoric classification environment in accordance with an aspect.

Aspects disclosed herein provide technical improvements to the area of computer-implemented linguistics. More specifically, aspects of the present disclosure use communicative discourse trees in conjunction with machine learning to determine a request for explanation in a particular argument detected in a body of text. Certain aspects can automatically classify whether query, such as a complaint, contains a request for explanation, whether implicit or explicit. An example of an implicit request for explanation is a set of negative comments or text about an experience. An example of an explicit request explanation is a question about why a certain decision was made that prompted the user to initiate a complaint.

Typically, when a user device connects to a customer support system, a user either has a question, complaint, or both. Many times the complaint will contain argumentation patterns because the user wants to bolster his or her claim when engaging in dialogue. The full text in the complaint may include a statement about a promise, a statement about how the promise was not kept, and a statement about the result to the customer or user. In some examples, the customer who sent the query is confused or in disagreement about a certain decision made and would either like the decision reversed or have the decision explained.

Certain aspects represent text as communicative discourse trees. "Communicative discourse trees" or "CDTs" include discourse trees that are supplemented with communicative actions. A communicative action is a cooperative action undertaken by individuals based on mutual deliberation and argumentation. Using communicative discourse trees, further aspects disclosed herein implement improved automated agents, or chatbots, that can answer questions and provide explanations. In particular, communicative discourse trees enable the identification of elaboration rhetoric relations, which can in part indicate a request for an explanation.

In an example, a rhetoric classification application executing on a computing device receives a question or text from a user. The rhetoric classification application generates a communicative discourse tree for the text. A communicative discourse tree is a discourse tree that includes communicative actions. Using a classification model, the rhetoric agreement application determines whether the input text includes a request for an explanation. The rhetoric agreement classifier can provide this indication to a system that can obtain a suitable answer for the user and provide the answer to the user, for example, via a display device.

For example, some aspects use communicative discourse trees to help isolate rhetorical features that indicate a request for explanation in sequences like the following: "A BigWidget device has a laser light feature. Really? According to Sam, the BigWidget has the laser light feature. I don't believe that Sam said that BigWidget has the laser light feature and Jane said that the BigWidget does not have the laser light feature. I don't believe either. It does not work like this. (rhetorical relation of Contrast and Cause). Why would the BigWidget have laser light? Is laser light possible? Please clarify. I don't understand why BigWidget does not have the laser light feature."

Continuing the example, a rhetoric classification application determines that the sentence "I don't believe that Sam said . . . " has the rhetorical relation of attribution and the sentences "I don't believe either" and "It does not work like this" have the rhetorical relations of contrast and cause. Further, rhetoric classification application 102 can determine that the sentence "I don't understand why BigWidget . . . " has a particular mental state. All these features can be provided into a classification model to determine whether text contains a request for explanation (as in this case).

Certain Definitions

As used herein, "rhetorical structure theory" is an area of research and study that provided a theoretical basis upon which the coherence of a discourse could be analyzed.

As used herein, "discourse tree" or "DT" refers to a structure that represents the rhetorical relations for a sentence of part of a sentence.

As used herein, a "rhetorical relation," "rhetorical relationship," or "coherence relation" or "discourse relation" refers to how two segments of discourse are logically connected to one another. Examples of rhetorical relations include elaboration, contrast, and attribution.

As used herein, a "sentence fragment," or "fragment" is a part of a sentence that can be divided from the rest of the sentence. A fragment is an elementary discourse unit. For example, for the sentence "Dutch accident investigators say that evidence points to pro-Russian rebels as being responsible for shooting down the plane," two fragments are "Dutch accident investigators say that evidence points to pro-Russian rebels" and "as being responsible for shooting down the plane." A fragment can, but need not, include a verb.

As used herein, "signature" or "frame" refers to a property of a verb in a fragment. Each signature can include one or more thematic roles. For example, for the fragment "Dutch accident investigators say that evidence points to pro-Russian rebels," the verb is "say" and the signature of this particular use of the verb "say" could be "agent verb topic" where "investigators" is the agent and "evidence" is the topic.

As used herein, "thematic role" refers to components of a signature used to describe a role of one or more words. Continuing the previous example, "agent" and "topic" are thematic roles.

As used herein, "nuclearity" refers to which text segment, fragment, or span, is more central to a writer's purpose. The nucleus is the more central span, and the satellite is the less central one.

As used herein, "coherency" refers to the linking together of two rhetorical relations.

As used herein, "communicative verb" is a verb that indicates communication. For example, the verb "deny" is a communicative verb.

As used herein, "communicative action" describes an action performed by one or more agents and the subjects of the agents.

FIG. 1 shows an exemplary rhetoric classification environment in accordance with an aspect. FIG. 1 depicts input text 130, rhetoric classification computing device 101, and output response 170. Rhetoric classification computing device 101 includes one or more of rhetoric classification application 102, rhetoric agreement classifier 120, and training data 125. Rhetoric classification computing device 101 can determine a presence of a request for explanation in input text 130 and cause one or more actions to occur, such as a search for additional information, or the generation of an output response. An example of such a process is discussed further with respect to FIG. 23.

In an example, rhetoric classification application 102 analyzes a question received via chat. More specifically, rhetoric classification application 102 receives input text 130, which can be a single question or a stream of text. Input text 130 can be generated by any mobile device such as a mobile phone, smart phone, tablet, laptop, smart watch, and the like. A mobile device can communicate via a data network to rhetoric classification computing device 101.

A request for explanation can be implicit, e.g., as illustrated by user frustration as in the above case. For example, rhetoric classification application 102 accesses input text 130, which reads: "Wow. Apparently, NewZeeBank just cancelled my credit cards despite an 18 year relationship. My account got flagged for money laundering. Good thing I was brought an extra credit card on my business trip and that thing called cash."

In response, rhetoric classification application 102 creates a communicative discourse tree 110 from input text 130. An example of a process that can be used is described in FIG. 15. By representing input text 130 as communicative discourse tree 110, rhetoric classification application 102 recognizes rhetorical relations between fragments in input text 130 and associated communicative actions, as further described herein.

Rhetoric classification application 102 provides communicative discourse tree 110 to a trained classifier such as rhetoric agreement classifier 120. Rhetoric classification application 102 receives a prediction of whether a request for explanation is present from rhetoric agreement classifier 120. In an example, rhetoric agreement classifier 120 compares communicative discourse tree 110 with communicative discourse trees provided by training data 125. Training data 125 includes a training set designated as positive (including requests for an explanation) or negative (without requests for an explanation). An exemplary process for generating training data is discussed with respect to FIG. 24 and an exemplary process for training rhetoric agreement classifier 120 is discussed with respect to FIG. 25.

In turn, rhetoric classification application 102 provides the prediction as explanation request indicator 165. Based on explanation request indicator 165, rhetoric classification application 102 can prepare an explanation, cause an explanation to be prepared, or provide the explanation as output response 170.

Rhetoric Structure Theory and Discourse Trees

Linguistics is the scientific study of language. For example, linguistics can include the structure of a sentence (syntax), e.g., subject-verb-object, the meaning of a sentence (semantics), e.g. dog bites man vs. man bites dog, and what speakers do in conversation, i.e., discourse analysis or the analysis of language beyond the sentence.

The theoretical underpinnings of discourse, Rhetoric Structure Theory (RST), can be attributed to Mann, William and Thompson, Sandra, "Rhetorical structure theory: A Theory of Text organization," Text-Interdisciplinary Journal for the Study of Discourse, 8(3):243-281, 1988. Similar to how the syntax and semantics of programming language theory helped enable modern software compilers, RST helped enabled the analysis of discourse. More specifically RST posits structural blocks on at least two levels, a first level such as nuclearity and rhetorical relations, and a second level of structures or schemas. Discourse parsers or other computer software can parse text into a discourse tree.

Rhetoric Structure Theory models logical organization of text, a structure employed by a writer, relying on relations between parts of text. RST simulates text coherence by forming a hierarchical, connected structure of texts via discourse trees. Rhetoric relations are split into the classes of coordinate and subordinate; these relations hold across two or more text spans and therefore implement coherence. These text spans are called elementary discourse units (EDUs). Clauses in a sentence and sentences in a text are logically connected by the author. The meaning of a given sentence is related to that of the previous and the following sentences. This logical relation between clauses is called the coherence structure of the text. RST is one of the most popular theories of discourse, being based on a tree-like discourse structure, discourse trees (DTs). The leaves of a DT correspond to EDUs, the contiguous atomic text spans. Adjacent EDUs are connected by coherence relations (e.g., Attribution, Sequence), forming higher-level discourse units. These units are then also subject to this relation linking. EDUs linked by a relation are then differentiated based on their relative importance: nuclei are the core parts of the relation, while satellites are peripheral ones. As discussed, in order to determine accurate request-response pairs, both topic and rhetorical agreement are analyzed. When a speaker answers a question, such as a phrase or a sentence, the speaker's answer should address the topic of this question. In the case of an implicit formulation of a question, via a seed text of a message, an appropriate answer is expected not only maintain a topic, but also match the generalized epistemic state of this seed.

Rhetoric Relations

As discussed, aspects described herein use communicative discourse trees. Rhetorical relations can be described in different ways. For example, Mann and Thompson describe twenty-three possible relations. C. Mann, William & Thompson, Sandra. (1987) ("Mann and Thompson"). Rhetorical Structure Theory: A Theory of Text Organization. Other numbers of relations are possible.

| Relation Name | Nucleus | Satellite |
| --- | --- | --- |
| Antithesis | ideas favored by the author | ideas disfavored by the author |
| Background | text whose understanding is being facilitated | text for facilitating understanding |
| Circumstance | text expressing the events or ideas occurring in the interpretive context | an interpretive context of situation or time |
| Concession | situation affirmed by author | situation which is apparently inconsistent but also affirmed by author |
| Condition | action or situation whose occurrence results from the occurrence of the conditioning situation | conditioning situation |
| Elaboration | basic information | additional information |
| Enablement | an action | information intended to aid the reader in performing an action |
| Evaluation | a situation | an evaluative comment about the situation |
| Evidence | a claim | information intended to increase the reader's belief in the claim |
| Interpretation | a situation | an interpretation of the situation |
| Justify | text | information supporting the writer's right to express the text |
| Motivation | an action | information intended to increase the reader's desire to perform the action |
| Non-volitional Cause | a situation | another situation which causes that one, but not by anyone's deliberate action |
| Non-volitional Result | a situation | another situation which is caused by that one, but not by anyone's deliberate action |
| Otherwise (anti conditional) | action or situation whose occurrence results from the lack of occurrence of the conditioning situation | conditioning situation |
| Purpose | an intended situation | the intent behind the situation |
| Restatement | a situation | a reexpression of the situation |
| Solutionhood | a situation or method supporting full or partial satisfaction of the need | a question, request, problem, or other expressed need |
| Summary | text | a short summary of that text |
| Volitional Cause | a situation | another situation which causes that one, by someone's deliberate action |
| Volitional Result | a situation | another situation which is caused by that one, by someone's deliberate action |

Some empirical studies postulate that the majority of text is structured using nucleus-satellite relations. See Mann and Thompson. But other relations do not carry a definite selection of a nucleus. Examples of such relations are shown below.

| Relation Name | Span | Other Span |
|---|---|---|
| Contrast | One alternate (unconstrained) | The other alternate (unconstrained) |
| Joint | (unconstrained) | (unconstrained) |
| List | An item | A next item |
| Sequence | An item | A next item |

Figure 2:
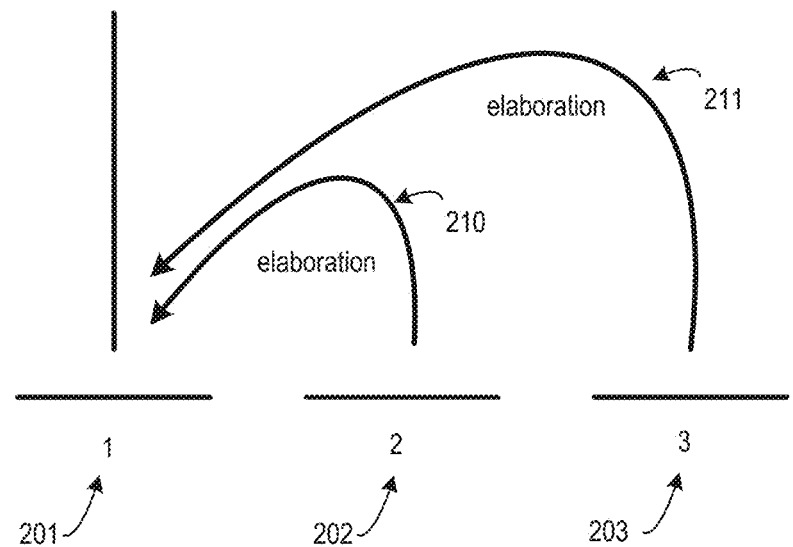
FIG. 2 depicts an example of a discourse tree in accordance with an aspect.

FIG. 2 depicts an example of a discourse tree in accordance with an aspect. FIG. 2 includes discourse tree 200. Discourse tree includes text span 201, text span 202, text span 203, relation 210 and relation 238. The numbers in FIG. 2 correspond to the three text spans. FIG. 3 corresponds to the following example text with three text spans numbered 1, 2, 3:

1. Honolulu, Hi. will be site of the 2017 Conference on Hawaiian History
2. It is expected that 200 historians from the U.S. and Asia will attend
3. The conference will be concerned with how the Polynesians sailed to Hawaii For example, relation 210, or elaboration, describes the relationship between text span 201 and text span 202. Relation 238 depicts the relationship, elaboration, between text span 203 and 204. As depicted, text spans 202 and 203 elaborate further on text span 201. In the above example, given a goal of notifying readers of a conference, text span 1 is the nucleus. Text spans 2 and 3 provide more detail about the conference. In FIG. 2, a horizontal number, e.g., 1-3, 1, 2, 3 covers a span of text (possibly made up of further spans); a vertical line signals the nucleus or nuclei; and a curve represents a rhetoric relation (elaboration) and the direction of the arrow points from the satellite to the nucleus. If the text span only functions as a satellite and not as a nuclei, then deleting the satellite would still leave a coherent text. If from FIG. 2 one deletes the nucleus, then text spans 2 and 3 are difficult to understand.

FIG. 3 depicts a further example of a discourse tree in accordance with an aspect. FIG. 3 includes components 301 and 302, text spans 305-307, relation 310 and relation 328. Relation 310 depicts the relationship, enablement, between components 306 and 305, and 307, and 305. FIG. 3 refers to the following text spans:

1. The new Tech Report abstracts are now in the journal area of the library near the abridged dictionary.
2. Please sign your name by any means that you would be interested in seeing.
3. Last day for sign-ups is 31 May.

As can be seen, relation 328 depicts the relationship between entity 307 and 306, which is enablement. FIG. 3 illustrates that while nuclei can be nested, there exists only one most nuclear text span.

Constructing a Discourse Tree

Discourse trees can be generated using different methods. A simple example of a method to construct a DT bottom up is:

(1) Divide the discourse text into units by:
  (a) Unit size may vary, depending on the goals of the analysis
  (b) Typically, units are clauses
(2) Examine each unit, and its neighbors. Is there a relation holding between them?
(3) If yes, then mark that relation.
(4) If not, the unit might be at the boundary of a higher-level relation. Look at relations holding between larger units (spans).
(5) Continue until all the units in the text are accounted for.

Figure 4:
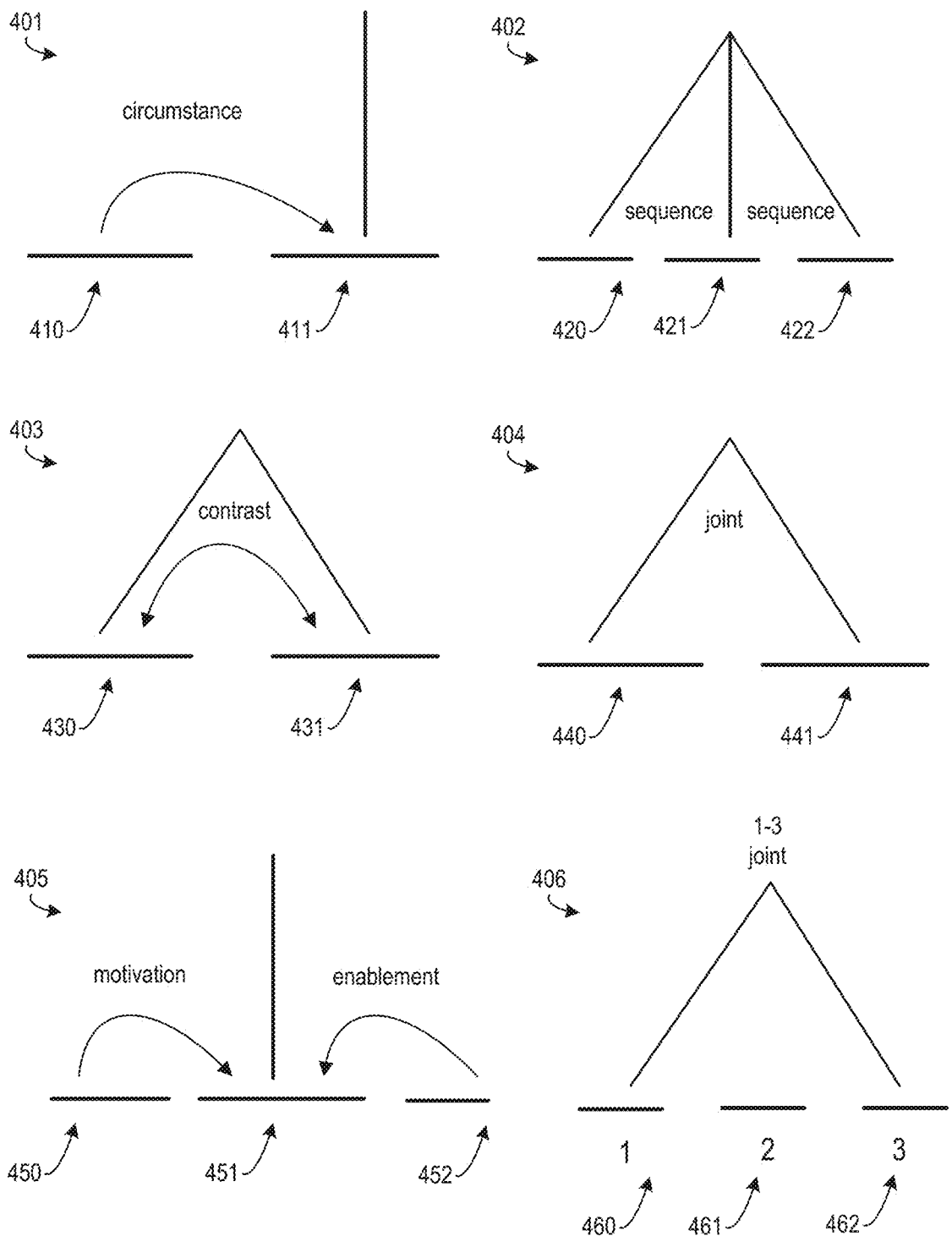
FIG. 4 depicts illustrative schemas in accordance with an aspect.

Mann and Thompson also describe the second level of building block structures called schemas applications. In RST, rhetoric relations are not mapped directly onto texts; they are fitted onto structures called schema applications, and these in turn are fitted to text. Schema applications are derived from simpler structures called schemas (as shown by FIG. 4). Each schema indicates how a particular unit of text is decomposed into other smaller text units. A rhetorical structure tree or DT is a hierarchical system of schema applications. A schema application links a number of consecutive text spans, and creates a complex text span, which can in turn be linked by a higher-level schema application. RST asserts that the structure of every coherent discourse can be described by a single rhetorical structure tree, whose top schema creates a span encompassing the whole discourse.

FIG. 4 depicts illustrative schemas in accordance with an aspect. FIG. 4 shows a joint schema is a list of items consisting of nuclei with no satellites. FIG. 4 depicts schemas 401-406. Schema 401 depicts a circumstance relation between text spans 410 and 428. Scheme 402 depicts a sequence relation between text spans 420 and 421 and a sequence relation between text spans 421 and 423. Schema 403 depicts a contrast relation between text spans 430 and 431. Schema 404 depicts a joint relationship between text spans 440 and 441. Schema 405 depicts a motivation relationship between 450 and 451, and an enablement relationship between 452 and 451. Schema 406 depicts joint relationship between text spans 460 and 462. An example of a joint scheme is shown in FIG. 4 for the three text spans below:

1. Skies will be partly sunny in the New York metropolitan area today.
2. It will be more humid, with temperatures in the middle 80's.
3. Tonight will be mostly cloudy, with the low temperature between 65 and 70.

While FIGS. 2-4 depict some graphical representations of a discourse tree, other representations are possible.

Figure 5:
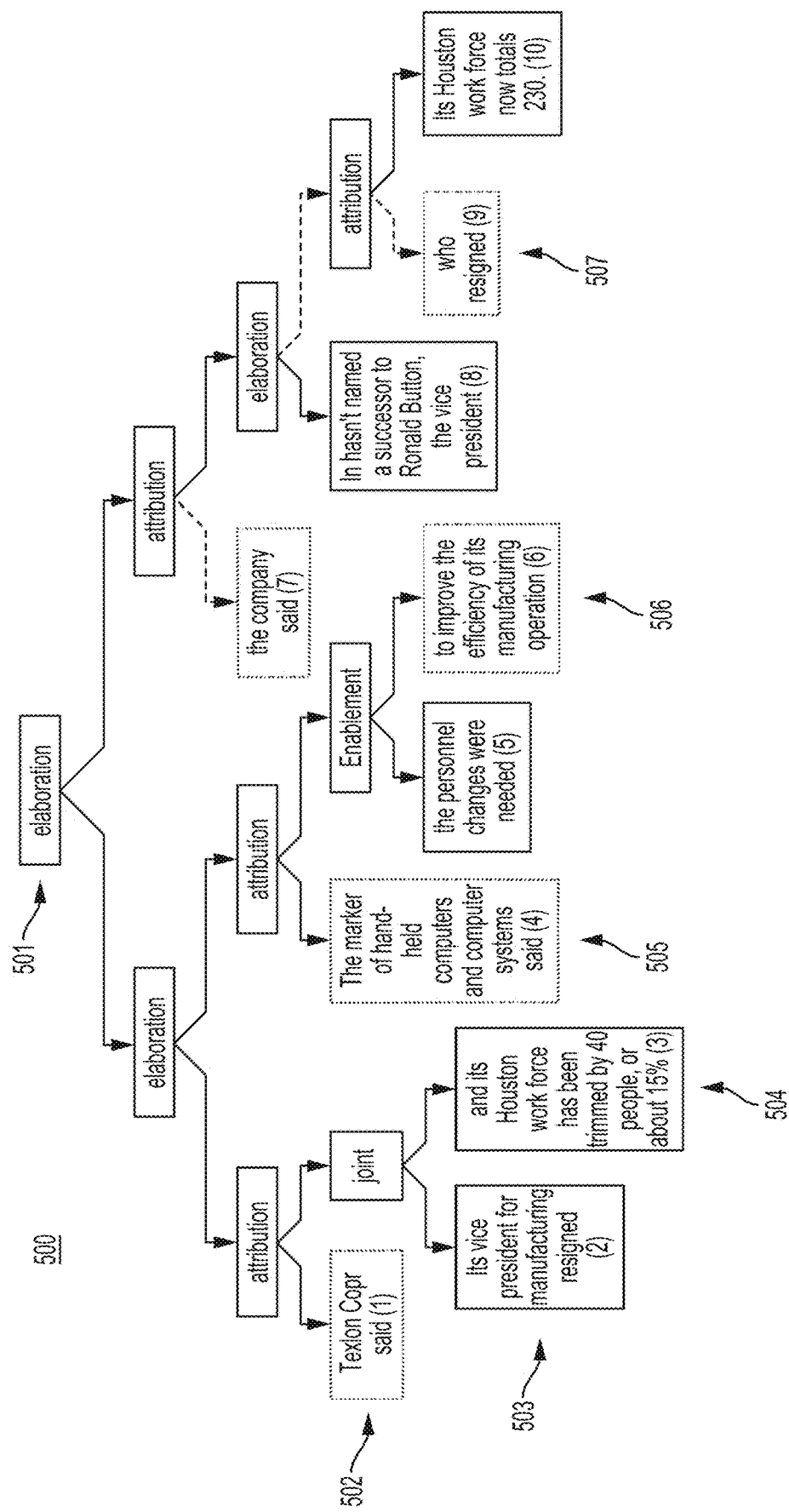
FIG. 5 depicts a node-link representation of the hierarchical binary tree in accordance with an aspect.

FIG. 5 depicts a node-link representation of the hierarchical binary tree in accordance with an aspect. As can be seen from FIG. 5, the leaves of a DT correspond to contiguous non-overlapping text spans called Elementary Discourse Units (EDUs). Adjacent EDUs are connected by relations (e.g., elaboration, attribution . . . ) and form larger discourse units, which are also connected by relations. "Discourse analysis in RST involves two sub-tasks: discourse segmentation is the task of identifying the EDUs, and discourse parsing is the task of linking the discourse units into a labeled tree." See Joty, Shafiq R and Giuseppe Carenini, Raymond T Ng, and Yashar Mehdad. 2013. Combining intra- and multisentential rhetorical parsing for document-level discourse analysis. In ACL (1), pages 486-496.

FIG. 5 depicts text spans that are leaves, or terminal nodes, on the tree, each numbered in the order they appear in the full text, shown in FIG. 6. FIG. 5 includes tree 500. Tree 500 includes, for example, nodes 501-507. The nodes indicate relationships. Nodes are non-terminal, such as node 501, or terminal, such as nodes 502-507. As can be seen, nodes 503 and 504 are related by a joint relationship. Nodes 502, 505, 506, and 508 are nuclei. The dotted lines indicate that the branch or text span is a satellite. The relations are nodes in gray boxes.

FIG. 6 depicts an exemplary indented text encoding of the representation in FIG. 5 in accordance with an aspect. FIG.

6 includes text 600 and text sequences 602-604. Text 600 is presented in a manner more amenable to computer programming. Text sequence 602 corresponds to node 502, sequence 603 corresponds to node 503, and sequence 604 corresponds to node 504. In FIG. 6, "N" indicates a nucleus and "S" indicates a satellite.

Examples of Discourse Parsers

Automatic discourse segmentation can be performed with different methods. For example, given a sentence, a segmentation model identifies the boundaries of the composite elementary discourse units by predicting whether a boundary should be inserted before each particular token in the sentence. For example, one framework considers each token in the sentence sequentially and independently. In this framework, the segmentation model scans the sentence token by token, and uses a binary classifier, such as a support vector machine or logistic regression, to predict whether it is appropriate to insert a boundary before the token being examined. In another example, the task is a sequential labeling problem. Once text is segmented into elementary discourse units, sentence-level discourse parsing can be performed to construct the discourse tree. Machine learning techniques can be used.

In one aspect of the present invention, two Rhetorical Structure Theory (RST) discourse parsers are used: CoreNLPProcessor which relies on constituent syntax, and FastNLPProcessor which uses dependency syntax. See Surdeanu, Mihai & Hicks, Thomas & Antonio Valenzuela-Escarcega, Marco. Two Practical Rhetorical Structure Theory Parsers. (2015).

In addition, the above two discourse parsers, i.e., CoreNLPProcessor and FastNLPProcessor use Natural Language Processing (NLP) for syntactic parsing. For example, the Stanford CoreNLP gives the base forms of words, their parts of speech, whether they are names of companies, people, etc., normalize dates, times, and numeric quantities, mark up the structure of sentences in terms of phrases and syntactic dependencies, indicate which noun phrases refer to the same entities. Practically, RST is a still theory that may work in many cases of discourse, but in some cases, it may not work. There are many variables including, but not limited to, what EDU's are in a coherent text, i.e., what discourse segmenters are used, what relations inventory is used and what relations are selected for the EDUs, the corpus of documents used for training and testing, and even what parsers are used. So for example, in Surdeanu, et al., "Two Practical Rhetorical Structure Theory Parsers," paper cited above, tests must be run on a particular corpus using specialized metrics to determine which parser gives better performance. Thus unlike computer language parsers which give predictable results, discourse parsers (and segmenters) can give unpredictable results depending on the training and/or test text corpus. Thus, discourse trees are a mixture of the predicable arts (e.g., compilers) and the unpredictable arts (e.g., like chemistry were experimentation is needed to determine what combinations will give you the desired results).

In order to objectively determine how good a Discourse analysis is, a series of metrics are being used, e.g., Precision/Recall/F1 metrics from Daniel Marcu, "The Theory and Practice of Discourse Parsing and Summarization," MIT Press, (2000). Precision, or positive predictive value is the fraction of relevant instances among the retrieved instances, while recall (also known as sensitivity) is the fraction of relevant instances that have been retrieved over the total amount of relevant instances. Both precision and recall are therefore based on an understanding and measure of relevance. Suppose a computer program for recognizing dogs in photographs identifies eight dogs in a picture containing 12 dogs and some cats. Of the eight dogs identified, five actually are dogs (true positives), while the rest are cats (false positives). The program's precision is 5/8 while its recall is 5/12. When a search engine returns 30 pages only 20 of which were relevant while failing to return 40 additional relevant pages, its precision is 20/30=2/3 while its recall is 20/60=1/3. Therefore, in this case, precision is 'how useful the search results are', and recall is 'how complete the results are.'" The F1 score (also F-score or F-measure) is a measure of a test's accuracy. It considers both the precision and the recall of the test to compute the score: F1=2× ((precision×recall)/(precision+recall)) and is the harmonic mean of precision and recall. The F1 score reaches its best value at 1 (perfect precision and recall) and worst at 0.

Autonomous Agents or Chatbots

A conversation between Human A and Human B is a form of discourse. For example, applications exist such as FaceBook® Messenger, WhatsApp®, Slack,® SMS, etc., a conversation between A and B may typically be via messages in addition to more traditional email and voice conversations. A chatbot (which may also be called intelligent bots or virtual assistant, etc.) is an "intelligent" machine that, for example, replaces human B and to various degrees mimics the conversation between two humans. An example ultimate goal is that human A cannot tell whether B is a human or a machine (the Turning test, developed by Alan Turing in 1950). Discourse analysis, artificial intelligence, including machine learning, and natural language processing, have made great strides toward the long-term goal of passing the Turing test. Of course, with computers being more and more capable of searching and processing vast repositories of data and performing complex analysis on the data to include predictive analysis, the long-term goal is the chatbot being human-like and a computer combined.

For example, users can interact with the Intelligent Bots Platform through a conversational interaction. This interaction, also called the conversational user interface (UI), is a dialog between the end user and the chatbot, just as between two human beings. It could be as simple as the end user saying "Hello" to the chatbot and the chatbot responding with a "Hi" and asking the user how it can help, or it could be a transactional interaction in a banking chatbot, such as transferring money from one account to the other, or an informational interaction in a HR chatbot, such as checking for vacation balance, or asking an FAQ in a retail chatbot, such as how to handle returns. Natural language processing (NLP) and machine learning (ML) algorithms combined with other approaches can be used to classify end user intent. An intent at a high level is what the end user would like to accomplish (e.g., get account balance, make a purchase). An intent is essentially, a mapping of customer input to a unit of work that the backend should perform. Therefore, based on the phrases uttered by the user in the chatbot, these are mapped that to a specific and discrete use case or unit of work, for e.g. check balance, transfer money and track spending are all "use cases" that the chatbot should support and be able to work out which unit of work should be triggered from the free text entry that the end user types in a natural language.

The underlying rational for having an AI chatbot respond like a human is that the human brain can formulate and understand the request and then give a good response to the human request much better than a machine. Thus, there should be significant improvement in the request/response of a chatbot, if human B is mimicked. So an initial part of the problem is how does the human brain formulate and understand the request? To mimic, a model is used. RST and DT allow a formal and repeatable way of doing this.

At a high level, there are typically two types of requests: (1) A request to perform some action; and (2) a request for information, e.g., a question. The first type has a response in which a unit of work is created. The second type has a response that is, e.g., a good answer, to the question. The answer could take the form of, for example, in some aspects, the AI constructing an answer from its extensive knowledge base(s) or from matching the best existing answer from searching the internet or intranet or other publically/privately available data sources.

Communicative Discourse Trees and The Rhetoric Classifier

Aspects of the present disclosure build communicative discourse trees and use communicative discourse trees to analyze whether the rhetorical structure of a request or question agrees with an answer. More specifically, aspects described herein create representations of a request-response pair, learns the representations, and relates the pairs into classes of valid or invalid pairs. In this manner, an autonomous agent can receive a question from a user, process the question, for example, by searching for multiple answers, determine the best answer from the answers, and provide the answer to the user.

More specifically, to represent linguistic features of text, aspects described herein use rhetoric relations and speech acts (or communicative actions). Rhetoric relations are relationships between the parts of the sentences, typically obtained from a discourse tree. Speech acts are obtained as verbs from a verb resource such as VerbNet. By using both rhetoric relations and communicative actions, aspects described herein can correctly recognize valid request-response pairs. To do so, aspects correlate the syntactic structure of a question with that of an answer. By using the structure, a better answer can be determined.

For example, when an autonomous agent receives an indication from a person that the person desires to sell an item with certain features, the autonomous agent should provide a search result that not only contains the features but also indicates an intent to buy. In this manner, the autonomous agent has determined the user's intent. Similarly, when an autonomous agent receives a request from a person to share knowledge about a particular item, the search result should contain an intent to receive a recommendation. When a person asks an autonomous agent for an opinion about a subject, the autonomous agent shares an opinion about the subject, rather than soliciting another opinion.

Analyzing Request and Response Pairs

Figure 7:
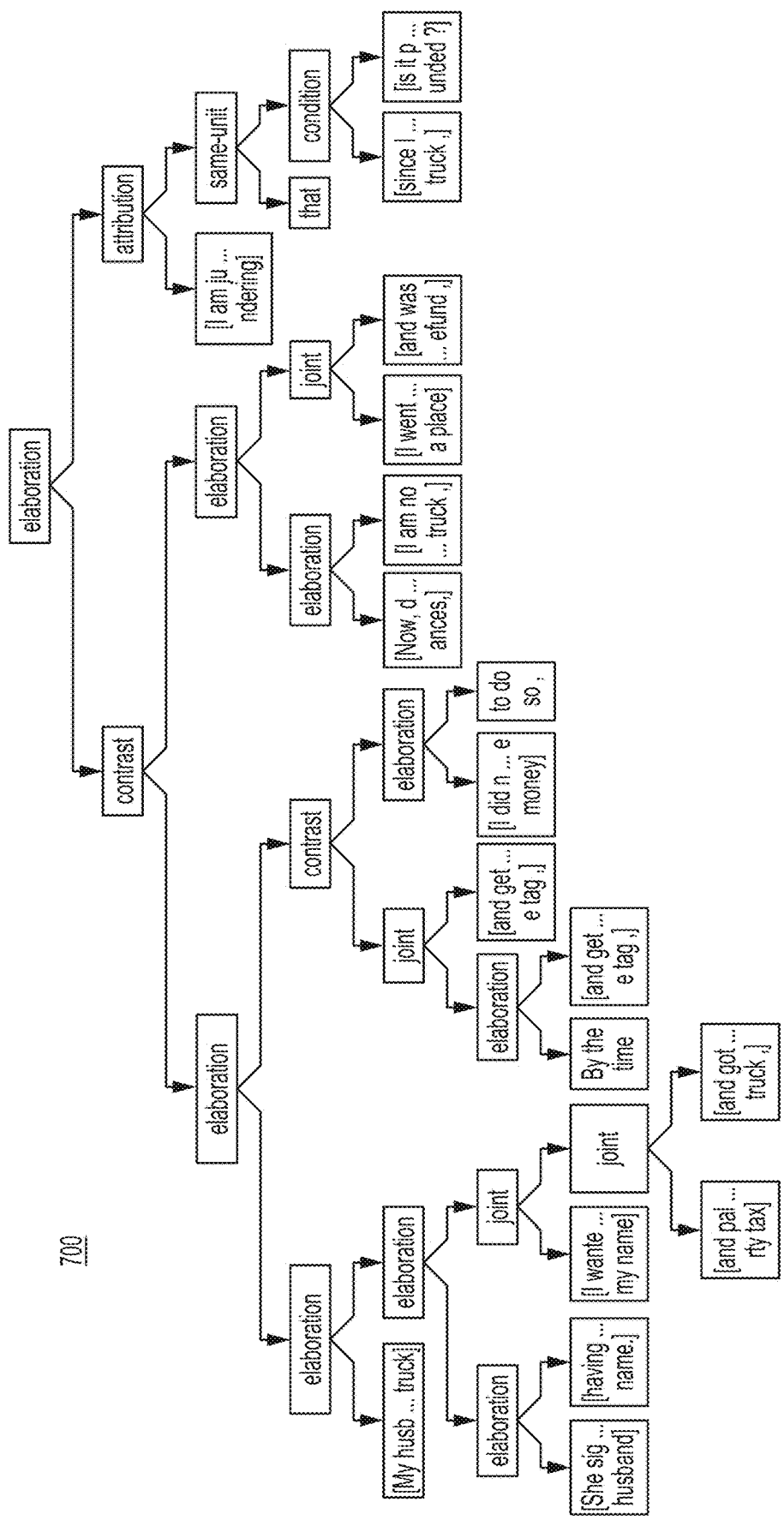
FIG. 7 depicts an exemplary DT for an example request about property tax in accordance with an aspect.

FIG. 7 depicts an exemplary DT for an example request about property tax in accordance with an aspect. The node labels are the relations and the arrowed line points to the satellite. The nucleus is a solid line. FIG. 7 depicts the following text.

Request: "My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund. I am just wondering that since I am not going to have a tag on this truck, is it possible to get the property tax refunded?"

Response: "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax. If you apply late, there will be penalties on top of the normal taxes and fees. You don't need to register it at the same time, but you absolutely need to title it within the period of time stipulated in state law."

As can be seen in FIG. 7, analyzing the above text results in the following. "My husbands' grandmother gave him his grandfather's truck" is elaborated by "She signed the title over but due to my husband" elaborated by "having unpaid fines on his license, he was not able to get the truck put in his name." which is elaborated by "I wanted to put in my name," "and paid the property tax", and "and got insurance for the truck."

"My husbands' grandmother gave him his grandfather's truck. She signed the title over but due to my husband having unpaid fines on his license, he was not able to get the truck put in his name. I wanted to put in my name and paid the property tax and got insurance for the truck." is elaborated by;

"I didn't have the money" elaborated by "to do so" contrasted with

"By the time" elaborated by "it came to sending off the title"

"and getting the tag"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so" is contrasted with "Now, due to circumstances," elaborated with "I am not going to be able to afford the truck." which is elaborated with "I went to the insurance place"

"and was refused a refund"

"My husbands' grandmother gave him his grandfather's truck. She signed the title over but due to my husband having unpaid fines on his license, he was not able to get the truck put in his name. I wanted to put in my name and paid the property tax and got insurance for the truck. By the time it came to sending off the title and getting the tag, I didn't have the money to do so. Now, due to circumstances, I am not going to be able to afford the truck. I went to the insurance place and was refused a refund." is elaborated with "I am just wondering that since I am not going to have a tag on this truck, is it possible to get the property tax refunded?"

"I am just wondering" has attribution to

"that" is the same unit as "is it possible to get the property tax refunded?" which has condition "since I am not going to have a tag on this truck"

As can be seen, the main subject of the topic is "Property tax on a car". The question includes the contradiction: on one hand, all properties are taxable, and on the other hand, the ownership is somewhat incomplete. A good response has to address both topic of the question and clarify the inconsistency. To do that, the responder is making even stronger claim concerning the necessity to pay tax on whatever is owned irrespectively of the registration status. This example is a member of positive training set from our Yahoo! Answers evaluation domain. The main subject of the topic is "Property tax on a car". The question includes the contradiction: on one hand, all properties are taxable, and on the other hand, the ownership is somewhat incomplete. A good answer/response has to address both topic of the question and clarify the inconsistency. The reader can observe that since the question includes rhetoric relation of contrast, the answer has to match it with a similar relation to be convincing. Otherwise, this answer would look incomplete even to those who are not domain experts.

Figure 8:
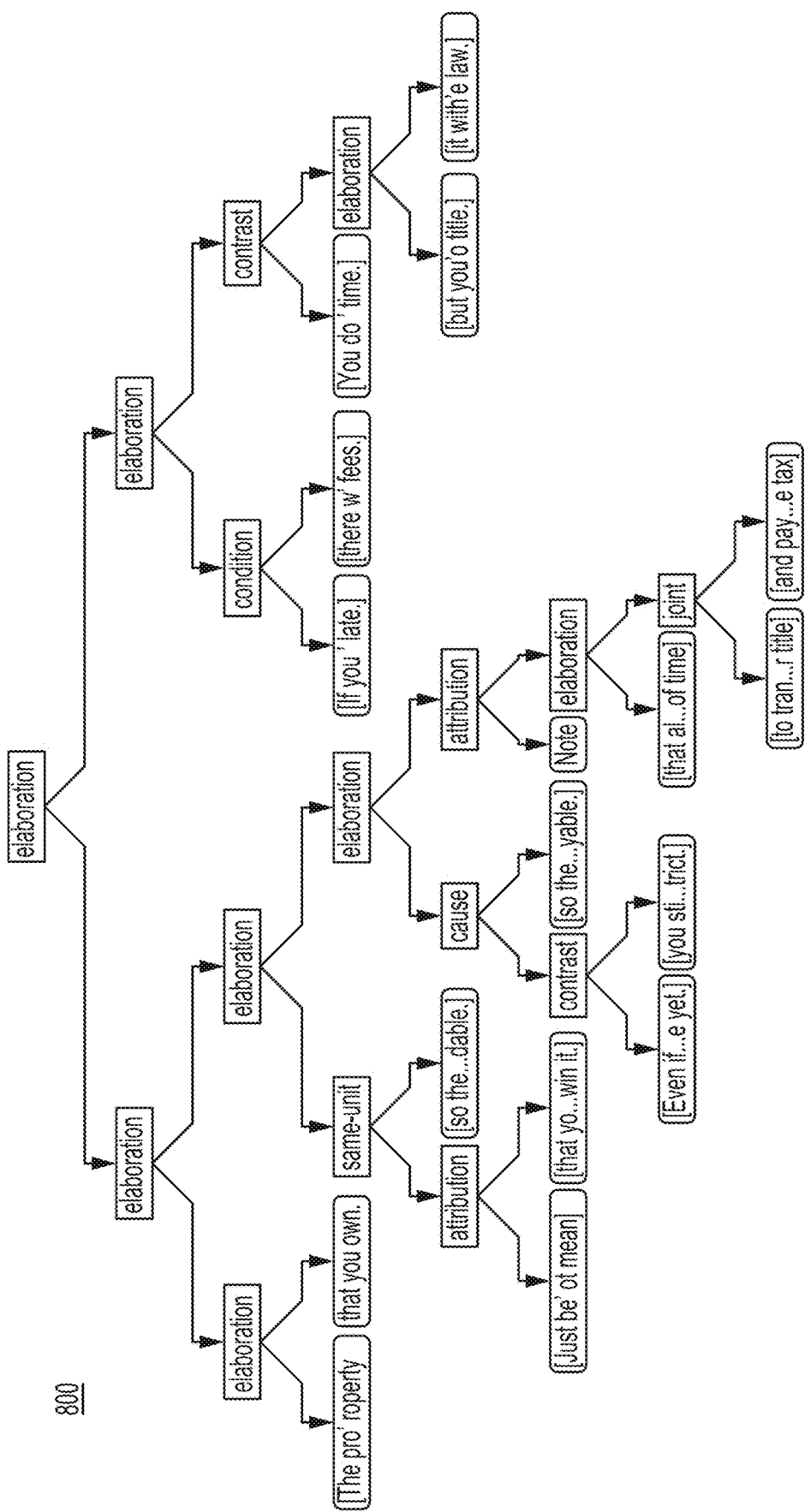
FIG. 8 depicts an exemplary response for the question represented in FIG. 7.

FIG. 8 depicts an exemplary response for the question represented in FIG. 7, according to certain aspects of the present invention. The central nucleus is "the property tax is assessed on property" elaborated by "that you own". "The property tax is assessed on property that you own" is also a nucleus elaborated by "Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax."

The nucleus "The property tax is assessed on property that you own. Just because you chose to not register it does not mean that you don't own it, so the tax is not refundable. Even if you have not titled the vehicle yet, you still own it within the boundaries of the tax district, so the tax is payable. Note that all states give you a limited amount of time to transfer title and pay the use tax." is elaborated by "there will be penalties on top of the normal taxes and fees" with condition "If you apply late," which in turn is elaborated by the contrast of "but you absolutely need to title it within the period of time stipulated in state law." and "You don't need to register it at the same time."

Comparing the DT of FIG. 7 and DT of FIG. 8, enables a determination of how well matched the response (FIG. 8) is to the request (FIG. 7). In some aspects of the present invention, the above framework is used, at least in part, to determine the DTs for the request/response and the rhetoric agreement between the DTs.

In another example, the question "What does The Investigative Committee of the Russian Federation do" has at least two answers, for example, an official answer or an actual answer.

Figure 9:
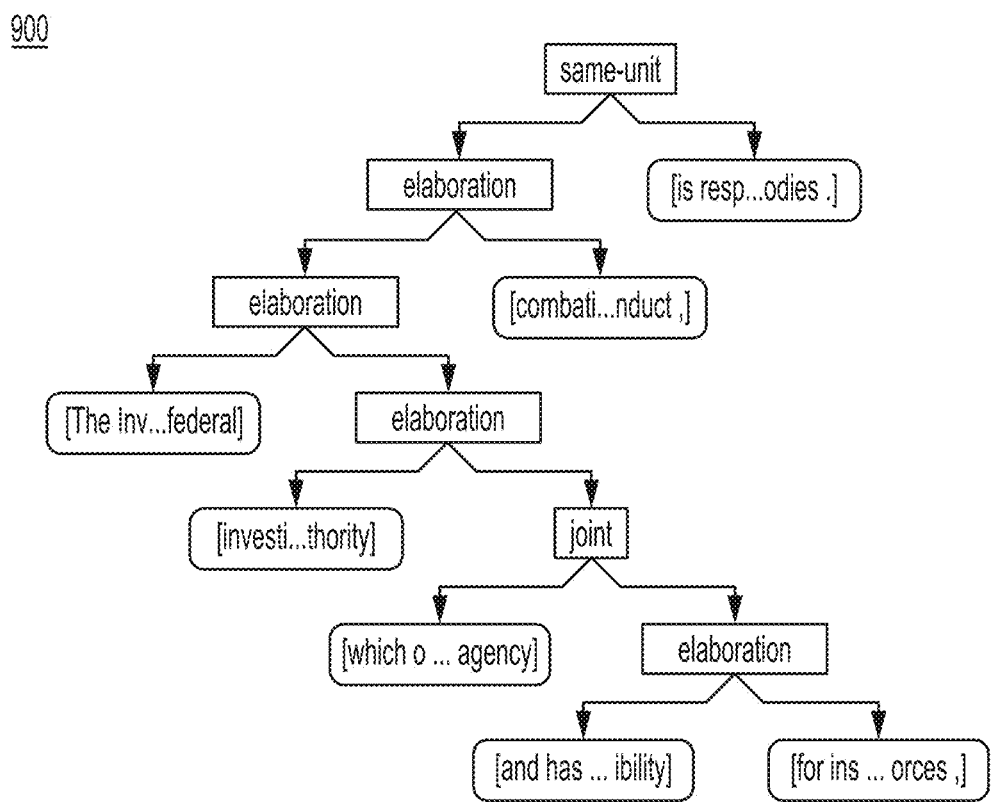
FIG. 9 illustrates a discourse tree for an official answer in accordance with an aspect.

FIG. 9 illustrates a discourse tree for an official answer in accordance with an aspect. As depicted in FIG. 9, an official answer, or mission statement states that "The Investigative Committee of the Russian Federation is the main federal investigating authority which operates as Russia's Anti-corruption agency and has statutory responsibility for inspecting the police forces, combating police corruption and police misconduct, is responsible for conducting investigations into local authorities and federal governmental bodies."

Figure 10:
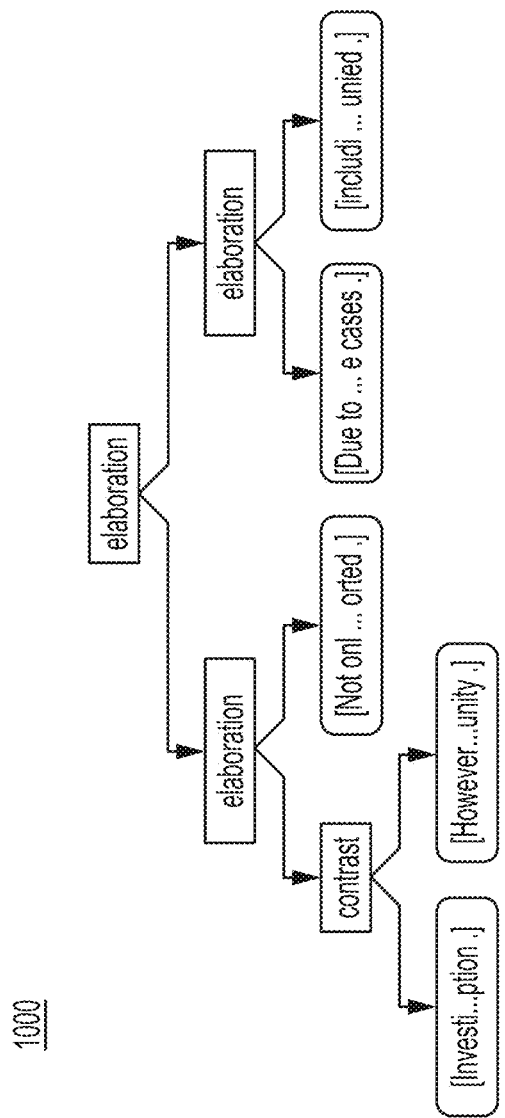
FIG. 10 illustrates a discourse tree for a raw answer in accordance with an aspect.

FIG. 10 illustrates a discourse tree for a raw answer in accordance with an aspect. As depicted in FIG. 10, another, perhaps more honest, answer states that "Investigative Committee of the Russian Federation is supposed to fight corruption. However, top-rank officers of the Investigative Committee of the Russian Federation are charged with creation of a criminal community. Not only that, but their involvement in large bribes, money laundering, obstruction of justice, abuse of power, extortion, and racketeering has been reported. Due to the activities of these officers, dozens of high-profile cases including the ones against criminal lords had been ultimately ruined."

The choice of answers depends on context. Rhetoric structure allows differentiating between "official", "politically correct", template-based answers and "actual", "raw", "reports from the field", or "controversial" answers, see FIGS. 9 and 10). Sometimes, the question itself can give a hint about which category of answers is expected. If a question is formulated as a factoid or definitional one, without a second meaning, then the first category of answers is suitable. Otherwise, if a question has the meaning "tell me what it really is", then the second category is appropriate. In general, after extracting a rhetoric structure from a question, selecting a suitable answer that would have a similar, matching, or complementary rhetoric structure is easier.

The official answer is based on elaboration and joints, which are neutral in terms of controversy a text might contain (See FIG. 9). At the same time, the row answer includes the contrast relation. This relation is extracted between the phrase for what an agent is expected to do and what this agent was discovered to have done.

Communicative Discourse Trees (CDTs)

Rhetoric classification application 102 can create, analyze, and compare communicative discourse trees. Communicative discourse trees are designed to combine rhetoric information with speech act structures. CDTs include with arcs labeled with expressions for communicative actions. By combining communicative actions, CDTs enable the modeling of RST relations and communicative actions. A CDT is a reduction of a parse thicket. See Galitsky, B, Ilvovsky, D. and Kuznetsov SO. Rhetoric Map of an Answer to Compound Queries Knowledge Trail Inc. ACL 2015, 681-686. ("Galitsky 2015"). A parse thicket is a combination of parse trees for sentences with discourse-level relationships between words and parts of the sentence in one graph. By incorporating labels that identify speech actions, learning of communicative discourse trees can occur over a richer features set than just rhetoric relations and syntax of elementary discourse units (EDUs).

In an example, a dispute between three parties concerning the causes of a downing of a commercial airliner, Malaysia Airlines Flight 17 is analyzed. An RST representation of the arguments being communicated is built. In the example, three conflicting agents, Dutch investigators, The Investigative Committee of the Russian Federation, and the self-proclaimed Donetsk People's Republic exchange their opinions on the matter. The example illustrates a controversial conflict where each party does all it can to blame its opponent. To sound more convincing, each party does not just produce its claim but formulates a response in a way to rebuff the claims of an opponent. To achieve this goal, each party attempts to match the style and discourse of the opponents' claims.

Figure 11:
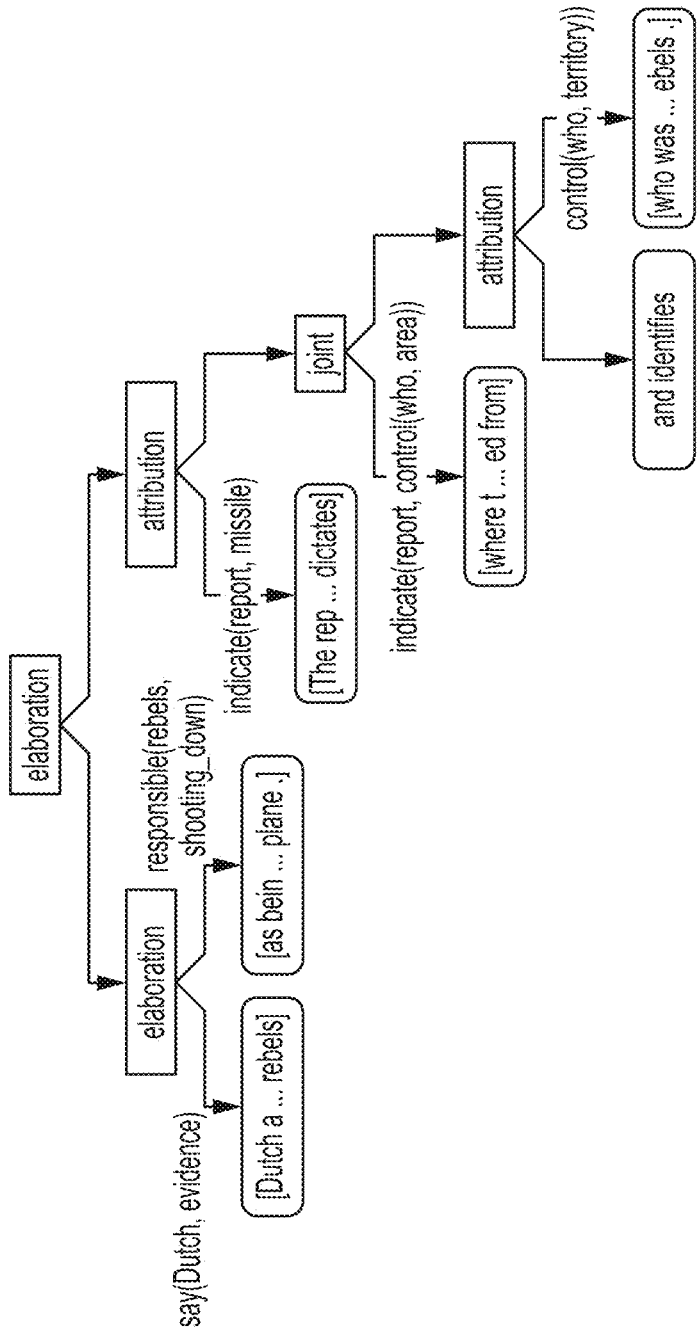
FIG. 11 illustrates a communicative discourse tree for a claim of a first agent in accordance with an aspect.

FIG. 11 illustrates a communicative discourse tree for a claim of a first agent in accordance with an aspect. FIG. 11 depicts communicative discourse tree 100, which represents the following text: "Dutch accident investigators say that evidence points to pro-Russian rebels as being responsible for shooting down plane. The report indicates where the missile was fired from and identifies who was in control of the territory and pins the downing of MH17 on the pro-Russian rebels."

As can be seen from FIG. 11, non-terminal nodes of CDTs are rhetoric relations, and terminal nodes are elementary discourse units (phrases, sentence fragments) which are the subjects of these relations. Certain arcs of CDTs are labeled with the expressions for communicative actions, including the actor agent and the subject of these actions (what is being communicated). For example, the nucleus node for elaboration relation (on the left) are labeled with say (Dutch, evidence), and the satellite with responsible(rebels, shooting down). These labels are not intended to express that the subjects of EDUs are evidence and shooting down but instead for matching this CDT with others for the purpose of finding similarity between them. In this case just linking these communicative actions by a rhetoric relation and not providing information of communicative discourse would be too limited way to represent a structure of what and how is being communicated. A requirement for an RR pair to have the same or coordinated rhetoric relation is too weak, so an agreement of CDT labels for arcs on top of matching nodes is required.

The straight edges of this graph are syntactic relations, and curvy arcs are discourse relations, such as anaphora, same entity, sub-entity, rhetoric relation and communicative actions. This graph includes much richer information than just a combination of parse trees for individual sentences. In addition to CDTs, parse thickets can be generalized at the level of words, relations, phrases and sentences. The speech actions are logic predicates expressing the agents involved in the respective speech acts and their subjects. The arguments of logical predicates are formed in accordance to respective semantic roles, as proposed by a framework such as VerbNet. See Karin Kipper, Anna Korhonen, Neville Ryant, Martha Palmer, A Large-scale Classification of English Verbs, Language Resources and Evaluation Journal, 42(1), pp. 21-40, Springer Netherland, 2008. and/or Karin Kipper Schuler, Anna Korhonen, Susan W. Brown, VerbNet overview, extensions, mappings and apps, Tutorial, NAACL-HLT 2009, Boulder, Colo.

Figure 12:
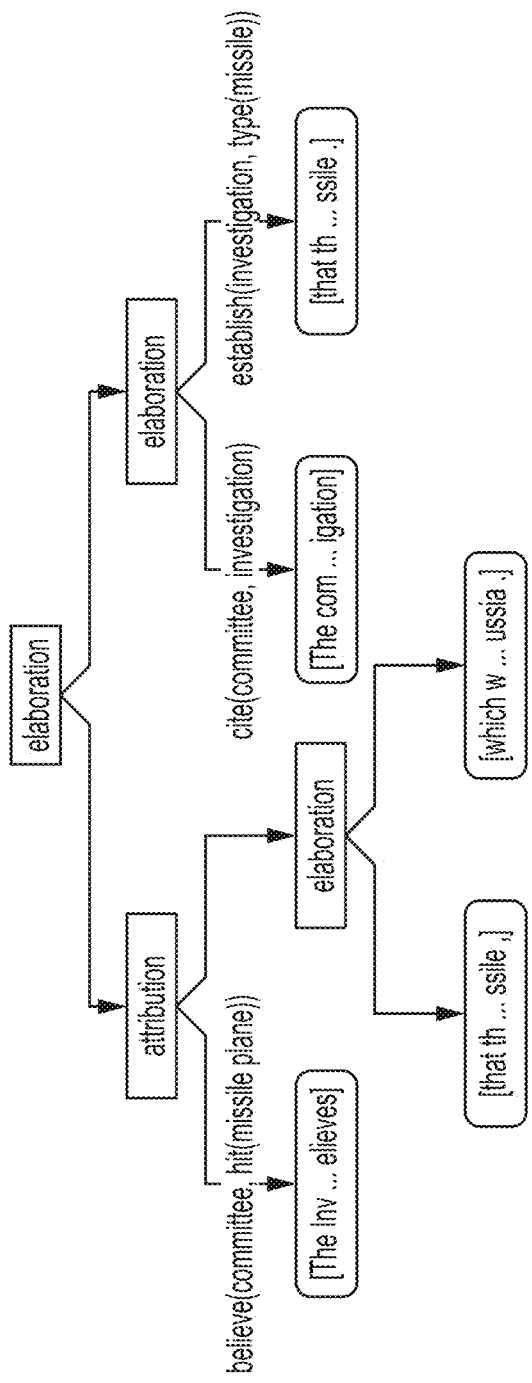
FIG. 12 illustrates a communicative discourse tree for a claim of a second agent in accordance with an aspect.

FIG. 12 illustrates a communicative discourse tree for a claim of a second agent in accordance with an aspect. FIG. 12 depicts communicative discourse tree 1200, which represents the following text: "The Investigative Committee of the Russian Federation believes that the plane was hit by a missile, which was not produced in Russia. The committee cites an investigation that established the type of the missile."

Figure 13:
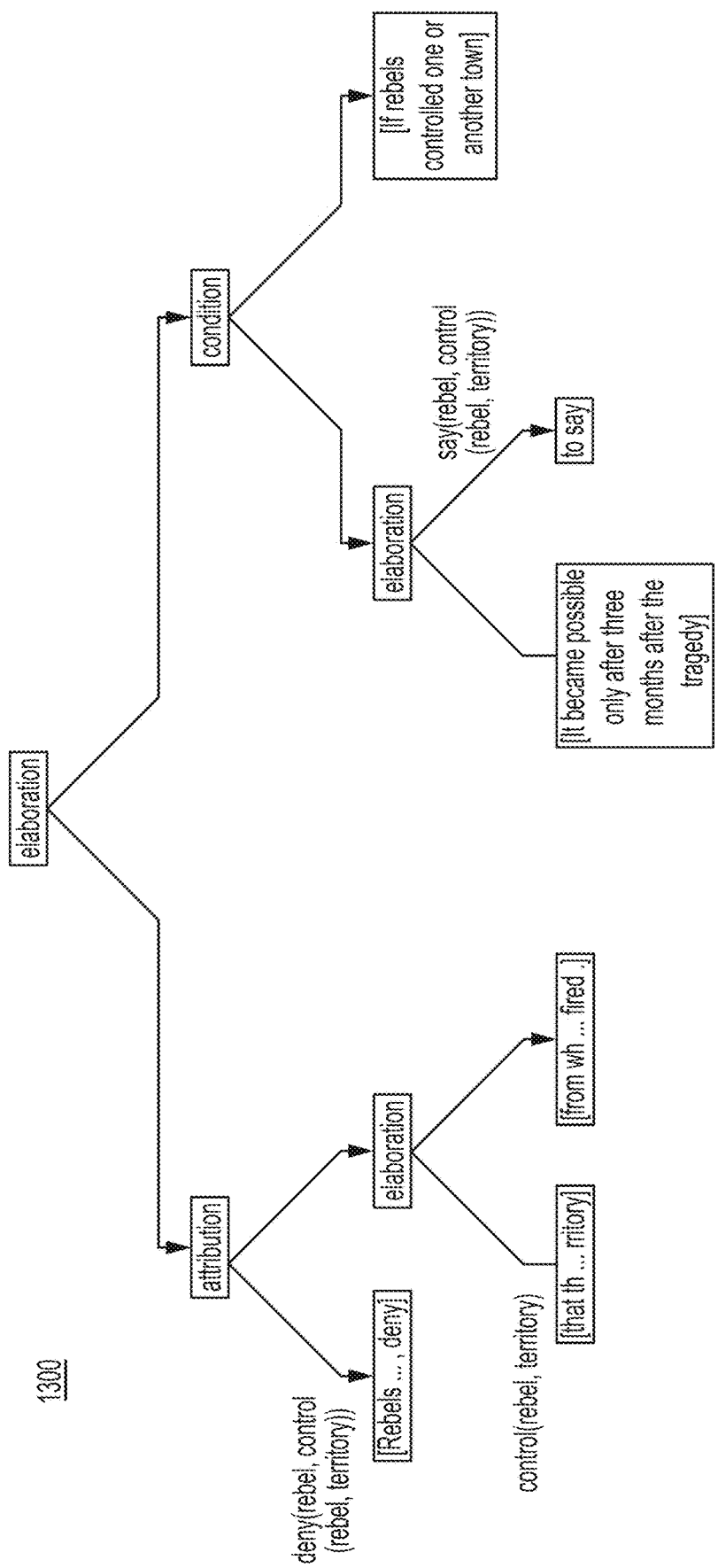
FIG. 13 illustrates a communicative discourse tree for a claim of a third agent in accordance with an aspect.

FIG. 13 illustrates a communicative discourse tree for a claim of a third agent in accordance with an aspect. FIG. 13 depicts communicative discourse tree 1300, which represents the following text: "Rebels, the self-proclaimed Donetsk People's Republic, deny that they controlled the territory from which the missile was allegedly fired. It became possible only after three months after the tragedy to say if rebels controlled one or another town."

As can be seen from communicative discourse trees 1100-1300, a response is not arbitrary. A response talks about the same entities as the original text. For example, communicative discourse trees 1200 and 1300 are related to communicative discourse tree 1100. A response backs up a disagreement with estimates and sentiments about these entities, and about actions of these entities.

More specifically, replies of involved agent need to reflect the communicative discourse of the first, seed message. As a simple observation, because the first agent uses Attribution to communicate his claims, the other agents have to follow the suite and either provide their own attributions or attack the validity of attribution of the proponent, or both. To capture a broad variety of features for how communicative structure of the seed message needs to be retained in consecutive messages, pairs of respective CDTs can be learned.

To verify the agreement of a request-response, discourse relations or speech acts (communicative actions) alone are often insufficient. As can be seen from the example depicted in FIGS. 11-13, the discourse structure of interactions between agents and the kind of interactions are useful. However, the domain of interaction (e.g., military conflicts or politics) or the subjects of these interactions, i.e., the entities, do not need to be analyzed.

Representing Rhetoric Relations and Communicative Actions

In order to compute similarity between abstract structures, two approaches are frequently used: (1) representing these structures in a numerical space, and express similarity as a number, which is a statistical learning approach, or (2) using a structural representation, without numerical space, such as trees and graphs, and expressing similarity as a maximal common sub-structure. Expressing similarity as a maximal common sub-structure is referred to as generalization.

Learning communicative actions helps express and understand arguments. Computational verb lexicons help support acquisition of entities for actions and provide a rule-based form to express their meanings. Verbs express the semantics of an event being described as well as the relational information among participants in that event, and project the syntactic structures that encode that information. Verbs, and in particular communicative action verbs, can be highly variable and can display a rich range of semantic behaviors. In response, verb classification helps a learning systems to deal with this complexity by organizing verbs into groups that share core semantic properties.

VerbNet is one such lexicon, which identifies semantic roles and syntactic patterns characteristic of the verbs in each class and makes explicit the connections between the syntactic patterns and the underlying semantic relations that can be inferred for all members of the class. See Karin Kipper, Anna Korhonen, Neville Ryant and Martha Palmer, *Language Resources and Evaluation*, Vol. 42, No. 1 (March 2008), at 21. Each syntactic frame, or verb signature, for a class has a corresponding semantic representation that details the semantic relations between event participants across the course of the event.

For example, the verb amuse is part of a cluster of similar verbs that have a similar structure of arguments (semantic roles) such as amaze, anger, arouse, disturb, and irritate. The roles of the arguments of these communicative actions are as follows: Experiencer (usually, an animate entity), Stimulus, and Result. Each verb can have classes of meanings differentiated by syntactic features for how this verb occurs in a sentence, or frames. For example, the frames for amuse are as follows, using the following key noun phrase (NP), noun (N), communicative action (V), verb phrase (VP), adverb (ADV):

NP V NP. Example: "The teacher amused the children." Syntax: Stimulus V Experiencer. Clause: amuse(Stimulus, E, Emotion, Experiencer), cause(Stimulus, E), emotional_state(result(E), Emotion, Experiencer).

NP V ADV-Middle. Example: "Small children amuse quickly." Syntax: Experiencer V ADV. Clause: amuse(Experiencer, Prop):-, property(Experiencer, Prop), adv(Prop).

NP V NP-PRO-ARB. Example "The teacher amused." Syntax Stimulus V. amuse(Stimulus, E, Emotion, Experiencer): cause(Stimulus, E), emotional_state(result(E), Emotion, Experiencer).

NP.cause V NP. Example "The teacher's dolls amused the children." syntax Stimulus <+genitive> ('s) V Experiencer. amuse(Stimulus, E, Emotion, Experiencer): cause(Stimulus, E), emotional_state(during(E), Emotion, Experiencer).

NP V NP ADJ. Example "This performance bored me totally." syntax Stimulus V Experiencer Result. amuse(Stimulus, E, Emotion, Experiencer). cause(Stimulus, E), emotional_state(result(E), Emotion, Experiencer), Pred(result(E), Experiencer).

Communicative actions can be characterized into clusters, for example:
Verbs with Predicative Complements (Appoint, characterize, dub, declare, conjecture, masquerade, orphan, captain, consider, classify), Verbs of Perception (See, sight, peer).
Verbs of Psychological State (Amuse, admire, marvel, appeal), Verbs of Desire (Want, long).
Judgment Verbs (Judgment), Verbs of Assessment (Assess, estimate), Verbs of Searching (Hunt, search, stalk, investigate, rummage, ferret), Verbs of Social Interaction (Correspond, marry, meet, battle), Verbs of Communication (Transfer(message), inquire, interrogate, tell, manner(speaking), talk, chat, say, complain, advise, confess, lecture, overstate, promise). Avoid Verbs (Avoid), Measure Verbs, (Register, cost, fit, price, bill), Aspectual Verbs (Begin, complete, continue, stop, establish, sustain.

Aspects described herein provide advantages over statistical learning models. In contrast to statistical solutions, aspects use a classification system can provide a verb or a verb-like structure which is determined to cause the target feature (such as rhetoric agreement). For example, statistical machine learning models express similarity as a number, which can make interpretation difficult.

Representing Request-Response Pairs

Representing request-response pairs facilitates classification based operations based on a pair. In an example, request-response pairs can be represented as parse thickets. A parse thicket is a representation of parse trees for two or more sentences with discourse-level relationships between words and parts of the sentence in one graph. See Galitsky 2015. Topical similarity between question and answer can expressed as common sub-graphs of parse thickets. The higher the number of common graph nodes, the higher the similarity.

Figure 14:
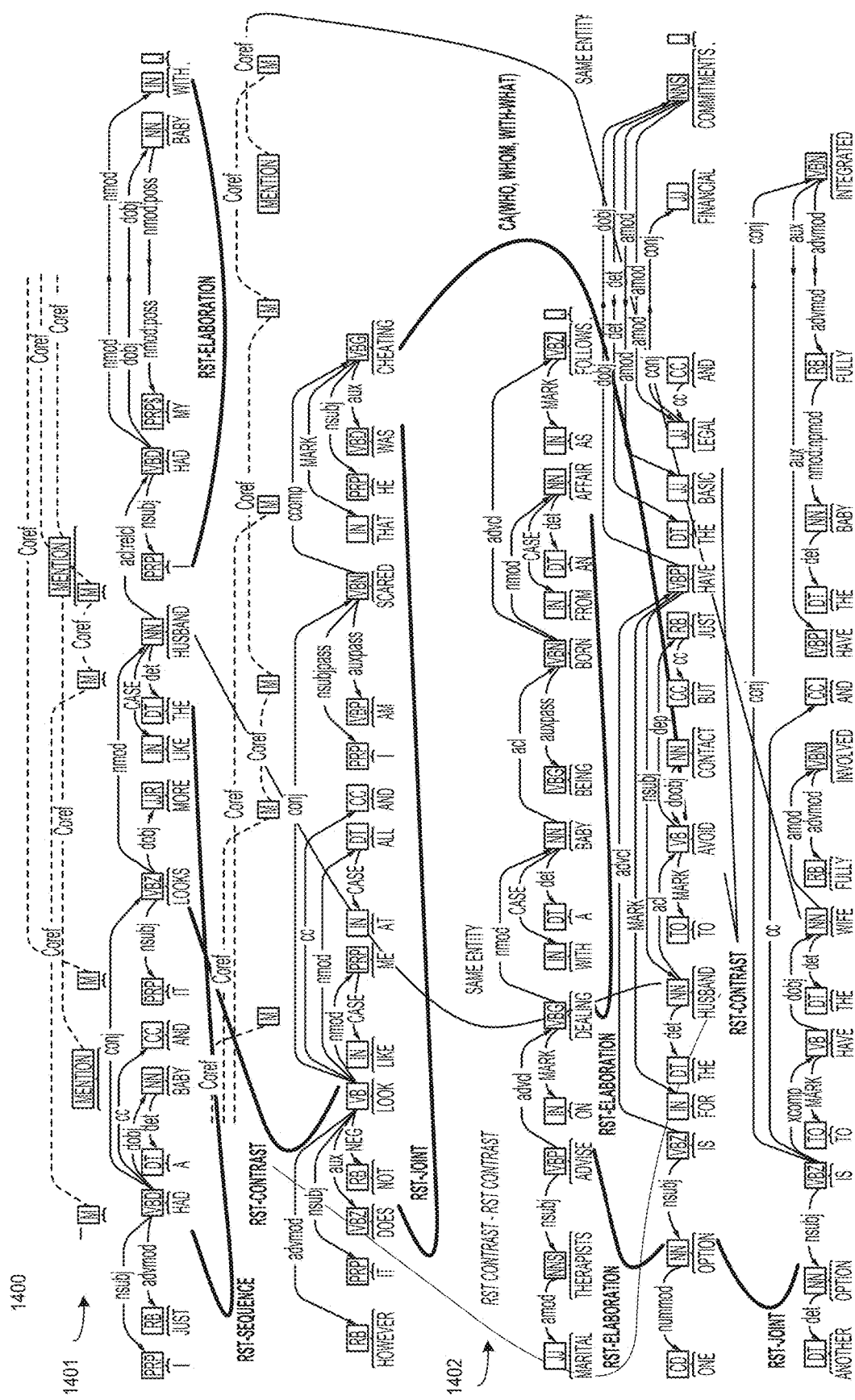
FIG. 14 illustrates parse thickets in accordance with an aspect.

FIG. 14 illustrates parse thickets in accordance with an aspect. FIG. 14 depicts parse thicket 1400 including a parse tree 1401 for a request, and a parse tree for a corresponding response 1402.

Parse tree 1401 represents the question "I just had a baby and it looks more like the husband I had my baby with. However it does not look like me at all and I am scared that he was cheating on me with another lady and I had her kid. This child is the best thing that has ever happened to me and I cannot imagine giving my baby to the real mom."

Response 1402 represents the response "Marital therapists advise on dealing with a child being born from an affair as follows. One option is for the husband to avoid contact but just have the basic legal and financial commitments. Another option is to have the wife fully involved and have the baby fully integrated into the family just like a child from a previous marriage."

FIG. 14 represents a greedy approach to representing linguistic information about a paragraph of text. The straight edges of this graph are syntactic relations, and curvy arcs are discourse relations, such as anaphora, same entity, sub-entity, rhetoric relation and communicative actions. The solid arcs are for same entity/sub-entity/anaphora relations, and the dotted arcs are for rhetoric relations and communicative actions. Oval labels in straight edges denote the syntactic relations. Lemmas are written in the boxes for the nodes, and lemma forms are written on the right side of the nodes.

Parse thicket 1400 includes much richer information than just a combination of parse trees for individual sentences. Navigation through this graph along the edges for syntactic relations as well as arcs for discourse relations allows to transform a given parse thicket into semantically equivalent forms for matching with other parse thickets, performing a text similarity assessment task. To form a complete formal representation of a paragraph, as many links as possible are expressed. Each of the discourse arcs produces a pair of thicket phrases that can be a potential match.

Topical similarity between the seed (request) and response is expressed as common sub-graphs of parse thickets. They are visualized as connected clouds. The higher the number of common graph nodes, the higher the similarity. For rhetoric agreement, common sub-graph does not have to be large as it is in the given text. However, rhetoric relations and communicative actions of the seed and response are correlated and a correspondence is required.

Generalization for Communicative Actions

A similarity between two communicative actions $A_1$ and $A_2$ is defined as a an abstract verb which possesses the features which are common between $A_1$ and $A_2$. Defining a similarity of two verbs as an abstract verb-like structure supports inductive learning tasks, such as a rhetoric agreement assessment. In an example, a similarity between the following two common verbs, agree and disagree, can be generalized as follows: agree ˆ disagree=verb(Interlocutor, Proposed_action, Speaker), where Interlocution is the person who proposed the Proposed_action to the Speaker and to whom the Speaker communicates their response. Proposed_action is an action that the Speaker would perform if they were to accept or refuse the request or offer, and The Speaker is the person to whom a particular action has been proposed and who responds to the request or offer made.

In a further example, a similarity between verbs agree and explain is represented as follows: agree ˆ explain=verb (Interlocutor, *, Speaker). The subjects of communicative actions are generalized in the context of communicative actions and are not be generalized with other "physical" actions. Hence, aspects generalize individual occurrences of communicative actions together with corresponding subjects.

Additionally, sequences of communicative actions representing dialogs can be compared against other such sequences of similar dialogs. In this manner, the meaning of an individual communicative action as well as the dynamic discourse structure of a dialogue is (in contrast to its static structure reflected via rhetoric relations) is represented. A generalization is a compound structural representation that happens at each level. Lemma of a communicative action is generalized with lemma, and its semantic role are generalized with respective semantic role.

Communicative actions are used by text authors to indicate a structure of a dialogue or a conflict. See Searle, J. R. 1969, Speech acts: an essay in the philosophy of language. London: Cambridge University Press. Subjects are generalized in the context of these actions and are not generalized with other "physical" actions. Hence, the individual occurrences of communicative actions together are generalized with their subjects, as well as their pairs, as discourse "steps."

Generalization of communicative actions can also be thought of from the standpoint of matching the verb frames, such as VerbNet. The communicative links reflect the discourse structure associated with participation (or mentioning) of more than a single agent in the text. The links form a sequence connecting the words for communicative actions (either verbs or multi-words implicitly indicating a communicative intent of a person).

Communicative actions include an actor, one or more agents being acted upon, and the phrase describing the features of this action. A communicative action can be described as a function of the form: verb (agent, subject, cause), where verb characterizes some type of interaction between involved agents (e.g., explain, confirm, remind, disagree, deny, etc.), subject refers to the information transmitted or object described, and cause refers to the motivation or explanation for the subject.

A scenario (labeled directed graph) is a sub-graph of a parse thicket G=(V, A), where V={action$_1$, action$_2$ . . . action$_n$} is a finite set of vertices corresponding to communicative actions, and A is a finite set of labeled arcs (ordered pairs of vertices), classified as follows:

Each arc action$_i$, action$_j$ $\in$ A$_{sequence}$ corresponds to a temporal precedence of two actions v$_i$, ag$_i$, s$_i$, c$_i$ and v$_j$, ag$_j$, s$_j$, c$_j$ that refer to the same subject, e.g., s$_j$=s$_i$ or different subjects. Each arc action$_i$, action$_j$ $\in$ A$_{cause}$ corresponds to an attack relationship between action$_i$ and action$_j$ indicating that the cause of action$_i$ in conflict with the subject or cause of action$_j$.

Subgraphs of parse thickets associated with scenarios of interaction between agents have some distinguishing features. For example, (1) all vertices are ordered in time, so that there is one incoming arc and one outgoing arc for all vertices (except the initial and terminal vertices), (2) for A$_{sequence}$ arcs, at most one incoming and only one outgoing arc are admissible, and (3) for A$_{cause}$ arcs, there can be many outgoing arcs from a given vertex, as well as many incoming arcs. The vertices involved may be associated with different agents or with the same agent (i.e., when he contradicts himself). To compute similarities between parse thickets and their communicative action, induced subgraphs, the subgraphs of the same configuration with similar labels of arcs and strict correspondence of vertices are analyzed.

The following similarities exist by analyzing the arcs of the communicative actions of a parse thicket: (1) one communicative action from with its subject from T1 against another communicative action with its subject from T2 (communicative action arc is not used), and (2) a pair of communicative actions with their subjects from T1 compared to another pair of communicative actions from T2 (communicative action arcs are used).

Generalizing two different communicative actions is based on their attributes. See (Galitsky et al 2013). As can be seen in the example discussed with respect to FIG. 14, one communicative action from T1, cheating(husband, wife, another lady) can be compared with a second from T2, avoid(husband, contact(husband, another lady)). A generalization results in communicative_action(husband, *) which introduces a constraint on A in the form that if a given agent (=husband) is mentioned as a subject of CA in Q, he(she) should also be a subject of (possibly, another) CA in A. Two communicative actions can always be generalized, which is not the case for their subjects: if their generalization result is empty, the generalization result of communicative actions with these subjects is also empty.

Generalization of RST Relations

Some relations between discourse trees can be generalized, such as arcs that represent the same type of relation (presentation relation, such as antithesis, subject matter relation, such as condition, and multinuclear relation, such as list) can be generalized. A nucleus or a situation presented by a nucleus is indicated by "N." Satellite or situations presented by a satellite, are indicated by "S." "W" indicates a writer. "R" indicates a reader (hearer). Situations are propositions, completed actions or actions in progress, and communicative actions and states (including beliefs, desires, approve, explain, reconcile and others). Generalization of two RST relations with the above parameters is expressed as: rst1(N1, S1, W1, R1) ^ rst2(N2, S2, W2, R2)=(rst1 ^ rst2)(N1 ^ N2, S1 ^ S2, W1 ^ W2, R1 ^ R2).

The texts in N1, S1, W1, R1 are subject to generalization as phrases. For example, rst1 ^ rst2 can be generalized as follows: (1) if relation_type(rst1)!=relation_type(rst2) then a generalization is empty. (2) Otherwise, the signatures of rhetoric relations are generalized as sentences: sentence(N1, S1, W1, R1) ^ sentence(N2, S2, W2, R2). See Iruskieta, Mikel, Iria da Cunha and Maite Taboada. A qualitative comparison method for rhetorical structures: identifying different discourse structures in multilingual corpora. Lang Resources & Evaluation. June 2015, Volume 49, Issue 2.

For example, the meaning of rst–background ^ rst–enablement=(S increases the ability of R to comprehend an element in N) ^ (R comprehending S increases the ability of R to perform the action in N)=increase-VB the-DT ability-NN of-IN R-NN to-IN.

Because the relations rst–background ^ rst–enablement differ, the RST relation part is empty. The expressions that are the verbal definitions of respective RST relations are then generalized. For example, for each word or a placeholder for a word such as an agent, this word (with its POS) is retained if the word the same in each input phrase or remove the word if the word is different between these phrases. The resultant expression can be interpreted as a common meaning between the definitions of two different RST relations, obtained formally.

Two arcs between the question and the answer depicted in FIG. 14 show the generalization instance based on the RST relation "RST-contrast". For example, "I just had a baby" is a RST-contrast with "it does not look like me," and related to "husband to avoid contact" which is a RST-contrast with "have the basic legal and financial commitments." As can be seen, the answer need not have to be similar to the verb phrase of the question but the rhetoric structure of the question and answer are similar. Not all phrases in the answer must match phrases in question. For example, the phrases that do not match have certain rhetoric relations with the phrases in the answer which are relevant to phrases in question.

Building a Communicative Discourse Tree

Figure 15:
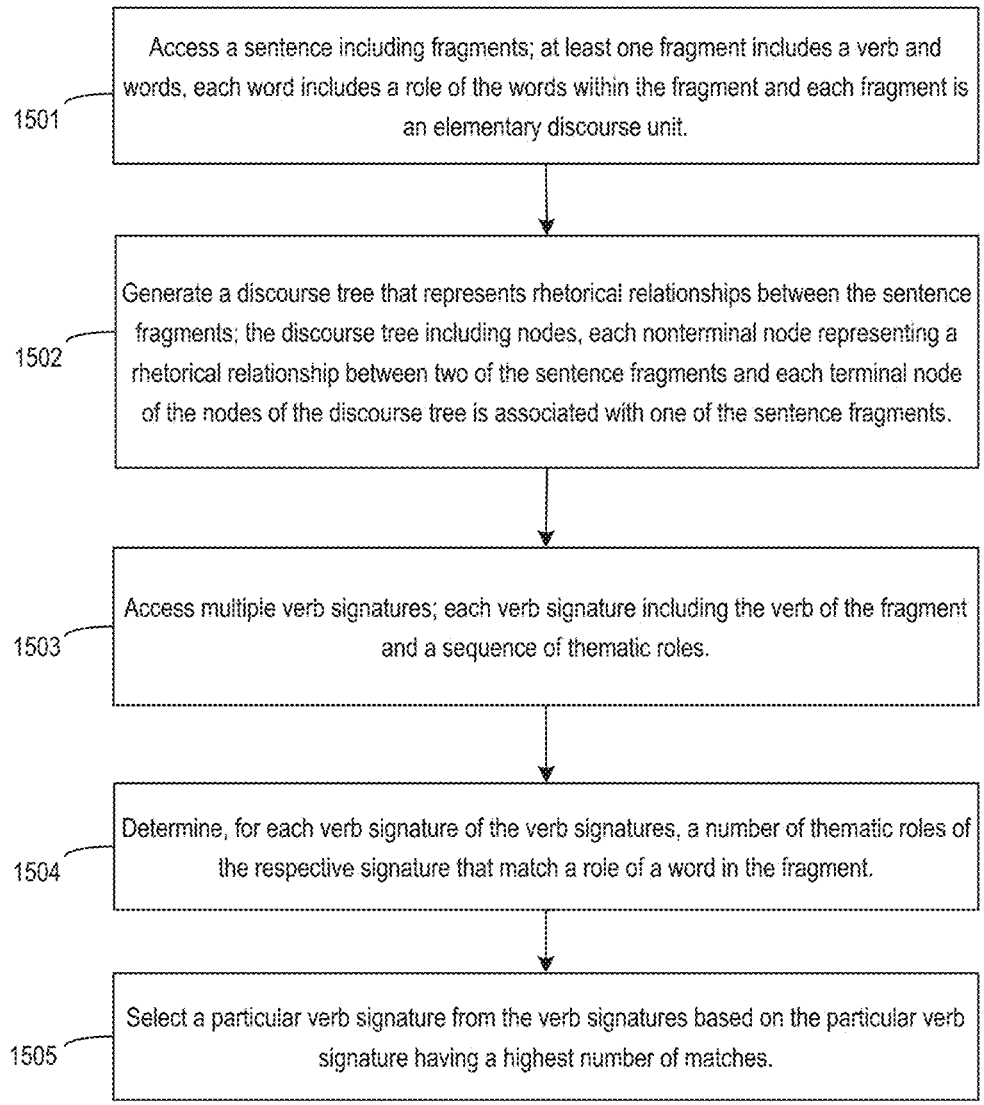
FIG. 15 illustrates an exemplary process for building a communicative discourse tree in accordance with an aspect.

FIG. 15 illustrates an exemplary process for building a communicative discourse tree in accordance with an aspect. Rhetoric classification application 102 can implement process 1500. As discussed, communicative discourse trees enable improved search engine results.

At block 1501, process 1500 involves accessing a sentence including fragments. At least one fragment includes a verb and words and each word includes a role of the words within the fragment, and each fragment is an elementary discourse unit. For example, rhetoric classification application 102 accesses a sentence such as "Rebels, the self-proclaimed Donetsk People's Republic, deny that they controlled the territory from which the missile was allegedly fired" as described with respect to FIG. 13.

Continuing the example, rhetoric classification application 102 determines that the sentence includes several fragments. For example, a first fragment is "rebels . . . deny." A second fragment is "that they controlled the territory." A third fragment is "from which the missile was allegedly fired." Each fragment includes a verb, for example, "deny" for the first fragment and "controlled" for the second fragment. Although, a fragment need not include a verb.

At block 1502, process 1500 involves generating a discourse tree that represents rhetorical relationships between the sentence fragments. The discourse tree including nodes, each nonterminal node representing a rhetorical relationship between two of the sentence fragments and each terminal node of the nodes of the discourse tree is associated with one of the sentence fragments.

Continuing the example, rhetoric classification application 102 generates a discourse tree as shown in FIG. 13. For example, the third fragment, "from which the missile was allegedly fired" elaborates on "that they controlled the territory." The second and third fragments together relate to attribution of what happened, i.e., the attack cannot have been the rebels because they do not control the territory.

At block 1503, process 1500 involves accessing multiple verb signatures. For example, rhetoric classification application 102 accesses a list of verbs, e.g., from VerbNet. Each verb matches or is related to the verb of the fragment. For example, the for the first fragment, the verb is "deny." Accordingly, rhetoric classification application 102 accesses a list of verb signatures that relate to the verb deny.

As discussed, each verb signature includes the verb of the fragment and one or more of thematic roles. For example, a signature includes one or more of noun phrase (NP), noun (N), communicative action (V), verb phrase (VP), or adverb (ADV). The thematic roles describing the relationship between the verb and related words. For example "the teacher amused the children" has a different signature from "small children amuse quickly." For the first fragment, the verb "deny," rhetoric classification application 102 accesses a list of frames, or verb signatures for verbs that match "deny." The list is "NP V NP to be NP," "NP V that S" and "NP V NP."

Each verb signature includes thematic roles. A thematic role refers to the role of the verb in the sentence fragment. Rhetoric classification application 102 determines the thematic roles in each verb signature. Example thematic roles include actor, agent, asset, attribute, beneficiary, cause, location destination source, destination, source, location, experiencer, extent, instrument, material and product, material, product, patient, predicate, recipient, stimulus, theme, time, or topic.

At block 1504, process 1500 involves determining, for each verb signature of the verb signatures, a number of thematic roles of the respective signature that match a role of a word in the fragment. For the first fragment, rhetorical classification application 102 determines that the verb "deny" has only three roles, "agent", "verb" and "theme."

At block 1505, process 1500 involves selecting a particular verb signature from the verb signatures based on the particular verb signature having a highest number of matches. For example, referring again to FIG. 13, deny in the first fragment "the rebels deny . . . that they control the territory" is matched to verb signature deny "NP V NP", and "control" is matched to control (rebel, territory). Verb signatures are nested, resulting in a nested signature of "deny (rebel, control(rebel, territory))."

Figure 16:
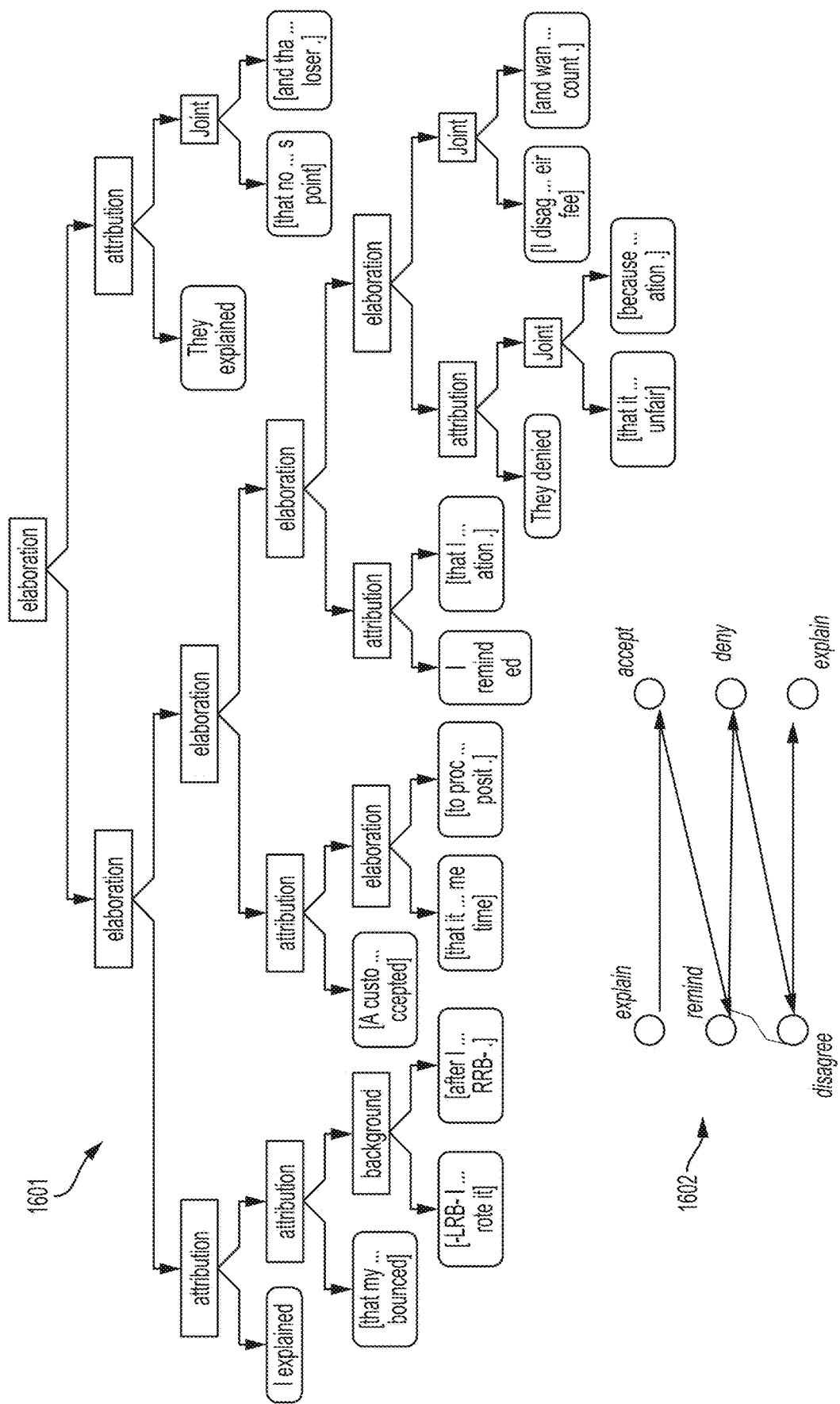
FIG. 16 illustrates a discourse tree and scenario graph in accordance with an aspect.

FIG. 16 illustrates a discourse tree and scenario graph in accordance with an aspect. FIG. 16 depicts discourse tree 1601 and scenario graph 1602. Discourse tree 1601 corresponds to the following three sentences:

(1) I explained that my check bounced (I wrote it after I made a deposit). A customer service representative accepted that it usually takes some time to process the deposit.

(2) I reminded that I was unfairly charged an overdraft fee a month ago in a similar situation. They denied that it was unfair because the overdraft fee was disclosed in my account information.

(3) I disagreed with their fee and wanted this fee deposited back to my account. They explained that nothing can be done at this point and that I need to look into the account rules closer.

As can be seen by the discourse tree in FIG. 16, determining whether the text represents an interaction or a description can be hard to judge. Hence, by analyzing the arcs of communicative actions of a parse thicket, implicit similarities between texts can be found. For example, in general terms:

(1) one communicative actions from with its subject from a first tree against another communicative action with its subject from a second tree (communicative action arc is not used).

(2) a pair of communicative actions with their subjects from a first tree against another pair of communicative actions from a second tree (communicative action arcs are used).

For example, in the previous example, the generalization of cheating(husband, wife, another lady) ^ avoid(husband, contact(husband, another lady)) provides us communicative_action(husband, *) which introduces a constraint on A in the form that if a given agent (=husband) is mentioned as a subject of CA in Q, he(she) should also be a subject of (possibly, another) CA in A.

To handle meaning of words expressing the subjects of CAs, a word can be applied to a vector model such as the "word2vector" model. More specifically, to compute generalization between the subjects of communicative actions, the following rule can be used: if subject1=subject2, subject1^subject2=<subject1, POS(subject1), 1>. Here subject remains and score is 1. Otherwise, if the subjects have the same part-of-speech (POS), then subject1^subject2=<*, POS(subject1), word2vecDistance(subject1^subject2)>. '*' denotes that lemma is a placeholder, and the score is a word2vec distance between these words. If POS is different, generalization is an empty tuple and may not be further generalized.

Nearest Neighbor Graph-Based Classification

Once a CDT is built, in order to identify an argument in text, rhetoric classification application 102 compute the similarity compared to CDTs for the positive class and verify that it is lower to the set of CDTs for its negative class. Similarity between CDT is defined by means of maximal common sub-CDTs.

In an example, an ordered set G of CDTs(V,E) with vertex- and edge-labels from the sets ($\square_\neg, \prec$) and ($\wedge_E, \prec$) is constructed. A labeled CDT Γ from G is a pair of pairs of the form ((V,1),(E,b)), where V is a set of vertices, E is a set of edges, 1: V→$\square_\neg$ is a function assigning labels to vertices, and b: E→$\square_\neg$ is a function assigning labels to edges. Isomorphic trees with identical labeling are not distinguished.

The order is defined as follows: For two CDTs $\Gamma_1:=((V_1, 1_1),(E_1,b_1))$ and Γ2: $=((V_2,1_2),(E_2,b_2))$ from G, then that $\Gamma_1$ dominates $\Gamma_2 \leq \Gamma_1$ (or $\Gamma_2$ is a sub-CDT of $\Gamma_1$) if there exists a one-to-one mapping φ: $V_2 \rightarrow V_1$ such that it (1) respects edges: (v,w) $\square$ $E_2$ ⇒ (φ(v), φ(w)) ∈ $E_1$, and (2) fits under labels: $1_2(v) \prec 1_1(\varphi(v))$, (v,w) ∈ $E_2$ ⇒ $b_2(v,w) \prec b_1(\varphi(v), \varphi(w))$.

This definition takes into account the calculation of similarity ("weakening") of labels of matched vertices when passing from the "larger" CDT $G_1$ to "smaller" CDT $G_2$.

Now, similarity CDT Z of a pair of CDTs X and Y, denoted by X ^ Y=Z, is the set of all inclusion-maximal common sub-CDTs of X and Y, each of them satisfying the following additional conditions (1) to be matched, two vertices from CDTs X and Y must denote the same RST relation; and (2) each common sub-CDT from Z contains at least one communicative action with the same VerbNet signature as in X and Y.

This definition is easily extended to finding generalizations of several graphs. The subsumption order $\sqcap$ on pairs of graph sets X and Y is naturally defined as X $\sqcap$ Y:=X $\sqcap$ Y=X.

Figure 17:
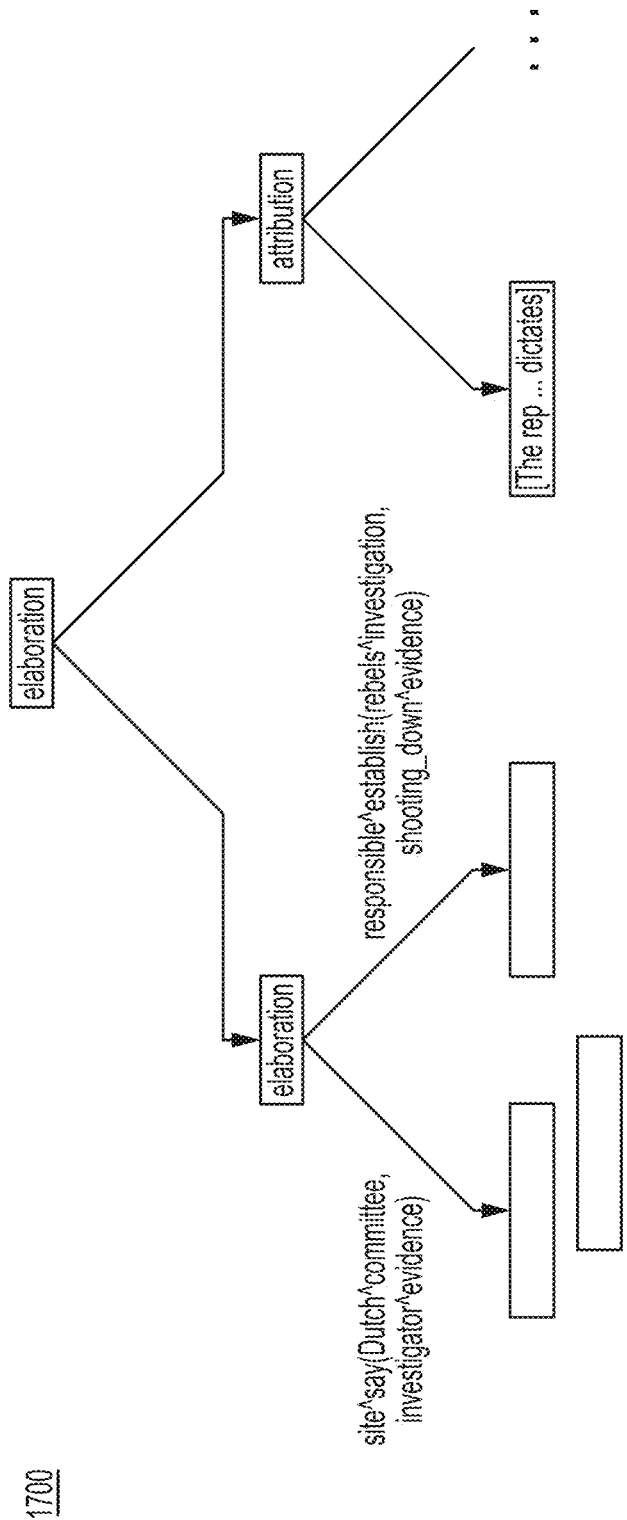
FIG. 17 illustrates a maximal common sub-communicative discourse tree in accordance with an aspect.

FIG. 17 illustrates a maximal common sub-communicative discourse tree in accordance with an aspect. FIG. 17 includes communicative sub-discourse tree 1700. Communicative sub-discourse tree 1700 is inverted and the labels of arcs are generalized: Communicative action site( ) is generalized with communicative action say( ). The first (agent) argument of the former CA committee is generalized with the first argument of the latter CA Dutch. The same operation is applied to the second arguments for this pair of CAs: investigator ^ evidence.

CDT U belongs to a positive class such that (1) U is similar to (has a nonempty common sub-CDT) with a positive example $R^+$ and (2) for any negative example $R^-$, if U is similar to $R^-$ (i.e., U $\sqcap$ $R^- \neq \emptyset$) then $U*R^-\mu\ U*R^+$.

This condition introduces the measure of similarity and says that to be assigned to a class, the similarity between the unknown CDT U and the closest CDT from the positive class should be higher than the similarity between U and each negative example. Condition 2 implies that there is a positive example $R^+$ such that for no $R^-$ one has U $\sqcap$ $R^+$ $\sqcap$ $R^-$, i.e., there is no counterexample to this generalization of positive examples.

Thicket Kernel Learning for CDT

Tree Kernel learning for strings, parse trees and parse thickets is a well-established research area these days. The parse tree kernel counts the number of common sub-trees as the discourse similarity measure between two instances. Tree kernel has been defined for DT by Joty, Shafiq and A. Moschitti. Discriminative Reranking of Discourse Parses Using Tree Kernels. Proceedings of EMNLP. (2014). See also Wang, W., Su, J., & Tan, C. L. (2010). Kernel Based Discourse Relation Recognition with Temporal Ordering Information. In Proceedings of the 48th Annual Meeting of the Association for Computational Linguistics. (using the special form of tree kernels for discourse relation recognition). A thicket kernel is defined for a CDT by augmenting a DT kernel by the information on communicative actions.

A CDT can be represented by a vector V of integer counts of each sub-tree type (without taking into account its ancestors):

V(T)=(# of subtrees of type 1, . . . , # of subtrees oftype I, . . . , # of subtrees of type n). This results in a very high dimensionality since the number of different sub-trees is exponential in its size. Thus, it is computational infeasible to directly use the feature vector $\emptyset(T)$. To solve the computational issue, a tree kernel function is introduced to calculate the dot product between the above high dimensional vectors efficiently. Given two tree segments CDT1 and CDT2, the tree kernel function is defined:

K (CDT1, CDT2)=<V(CDT1), V (CDT2)>=$\Sigma$i V (CDT1)[i], V(CDT2)[i]=$\Sigma$n1$\Sigma$n2 $\Sigma$i Ii(n1)*Ii(n2) where n1$\Sigma$N1, n2$\Sigma$N2 where N1 and N2 are the sets of all nodes in CDT1 and CDT2, respectively;

Ii(n) is the indicator function.

Ii(n)={1 iff a subtree of type i occurs with root at node; 0 otherwise}. K(CDT1, CDT2) is an instance of convolution kernels over tree structures (Collins and Duffy, 2002) and can be computed by recursive definitions:

$\Delta$(n1, n2)=$\Sigma$I Ii(n1)*Ii(n2)

$\Delta$(n1, n2)=0 if n1 and n2 are assigned the same POS tag or their children are different subtrees.

Otherwise, if both n1 and n2 are POS tags (are pre-terminal nodes) then $\Delta$(n1, n2)=1×$\lambda$;

Otherwise, $\Delta$(n1, n2)=$\lambda\Pi_{j=1}^{nc(n1)}(1+\Delta(ch(n1, j), ch(n2, j)))$ where ch(n,j) is the jth child of node n, nc($n_1$) is the number of the children of $n_1$, and $\lambda(0<\lambda<1)$ is the decay factor in order to make the kernel value less variable with respect to the sub-tree sizes. In addition, the recursive rule (3) holds because given two nodes with the same children, one can construct common sub-trees using these children and common sub-trees of further offspring. The parse tree kernel counts the number of common sub-trees as the syntactic similarity measure between two instances.

Figure 18:
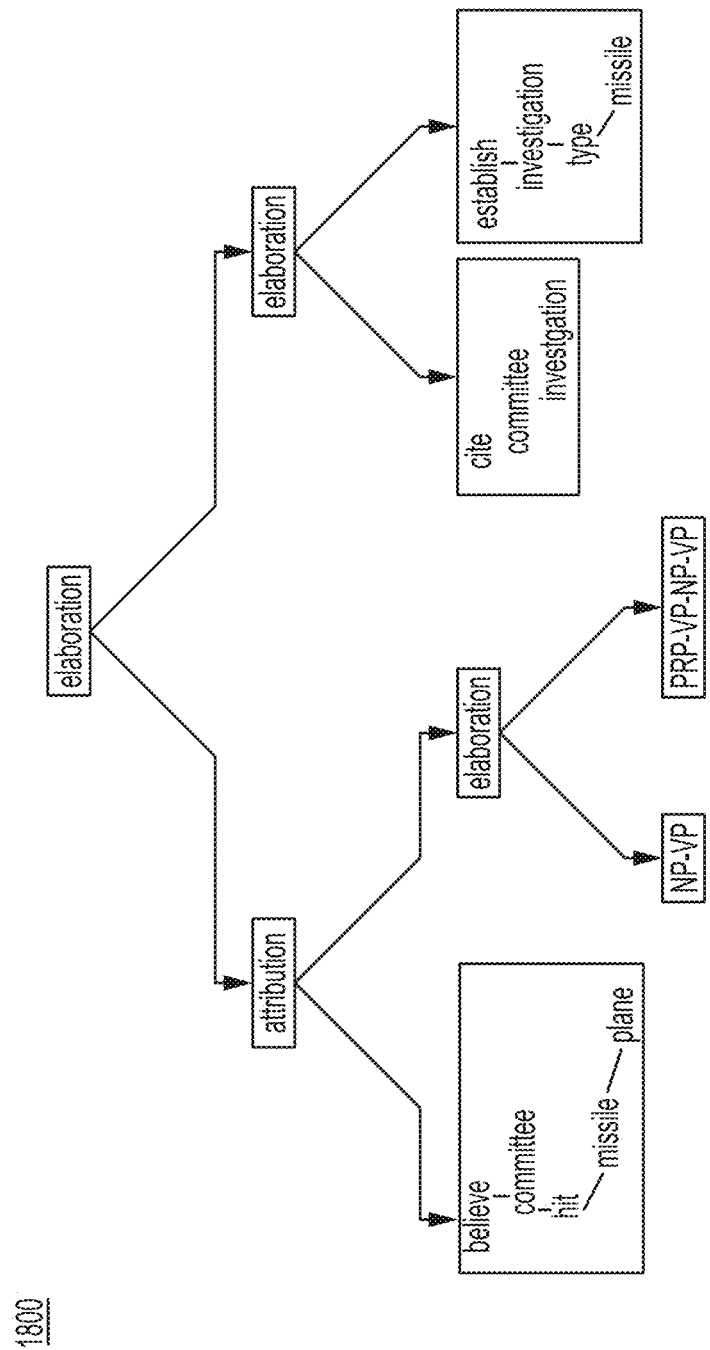
FIG. 18 illustrates a tree in a kernel learning format for a communicative discourse tree in accordance with an aspect.

FIG. 18 illustrates a tree in a kernel learning format for a communicative discourse tree in accordance with an aspect.

The terms for Communicative Actions as labels are converted into trees which are added to respective nodes for RST relations. For texts for EDUs as labels for terminal nodes only the phrase structure is retained. The terminal nodes are labeled with the sequence of phrase types instead of parse tree fragments.

If there is a rhetoric relation arc from a node X to a terminal EDU node Y with label A(B, C(D)), then the subtree A-B→(C-D) is appended to X.

Detecting a Request for an Explanation

As discussed, users often desire an explanation for a decision taken by a computing system that is operating a machine learning model. With respect to machine learning models, often, best classification accuracy is typically achieved by black-box machine learning models such as Support Vector Machine, neural networks or random forests, or complicated ensembles of all of these. These systems are referred to as black-boxes and their drawbacks are frequently cited since their inner workings are really hard to understand. They do not usually provide a clear explanation of the reasons they made a certain decision or prediction; instead, they just output a probability associated with a prediction. On the other hand, machine learning methods whose predictions are easy to understand and interpret frequently have limited predictive capacity (inductive inference, linear regression, a single decision tree) or are inflexible and computationally cumbersome, such as explicit graphical models. These methods usually require less data to train from.

Figure 19:
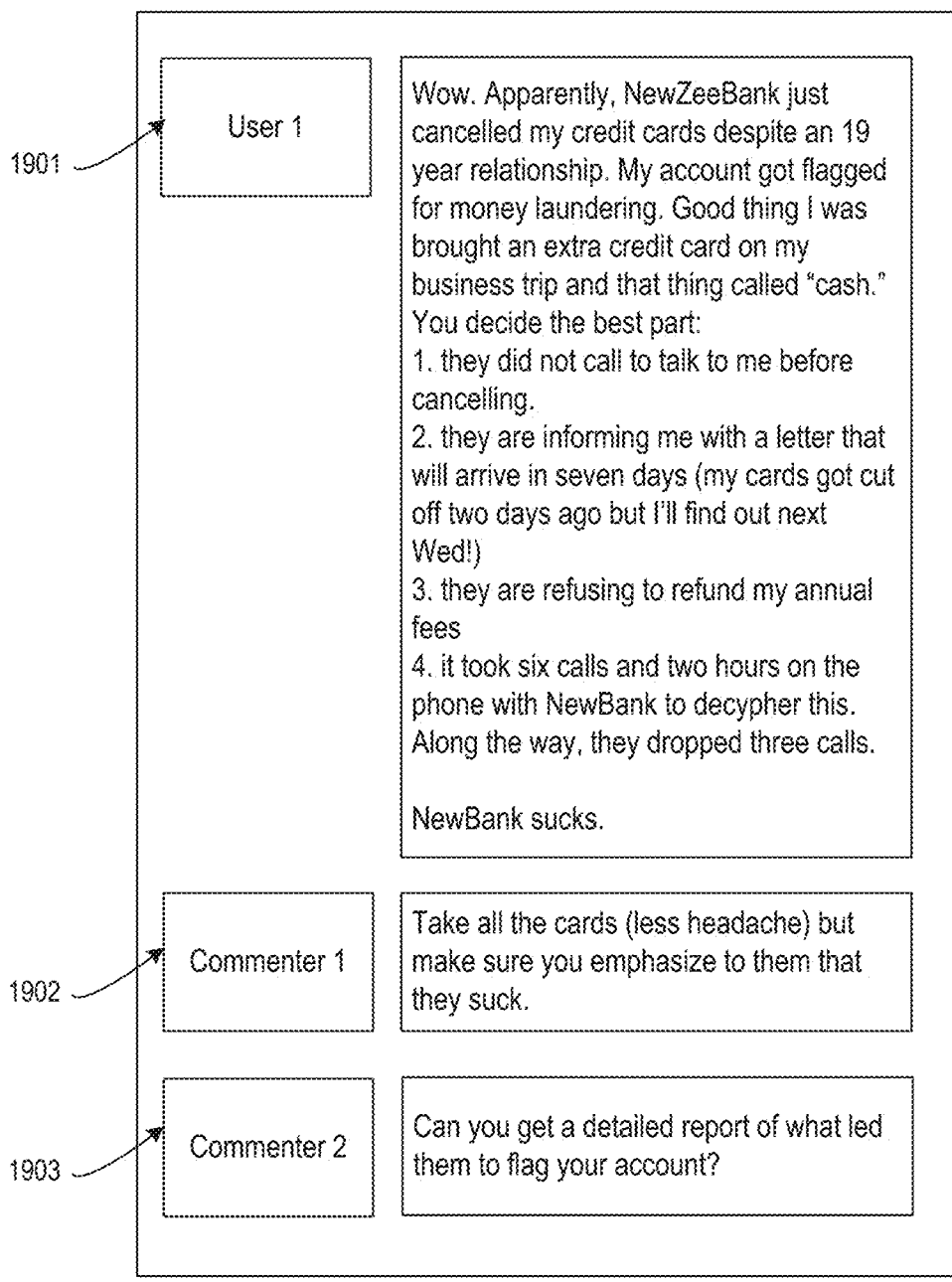
FIG. 19 illustrates an example of an electronic communication session in accordance with an aspect.

FIG. 19 illustrates an example of an electronic communication session in accordance with an aspect. FIG. 19 illustrates communication session 1900, which includes electronic message 1901 from user 1, electronic message 1902 from a first commenter, and electronic message 1903 from a second commenter. As illustrated by electronic message 1901, a customer of financial services is appalled when he travels and his credit cards are canceled without an obvious reason. The customer explains what had happened in the message thread, e.g., via social media. As can be seen from electronic messages 1902 and 1903, the user's friends strongly support his case again the bank. Not only did the bank make an error in its decision, according to what the friends write, but the bank is also is unable to rectify the error and communicate the error properly. If this bank used a decision making system with explainability, a given cause of the decision may exist. Once it is established that this cause does not hold, the bank is expected to be capable of reverting its decision efficiently and retaining the customer.

Figure 20:
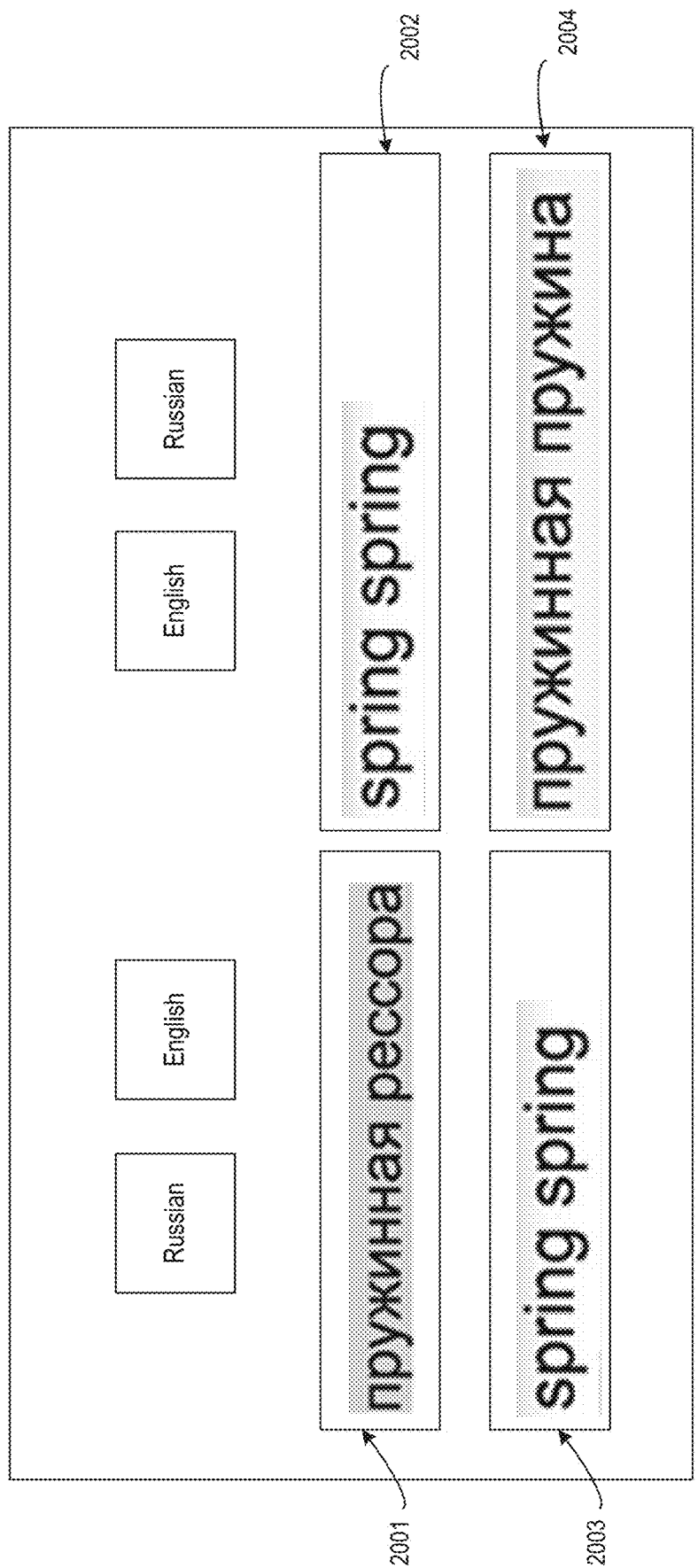
FIG. 20 illustrates an example of an electronic translation of a phrase in accordance with an aspect.

FIG. 20 illustrates an example of an electronic translation of a phrase in accordance with an aspect. FIG. 20 includes translator 2000, which includes input 2001, output 2002, output 2003, and input 2004. Translator 2000 can use machine learning. The translator translates the term "coil spring" (in Russian) into "spring spring." This example shows problem in the simplest case of translation where a meaning of two words needs to be combined. A simple meta-reasoning system, a basic grammar checking component or an entity lookup would prevent this translation error under appropriate compartmental machine learning architecture with explainability. However, a black-box implementation of machine translation breaks even in simple cases like this. Inverse translation is obviously flawed as well, as depicted by input 2004 and output 2003.

Figure 21:
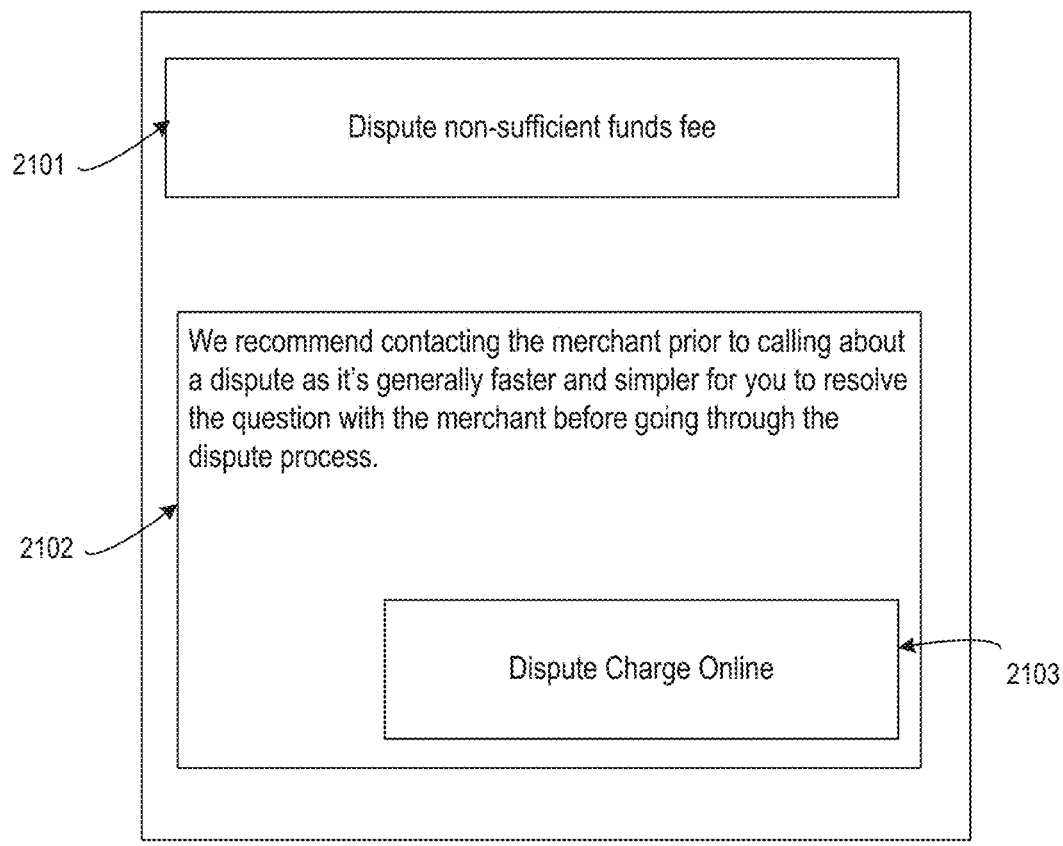
FIG. 21 illustrates an example of a search result of a phrase in accordance with an aspect.

FIG. 21 illustrates an example of a search result of a phrase in accordance with an aspect. FIG. 21 depicts search engine 2100, which includes search term 2101, output 2102, and button 2103. Output 2102 shows a description for the entity. Search engine is another application area for machine learning in which a relevance score is a major criterion to show certain search results. Having a highest relevance score does not provide an explanation that the results are indeed relevant. Typical relevance score such as TF*IDF is hardly interpretable; search highlighting features are helpful but the search engine needs to be able to explain why it ignored certain keywords like non-sufficient funds. A better phrase handling would also help: the system should recognize the whole expression stating "non-sufficient funds fee" and if the expression does not occur in the search results, the system should explain the expression.

Using a Machine Learning Model to Determine a Request for Explanation

By solely relying on keywords, using keyword rules is insufficient to detect an implicit request to explain. Hence a machine learning approach with an adequate training dataset is beneficial. A training set includes text with a request to explain and text that does not include one. When a request to explain is not explicitly mentioned, discourse-level features are helpful. Accordingly, aspects use communicative discourse trees as a means to represent discourse features associated with affective argumentation.

Figure 22:
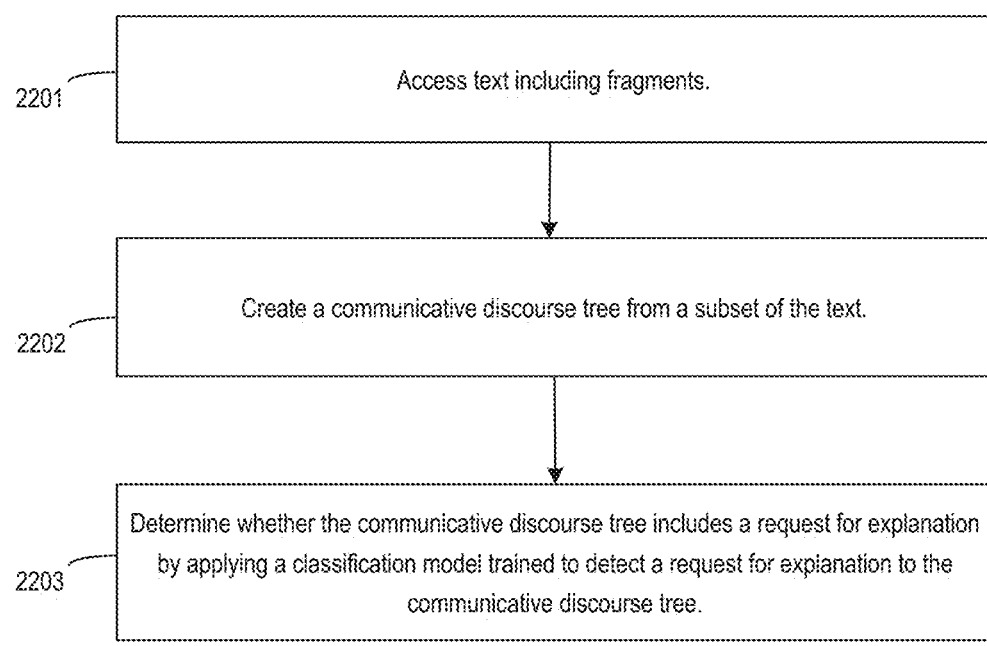
FIG. 22 illustrates an exemplary process used to determine a presence of a request for explanation in text in accordance with an aspect.

FIG. 22 illustrates an exemplary process used to determine a presence of a request for explanation in text in accordance with an aspect. For discussion purposes, FIG. 22 is discussed in conjunction with FIG. 23.

Figure 23:
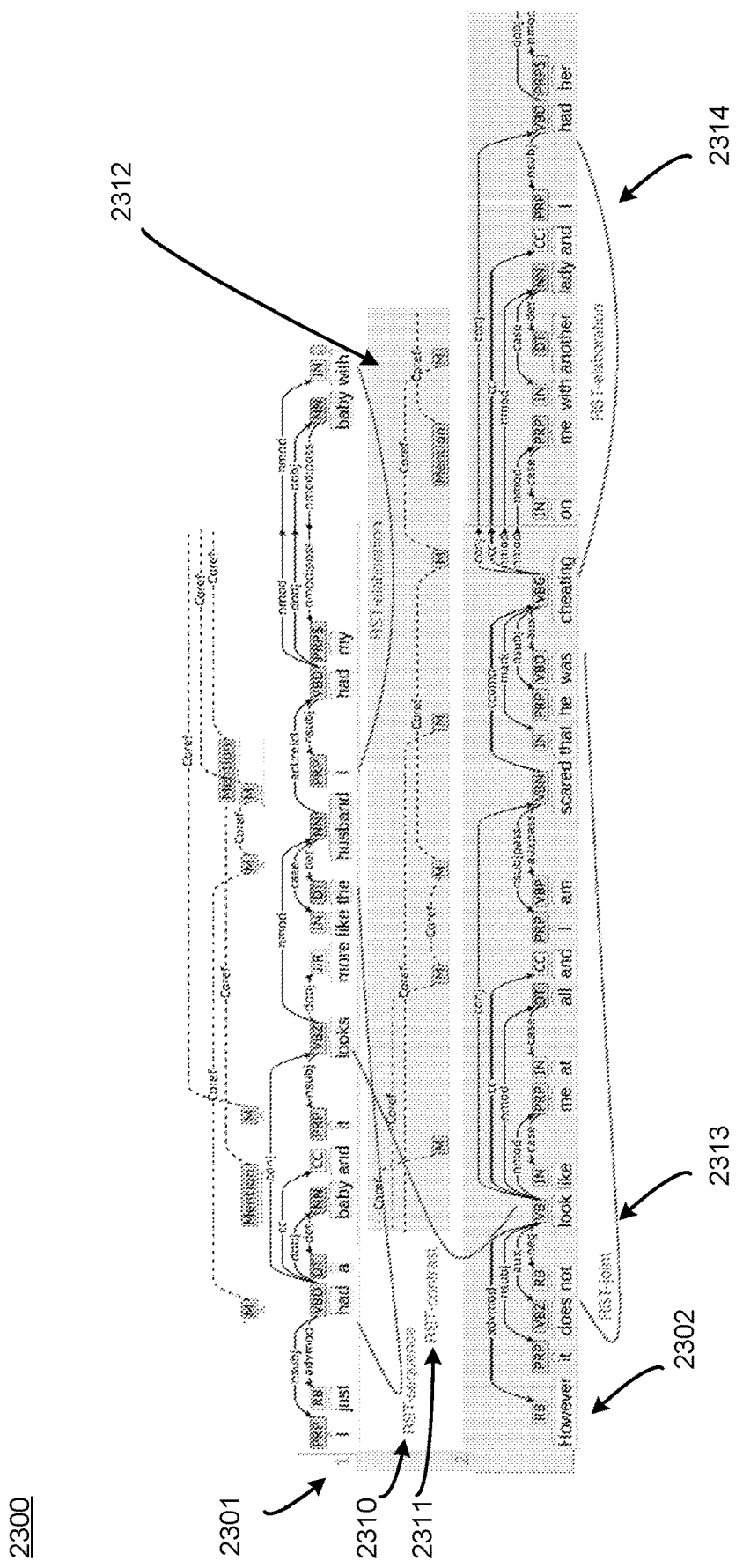
FIG. 23 illustrates an example of a linguistic representation of text in accordance with an aspect.

FIG. 23 illustrates an example of a linguistic representation of text in accordance with an aspect. FIG. 23 shows representation 2300, which includes sentences 2301 and 2302 and rhetoric relations 2310-2314. This text was derived from a web-based answer for a question that requires a complex response beyond "do this and do that" but rather demands a full recommendation with explanation: "I just had a baby and it looks more like the husband I had my baby with. However it does not look like me at all and I am scared that he was cheating on me with another lady and I had her kid." As can be seen, sentence 2301 is "I just had a baby and it looks more like the husband I had my baby with" and sentence 2302 is "However it does not look like me at all and I am scared that he was cheating on me with another lady and I had her kid."

As can be seen, FIG. 23 includes much richer information than just a combination of parse trees for individual sentences would. Navigation through this graph along the edges for syntactic relations as well as arcs for discourse relations allows to transform a given parse thicket into semantically equivalent forms to cover a broader spectrum of possibilities to express a request to explain. To form a complete formal representation of a paragraph, rhetoric classification application 102 uncovers as many links as possible. As can be seen, each of the discourse arcs produces a pair of thicket phrases that can be a potential match with an expression for explainability request.

A request for an explanation can be indicated in by a communicative discourse tree in several different ways such as by a question or by a statement. For example, an elaboration relation in a question indicates that the author is stating something (the nucleus) and is asking a question about a related topic (the satellite). As such, the author may not be particularly confident about his question. Consequently, rhetoric agreement application 102 can assume that the author has made a request for explanation and can then provide as much details as possible. A request for an explanation can also be indicated by a statement (as opposed to a question). Text that includes a rhetoric relation of "cause," "contrast," or "purpose," "antithesis," "concession," "evaluation," "evidence," "interpretation," "justification," "motivation," "non-volitional," or "volitional" may include a request for an explanation.

More specifically, the chain of rhetoric relations 2310-2314 includes RST-elaboration (default), RST-sequence and RST-contrast indicate that a question is not just enumeration of topics and constraints for an expected answer (that can be done by RST-elaboration only). Such a chain indicates that a conflict (an expression that something occurs in contrast to something else) is outlined in a question, so an answer should necessarily include an explanation.

At block 2201, process 2200 involves accessing text including fragments. Rhetoric classification application 102 can access text from different sources such as input text 130 or Internet-based sources such as chat, Twitter, etc. Text can consist of fragments, sentences, paragraphs, or longer amounts. For example, FIG. 23 comprises fragments (elementary discourse units) "I just had a baby," and "it looks more like the husband I had my baby with," and so on.

At block 2202, process 2200 involves creating a communicative discourse tree from the text. At block 2202, process 2200 performs substantially similar operations as in blocks 1501-1504 of process 1500. For example, rhetoric classification application 102 creates a discourse tree from the text and creates a communicative discourse tree from the discourse tree.

At block 2203, process 2200 involves determining whether the communicative discourse tree includes a request for an explanation by applying a classification model trained to detect a request for an explanation to the communicative discourse tree. As further discussed, a classification model such as rhetoric agreement classifier 120 can be trained to make such classifications. The classification model can use different learning approaches. For example, the classification model can use a support vector machine with tree kernel learning. Additionally, the classification model can use nearest neighbor learning of maximal common sub-trees. An exemplary process is described with respect to FIG. 25.

As an example, rhetoric classification application 102 can use machine learning to determine similarities between the communicative discourse tree identified at block 2203 and one or more communicative discourse trees from a training set of communicative discourse trees. The training set of communicative discourse trees can be provided to rhetoric agreement classifier 120 during a training process. The positive set includes communicative discourse trees representing text containing a request for an explanation and the negative set includes communicative discourse trees representing text without a request for an explanation.

Rhetoric agreement classifier 120 selects an additional communicative discourse tree from the one or more communicative discourse trees based on the additional communicative discourse tree having a highest number of similarities with the communicative discourse tree. Based on a similarity or difference between the communicative discourse tree and the additional communicative discourse tree, rhetoric agreement classifier 120 identifies whether the communicative discourse tree is from a positive set or a negative set by applying a classification model to the communicative discourse tree. Based on the similarity, rhetoric agreement classifier 120 determines whether the text contains a request for an explanation.

For example, if the communicative discourse tree and an additional communicative discourse tree in the positive set are above a threshold in similarity, then rhetoric agreement classifier 120 classifies the communicative discourse tree as positive and determines that the text includes a request for an explanation. Conversely, if the communicative discourse tree and an additional communicative discourse tree in the negative set are above a threshold in similarity, then rhetoric agreement classifier 120 classifies the communicative discourse tree as negative and determines that the text does not include a request for explanation.

Creating a Training Dataset and Training a Classification Model

Figure 24:
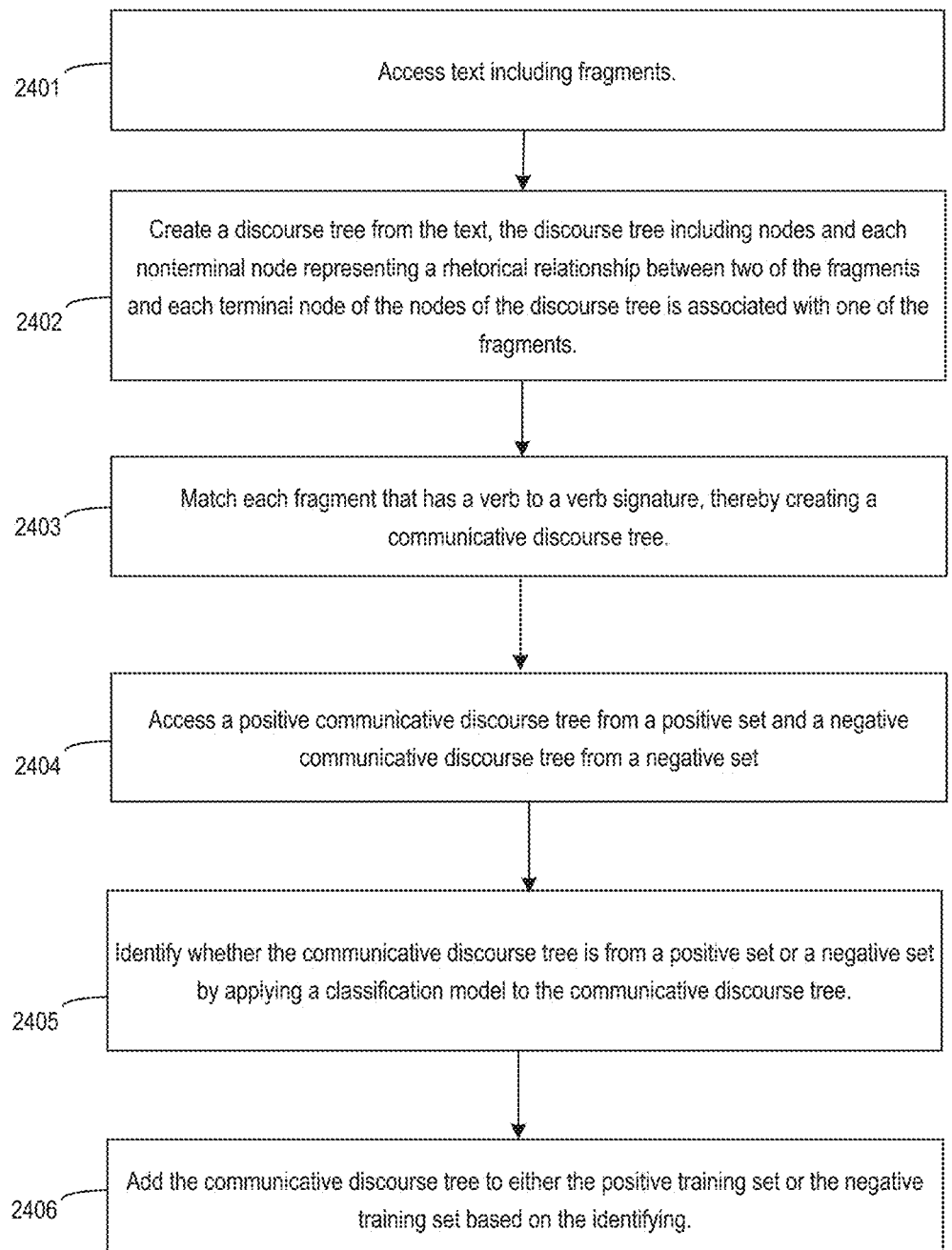
FIG. 24 illustrates an exemplary process used to generate training data to train a classification model to determine a presence of a request for explanation in text in accordance with an aspect.

FIG. 24 illustrates an exemplary process used to generate training data to train a classification model to determine a presence of a request for explanation in text in accordance with an aspect. Training can be based on the communicative discourse tree having a highest number of similarities with another communicative discourse tree. Each training data set includes a set of training pairs. Training data 125 includes communicative discourse trees that include a request for an explanation in a positive dataset and communicative discourse trees that do not a request for an explanation in a negative dataset.

For the positive dataset, various domains with distinct acceptance criteria are selected that indicate whether an answer or response is suitable for the question. For example, each training set can include a communicative discourse tree that represents a request for an explanation and another communicative discourse tree that a request for an explanation and expected level match between a candidate communicative discourse tree and each communicative discourse tree. Rhetoric classification application 102 identifies whether an additional communicative discourse tree generated from particular additional training data should be added to the positive set or negative set, thereby increasing the amount of training data available and the robustness of the classification model when trained with the training data.

At block 2401, method 2400 involves accessing text including fragments. Rhetoric classification application 102 accesses training data 125. At block 2401, rhetoric classification application 102 performs substantially similar operations as block 1501 of process 1500.

At block 2402, method 2400 involves creating a discourse tree from the text. At block 2402, rhetoric classification application 102 performs substantially similar operations as block 1502 of process 1500.

At block 2403, method 2400 involves matching each fragment that has a verb to a verb signature, thereby creating a communicative discourse tree. At block 2403, rhetoric classification application 102 performs substantially similar operations as block 1503 of process 1500.

At block 2404, method 2400 involves accessing a positive communicative discourse tree from a positive set and a negative communicative discourse tree from a negative set.

At block 2405, method 2400 involves identifying whether the communicative discourse tree is from a positive set or a negative set by applying rhetoric agreement classifier 120 to the communicative discourse tree. Rhetoric agreement classifier 120 determines similarities between the communicative discourse tree from communicative discourse trees with which the classifier was trained.

At block 2406, method 2400 involves adding the communicative discourse tree to either the positive training set or the negative training set based on the identifying, thereby increasing the training data set size.

Figure 25:
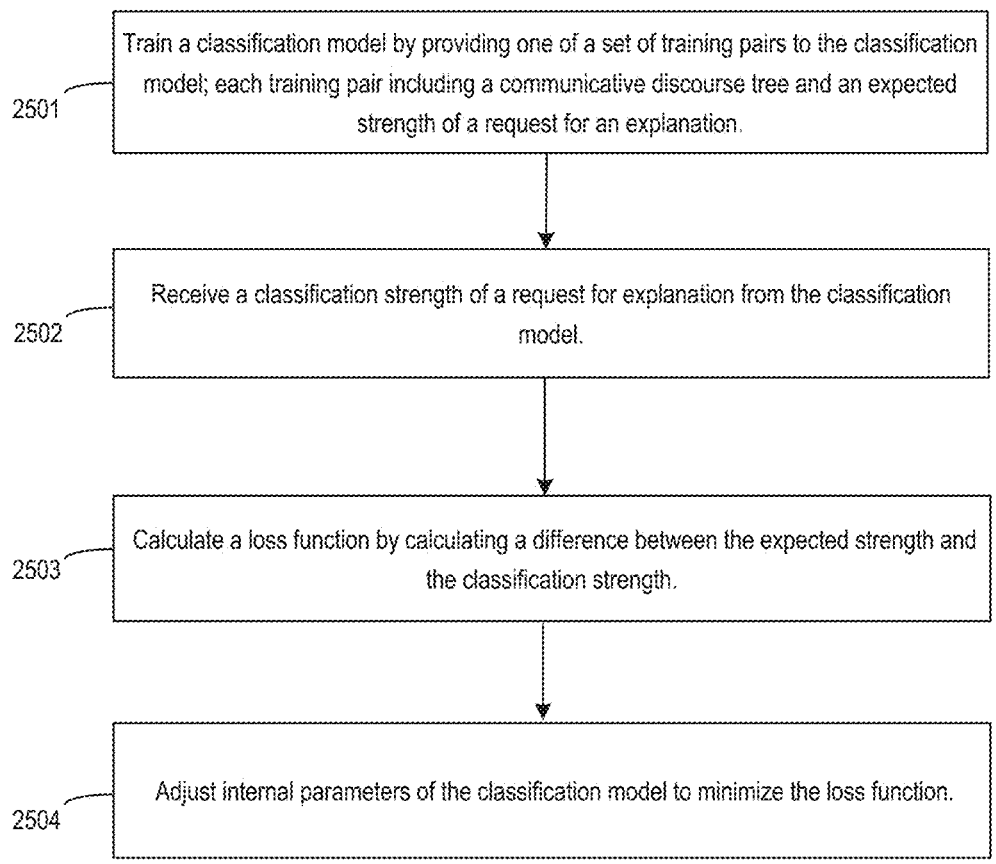
FIG. 25 illustrates an exemplary process used to train a classification model to determine a presence of a request for explanation in text in accordance with an aspect.

FIG. 25 illustrates an exemplary process used to train a classification model to determine a presence of a request for explanation in text in accordance with an aspect. In an aspect, rhetoric classification application 102 uses training data 125, e.g., generated by method 2400, to train rhetoric agreement classifier 120 to determine a presence of a request for an explanation. By using an iterative process, rhetoric classification application 102 provides a training pair to rhetoric agreement classifier 120 and receives, from the model, a level of complementarity. Acceptance criteria can vary by application. For example, acceptance criteria may be low for community question answering, automated question answering, automated and manual customer support systems, social network communications and writing by individuals such as consumers about their experience with products, such as reviews and complaints. RR acceptance criteria may be high in scientific texts, professional journalism, health and legal documents in the form of FAQ, professional social networks such as "stackoverflow."

At block 2501, method 2500 involves training the classification model by providing one of a set of training pairs to the classification model. Each training pair includes a communicative discourse tree and an expected strength of a request for an explanation. For example, a communicative discourse tree representing text that, based on the rhetoric relations in the communicative discourse tree, is very likely to include a request for an explanation may have a high expected strength.

At block 2502, method 2500 involves receiving a strength of a request for explanation from the classification model. A small or trivial difference between the expected strength and the classification strength indicates that the classification model is making good classifications. At blocks 2501-2502, rhetoric classification application 102 performs substantially similar operations as performed at block 2203 of process 2000.

At block 2503, method 2500 involves calculating a loss function by calculating a difference between the expected strength and the classification strength. The loss function is used to optimize or improve rhetoric agreement classifier 120. Rhetoric classification application 102 calculates a loss function by determining a difference between the determined level of complementarity and an expected level of complementarity for the particular training pair. In this manner, the loss function represents a difference between ideal and measured outputs of the classifier. With each iteration, the process improves the classifier.

At block 2504, method 2500 involves adjusting internal parameters of the classification model to minimize the loss function. Based on the loss function, rhetoric classification application 102 adjusts internal parameters of the classification model such that the loss function is minimized. The trained rhetoric agreement classifier 120 can be used in process 2200 to determine a request for explanation in text.

A Dataset for Tracking Explainability Intent

The purpose of this dataset is to obtain texts where authors do their best to bring their points across by employing all means to show that they (as customers) are right and their opponents (companies) are wrong (Galitsky et al 2009). Complainants are emotionally charged writers who describe problems they encountered with a financial service, lack of clarity and transparency as this problem was communicated with customer support personnel, and how they attempted to solve it. Raw complaints are collected for a number of banks submitted over last few years. Four hundred complaints are manually tagged with respect to perceived complaint validity, proper argumentation, detectable misrepresentation, and whether request for explanation concerning the company's decision occurred. Judging by complaints, most complainants are in genuine distress due to a strong deviation between what they expected from a service, what they received, how this deviation was explained and how the problem was communicated by a customer support. Most complaint authors report incompetence, flawed policies, ignorance, lack of common sense, inability to understand the reason behind the company's decision, indifference to customer needs and misrepresentation from the customer service personnel. The authors are frequently confused, looking for company's explanation, seeking recommendation from other users and advise others on avoiding particular financial service. The focus of a complaint is a proof that the proponent is right and her opponent is wrong, suggested explanation for why the company decides to act in a certain way, a resolution proposal and a desired outcome.

Multiple argumentation patterns are used in complaints. The most frequent is a deviation from what has happened from what was expected, according to common sense. This pattern covers both valid and invalid argumentation. The second in popularity argumentation patterns cites the difference between what has been promised (advertised, communicated) and what has been received or actually occurred. This pattern also mentions that the opponent does not play by the rules (valid pattern). A high number of complaints are explicitly saying that bank representatives are lying. Lying includes inconsistencies between the information provided by different bank agents, factual misrepresentation and careless promises (valid pattern).

Another reason complaints arise is due to rudeness of bank agents and customer service personnel. Customers cite rudeness in both cases, when the opponent point is valid or not (and complaint and argumentation validity is tagged accordingly). Even if there is neither financial loss or inconvenience the complainants disagree with everything a given bank does, if they been served rudely (invalid pattern).

Complainants cite their needs as reasons bank should behave in certain ways. A popular argument is that since the government via taxpayers bailed out the banks, they should now favor the customers (invalid pattern). Complaint authors reveal shady practice of banks during the financial crisis of 2007, such as manipulating an order of transactions to charge a highest possible amount of nonsufficient fund fees. Moreover, banks attempted to communicate this practice as a necessity to process a wide amount of checks. This is the most frequent topic of customer complaints, so one can track a manifold of argumentation patterns applied to this topic.

For most frequent topics of complaints such as insufficient funds fee or unexpected interest rate rise on a credit card, this dataset provides many distinct ways of argumentation that this fee is unfair. Therefore, this dataset allows for systematic exploration of the peculiar topic-independent clusters of argumentation patterns such as a request to explain why certain decision was made. Unlike professional writing in legal and political domains, authentic writing of complaining users have a simple motivational structure, a transparency of their purpose and occurs in a fixed domain and context. Arguments play a critical rule for the well-being of the authors, subject to an unfair charge of a large amount of money or eviction from home. Therefore, the authors attempt to provide as strong argumentation as possible to back up their claims and strengthen their case.

The tag in this dataset used in the current study, request for explanation, is related to the whole text of complaint, not a paragraph. Three annotators worked with this dataset, and inter-annotator agreement exceeds 80%.

Evaluation of Recognition Accuracy and Assessment of the Proportion of Request to Explain Once we developed our algorithm for explanation request detection, we want to train it, test it and verify how consistent its results are across the domains. We also test how recognition accuracy varies for cases of different complexity.

| Evidence | # | Criteria | P | R | F1 |
|---|---|---|---|---|---|
| Imperative expression with communicative action explain | 44 | Keywords: explain, clarify, make clear, why did they act-VP, why was it | 92 | 94 | 93.0 |
| Double, triple+ implicit mention | 67 | Multiple rhetoric relation of contrast, attribution, sequence, cause | 86 | 83 | 84.5 |
| Single implicit mention | 115 | A pair of rhetoric relation chains for contrast and cause | 76 | 80 | 77.9 |

Detection accuracy for explanation request for different types of evidence is shown in Table 1. We consider simpler cases where the detection occurs based on phrases, in the top row. Typical expressions here have an imperative form such as please explain/clarify/motivate/comment. Also, there are templates here such as you did this but I expected that . . . you told me this but I received that.

The middle row contains the data on higher evidence implicit explanation request case, where multiple fragments of DTs indicate the class. Finally, in the bottom row, we present the case of the lower confidence for a single occurrence of a DT associated with an explanation request. The second column shows the counts of complaints per case. The third column gives examples of expressions (which include keywords and phrase types) and rhetoric relations which serves as criteria for implicit explanation request. Fourth, fifth and sixth columns presents the detection rates where the complaints for a given case is mixed with a hundred of complaints without explanation request.

Recognition accuracies, bank-specific topics of complaints and an overall proportion of the complaints with explanation request are shown in Table 2. We used 200 complaints for each bank to assess the recognition accuracies for explanation request (ER). One can observe that 82±3% is a reasonable estimate for recognition accuracy for explanation request. The last column shows that taking into account <20% error rate in explanation request recognition, 25±4% is an adequate estimate of complaints requiring explainability in implicit or explicit form, given the set of 800 complaints.

| Source | # | Main topics of complaints | P | R | Fl | ER rate |
|---|---|---|---|---|---|---|
| Bank of America | 200 | NSF, credit card interest rate raise | 82 | 84 | 83.0 | 28.5 |
| Chase Bank | 200 | NSF, foreclosure, unexpected card cancellation | 80 | 82 | 81.0 | 25.8 |
| Citibank | 200 | Foreclosure, mortgage application, refinancing, | 79 | 83 | 81.0 | 23.8 |
| American Express | 200 | Card application, NSF, late payment | 83 | 82 | 82.5 | 27.0 |

Finally, we ran our explanation request detection engine against the set of 10000 complaints scraped from PlanetFeedback.com and observed that 27% of complainants require explainability from companies, being their customer. There is a single complaint per author and a number of exceptions is unnoticeable. The conclusion is that since almost a third of customers strongly demand and rely on explainability of the companies' decisions these customers are affected. Hence the companies need to employ ML algorithms with explainability feature.

This explainability feature is more important than the recognition accuracy for the customers, who understand that all businesses make errors. Typically, when a company makes a wrong decision via ML but then rectifies it efficiently, a complaint does not arise. The most important means for customer retention is then properly communicating with them both correct and possibly erroneous customer decisions (not quantitatively evaluated in this study).

Exemplary Computing Devices

Figure 26:
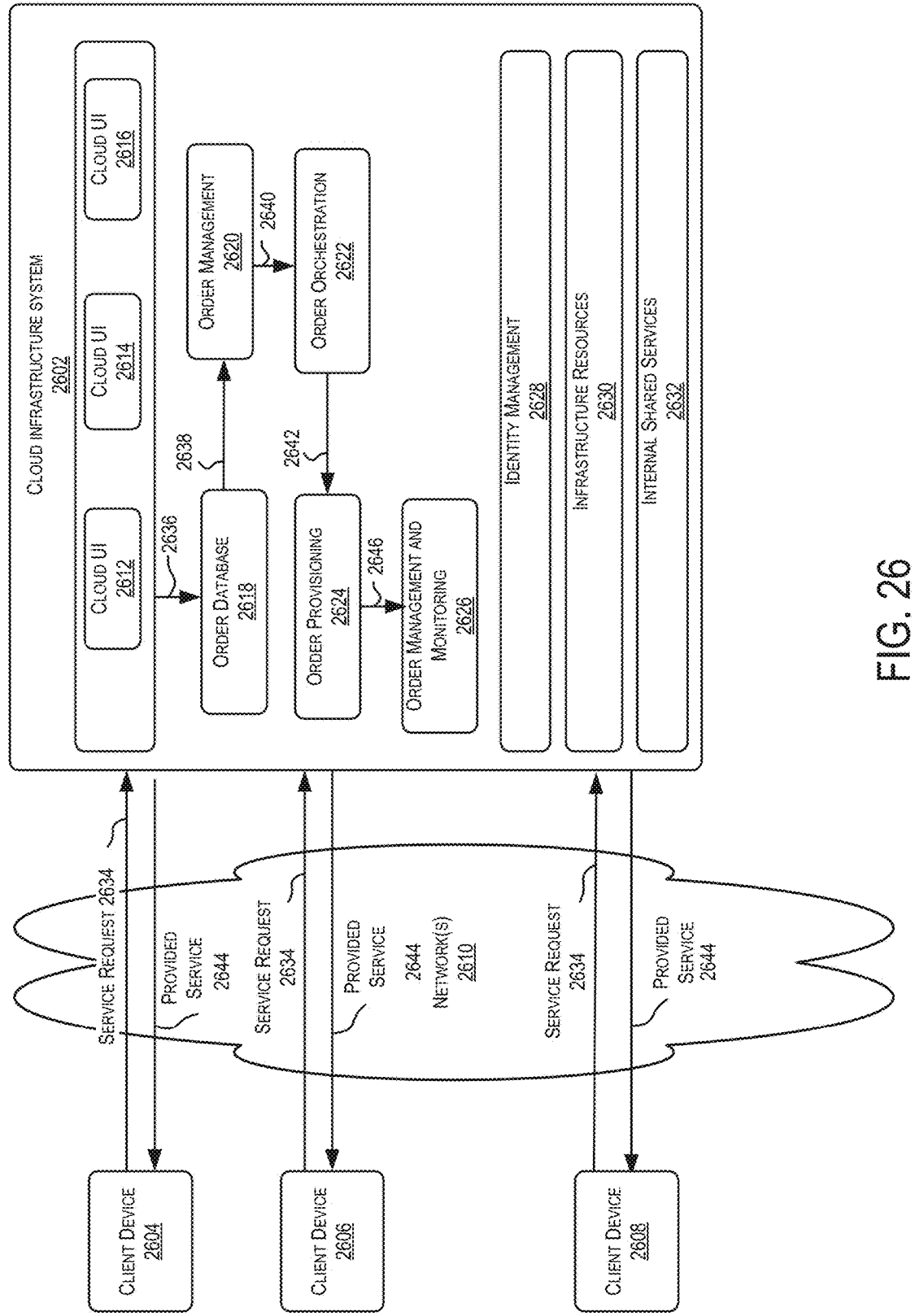
FIG. 26 depicts a simplified diagram of a distributed system for implementing one of the aspects.

FIG. 26 depicts a simplified diagram of a distributed system 2600 for implementing one of the aspects. In the illustrated aspect, distributed system 2600 includes one or more client computing devices 2602, 2604, 2606, and 2608, which are configured to execute and operate a client application such as a web browser, proprietary client (e.g., Oracle Forms), or the like over one or more network(s) 2610. Server 2612 may be communicatively coupled with remote client computing devices 2602, 2604, 2606, and 2608 via network 2610.

In various aspects, server 2612 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some aspects, these services may be offered as web-based or cloud services or under a Software as a Service (SaaS) model to the users of client computing devices 2602, 2604, 2606, and/or 2608. Users operating client computing devices 2602, 2604, 2606, and/or 2608 may in turn utilize one or more client applications to interact with server 2612 to utilize the services provided by these components.

In the configuration depicted in the figure, the software components 2618, 2620 and 2623 of system 2600 are shown as being implemented on server 812. In other aspects, one or more of the components of system 2600 and/or the services provided by these components may also be implemented by one or more of the client computing devices 2602, 2604, 2606, and/or 2608. Users operating the client computing devices may then utilize one or more client applications to use the services provided by these components. These components may be implemented in hardware, firmware, software, or combinations thereof. It should be appreciated that various different system configurations are possible, which may be different from distributed system 2600. The aspect shown in the figure is thus one example of a distributed system for implementing an aspect system and is not intended to be limiting.

Client computing devices 2602, 2604, 2606, and/or 2608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2602, 2604, 2606, and 2608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2610.

Although exemplary distributed system 2600 is shown with four client computing devices, any number of client computing devices may be supported. Other devices, such as devices with sensors, etc., may interact with server 2612.

Network(s) 2610 in distributed system 2600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2610 can be a local area network (LAN), such as one based on Ethernet, Token-Ring and/or the like. Network(s) 2610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.26 suite of protocols, Bluetooth®, and/or any other wireless protocol); and/or any combination of these and/or other networks.

Server 2612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2612 can include one or more virtual machines running virtual operating systems, or other computing architectures involving virtualization. One or more flexible pools of logical storage devices can be virtualized to maintain virtual storage devices for the server. Virtual networks can be controlled by server 2612 using software defined networking. In various aspects, server 2612 may be adapted to run one or more services or software applications described in the foregoing disclosure. For example, server 2612 may correspond to a server for performing processing described above according to an aspect of the present disclosure.

Server 2612 may run an operating system including any of those discussed above, as well as any commercially available server operating system. Server 2612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2612 may include one or more applications to analyze and consolidate data feeds and/or event updates received from users of client computing devices 2602, 2604, 2606, and 2608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2612 may also include one or more applications to display the data feeds and/or real-time events via one or more display devices of client computing devices 2602, 2604, 2606, and 2608.

Distributed system 2600 may also include one or more databases 2614 and 2616. Databases 2614 and 2616 may reside in a variety of locations. By way of example, one or more of databases 2614 and 2616 may reside on a non-transitory storage medium local to (and/or resident in) server 2612. Alternatively, databases 2614 and 2616 may be remote from server 2612 and in communication with server 2612 via a network-based or dedicated connection. In one set of aspects, databases 2614 and 2616 may reside in a storage-area network (SAN). Similarly, any necessary files for performing the functions attributed to server 2612 may be stored locally on server 2612 and/or remotely, as appropriate. In one set of aspects, databases 2614 and 2616 may include relational databases, such as databases provided by Oracle, that are adapted to store, update, and retrieve data in response to SQL-formatted commands.

Figure 27:
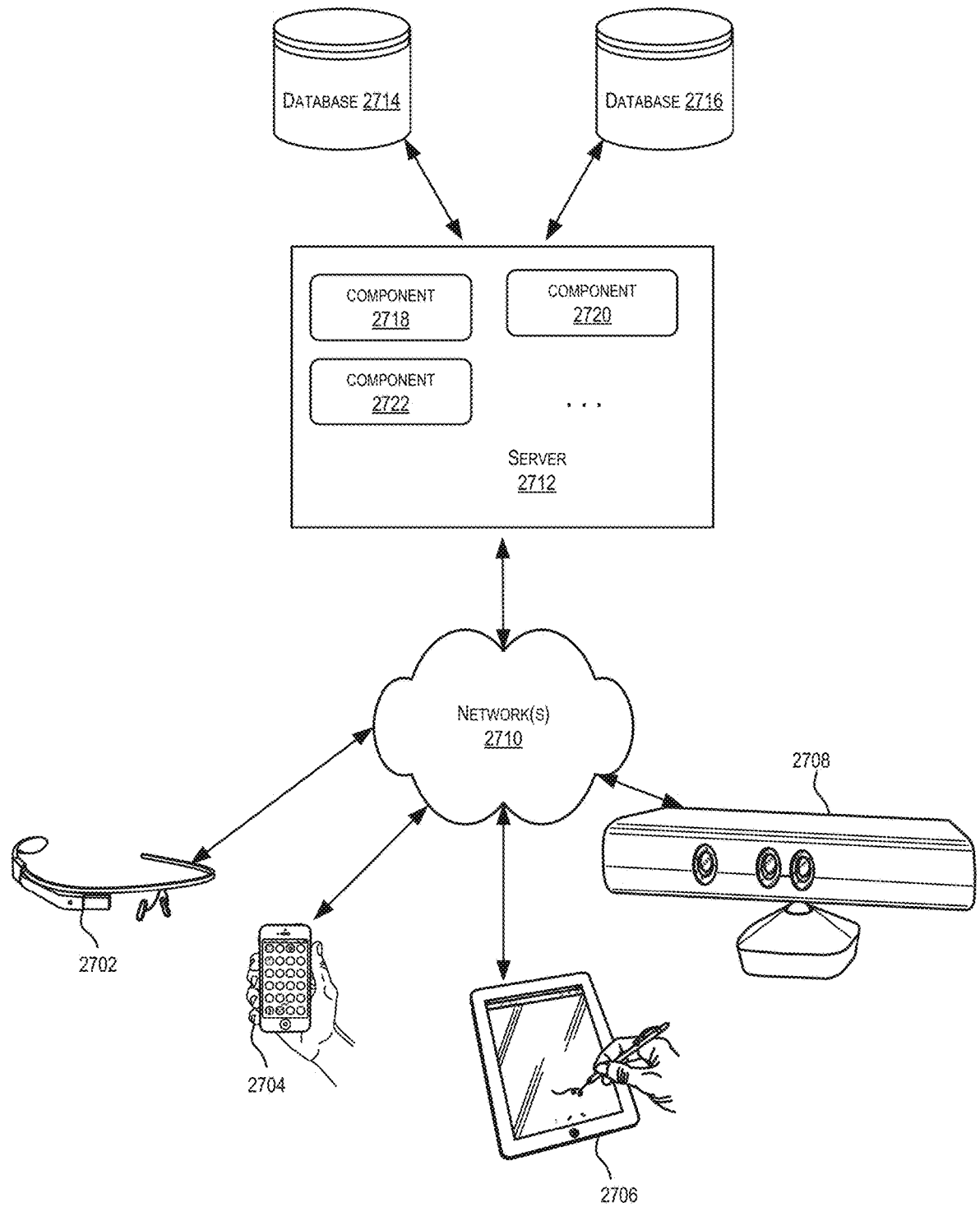
FIG. 27 is a simplified block diagram of components of a system environment by which services provided by the components of an aspect system may be offered as cloud services in accordance with an aspect.

FIG. 27 is a simplified block diagram of one or more components of a system environment 2700 by which services provided by one or more components of an aspect system may be offered as cloud services in accordance with an aspect of the present disclosure. In the illustrated aspect, system environment 2700 includes one or more client computing devices 2704, 2706, and 2708 that may be used by users to interact with a cloud infrastructure system 2702 that provides cloud services. The client computing devices may be configured to operate a client application such as a web browser, a proprietary client application (e.g., Oracle Forms), or some other application, which may be used by a user of the client computing device to interact with cloud infrastructure system 2702 to use services provided by cloud infrastructure system 2702.

It should be appreciated that cloud infrastructure system 2702 depicted in the figure may have other components than those depicted. Further, the aspect shown in the figure is only one example of a cloud infrastructure system that may incorporate an aspect of the invention. In some other aspects, cloud infrastructure system 2702 may have more or fewer components than shown in the figure, may combine two or more components, or may have a different configuration or arrangement of components.

Client computing devices 2704, 2706, and 2708 may be devices similar to those described above for 2602, 2604, 2606, and 2608.

Although exemplary system environment 2700 is shown with three client computing devices, any number of client computing devices may be supported. Other devices such as devices with sensors, etc. may interact with cloud infrastructure system 2602.

Network(s) 2710 may facilitate communications and exchange of data between clients 2704, 2706, and 2708 and cloud infrastructure system 2702. Each network may be any type of network familiar to those skilled in the art that can support data communications using any of a variety of commercially-available protocols, including those described above for network(s) 2710.

Cloud infrastructure system 2702 may comprise one or more computers and/or servers that may include those described above for server 2712.

In certain aspects, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain aspects, cloud infrastructure system 2702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an aspect to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various aspects, cloud infrastructure system 2702 may be adapted to automatically provision, manage and track a customer's subscription to services offered by cloud infrastructure system 2702. Cloud infrastructure system 2702 may provide the cloud services via different deployment models. For example, services may be provided under a public cloud model in which cloud infrastructure system 2702 is owned by an organization selling cloud services (e.g., owned by Oracle) and the services are made available to the general public or different industry enterprises. As another example, services may be provided under a private cloud model in which cloud infrastructure system 2702 is operated solely for a single organization and may provide services for one or more entities within the organization. The cloud services may also be provided under a community cloud model in which cloud infrastructure system 2702 and the services provided by cloud infrastructure system 2702 are shared by several organizations in a related community. The cloud services may also be provided under a hybrid cloud model, which is a combination of two or more different models.

In some aspects, the services provided by cloud infrastructure system 2702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2702. Cloud infrastructure system 2702 then performs processing to provide the services in the customer's subscription order.

In some aspects, the services provided by cloud infrastructure system 2702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some aspects, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some aspects, platform services provided by the cloud infrastructure system may include database cloud services, middleware cloud services (e.g., Oracle Fusion Middleware services), and Java cloud services. In one aspect, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain aspects, cloud infrastructure system 2702 may also include infrastructure resources 2730 for providing the resources used to provide various services to customers of the cloud infrastructure system. In one aspect, infrastructure resources 2730 may include pre-integrated and optimized combinations of hardware, such as servers, storage, and networking resources to execute the services provided by the PaaS platform and the SaaS platform.

In some aspects, resources in cloud infrastructure system 2702 may be shared by multiple users and dynamically re-allocated per demand. Additionally, resources may be allocated to users in different time zones. For example, cloud infrastructure system 2730 may enable a first set of users in a first time zone to utilize resources of the cloud infrastructure system for a specified number of hours and then enable the re-allocation of the same resources to another set of users located in a different time zone, thereby maximizing the utilization of resources.

In certain aspects, a number of internal shared services 2732 may be provided that are shared by different components or modules of cloud infrastructure system 2702 and by the services provided by cloud infrastructure system 2702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain aspects, cloud infrastructure system 2702 may provide comprehensive management of cloud services (e.g., SaaS, PaaS, and IaaS services) in the cloud infrastructure system. In one aspect, cloud management functionality may include capabilities for provisioning, managing and tracking a customer's subscription received by cloud infrastructure system 2702, and the like.

In one aspect, as depicted in the figure, cloud management functionality may be provided by one or more modules, such as an order management module 2620, an order orchestration module 2620, an order provisioning module 2624, an order management and monitoring module 2626, and an identity management module 2628. These modules may include or be provided using one or more computers and/or servers, which may be general purpose computers, specialized server computers, server farms, server clusters, or any other appropriate arrangement and/or combination.

In exemplary operation 2634, a customer using a client device, such as client device 2704, 2706 or 2708, may interact with cloud infrastructure system 2702 by requesting one or more services provided by cloud infrastructure system 2702 and placing an order for a subscription for one or more services offered by cloud infrastructure system 2702. In certain aspects, the customer may access a cloud User Interface (UI), cloud UI 2612, cloud UI 2614 and/or cloud UI 2616 and place a subscription order via these UIs. The order information received by cloud infrastructure system 2702 in response to the customer placing an order may include information identifying the customer and one or more services offered by the cloud infrastructure system 2702 that the customer intends to subscribe to.

After an order has been placed by the customer, the order information is received via the cloud UIs, 2727, 2714 and/or 2716.

At operation 2636, the order is stored in order database 2718. Order database 2618 can be one of several databases operated by cloud infrastructure system 2620 and operated in conjunction with other system elements.

At operation 2638, the order information is forwarded to an order management module 2620. In some instances, order management module 2620 may be configured to perform billing and accounting functions related to the order, such as verifying the order, and upon verification, booking the order.

At operation 2640, information regarding the order is communicated to an order orchestration module 2622. Order orchestration module 2622 may utilize the order information to orchestrate the provisioning of services and resources for the order placed by the customer. In some instances, order orchestration module 2622 may orchestrate the provisioning of resources to support the subscribed services using the services of order provisioning module 2624.

In certain aspects, order orchestration module 2622 enables the management of business processes associated with each order and applies business logic to determine whether an order should proceed to provisioning. At operation 2642, upon receiving an order for a new subscription, order orchestration module 2622 sends a request to order provisioning module 2624 to allocate resources and configure those resources needed to fulfill the subscription order. Order provisioning module 2624 enables the allocation of resources for the services ordered by the customer. Order provisioning module 2624 provides a level of abstraction between the cloud services provided by cloud infrastructure system 2600 and the physical implementation layer that is used to provision the resources for providing the requested services. Order orchestration module 2622 may thus be isolated from implementation details, such as whether or not services and resources are actually provisioned on the fly or pre-provisioned and only allocated/assigned upon request.

At operation 2642, once the services and resources are provisioned, a notification of the provided service may be sent to customers on client devices 2604, 2606 and/or 2608 by order provisioning module 2624 of cloud infrastructure system 2602.

At operation 2646, the customer's subscription order may be managed and tracked by an order management and monitoring module 2626. In some instances, order management and monitoring module 2626 may be configured to collect usage statistics for the services in the subscription order, such as the amount of storage used, the amount data transferred, the number of users, and the amount of system up time and system down time.

In certain aspects, cloud infrastructure system 2700 may include an identity management module 2628. Identity management module 2628 may be configured to provide identity services, such as access management and authorization services in cloud infrastructure system 2700. In some aspects, identity management module 2628 may control information about customers who wish to utilize the services provided by cloud infrastructure system 2702. Such information can include information that authenticates the identities of such customers and information that describes which actions those customers are authorized to perform relative to various system resources (e.g., files, directories, applications, communication ports, memory segments, etc.) Identity management module 2628 may also include the management of descriptive information about each customer and about how and by whom that descriptive information can be accessed and modified.

Figure 28:
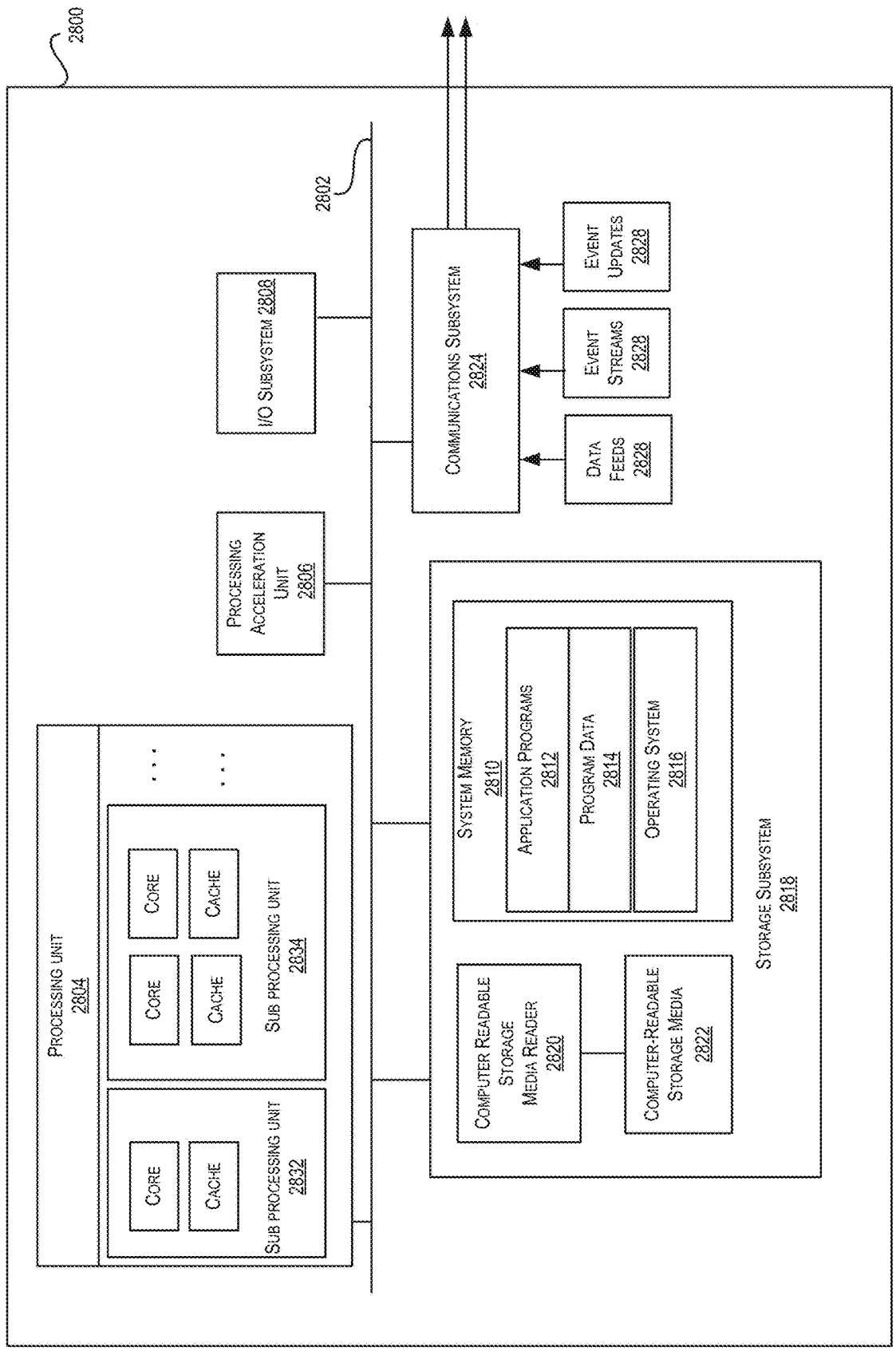
FIG. 28 illustrates an exemplary computer system, in which various aspects of the present invention may be implemented.

FIG. 28 illustrates an exemplary computer system 2800, in which various aspects of the present invention may be implemented. The system 2800 may be used to implement any of the computer systems described above. As shown in the figure, computer system 2800 includes a processing unit 2804 that communicates with a number of peripheral subsystems via a bus subsystem 2802. These peripheral subsystems may include a processing acceleration unit 2806, an I/O subsystem 2808, a storage subsystem 2818 and a communications subsystem 2825. Storage subsystem 2818 includes tangible computer-readable storage media 2823 and a system memory 2810.

Bus subsystem 2802 provides a mechanism for letting the various components and subsystems of computer system 2800 communicate with each other as intended. Although bus subsystem 2802 is shown schematically as a single bus, alternative aspects of the bus subsystem may utilize multiple buses. Bus subsystem 2802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P2886.1 standard.

Processing unit 2804, which can be implemented as one or more integrated circuits (e.g., a conventional microprocessor or microcontroller), controls the operation of computer system 2800. One or more processors may be included in processing unit 2804. These processors may include single core or multicore processors. In certain aspects, processing unit 2804 may be implemented as one or more independent processing units 2832 and/or 2834 with single or multicore processors included in each processing unit. In other aspects, processing unit 2804 may also be implemented as a quad-core processing unit formed by integrating two dual-core processors into a single chip.

In various aspects, processing unit 2804 can execute a variety of programs in response to program code and can maintain multiple concurrently executing programs or processes. At any given time, some or all of the program code to be executed can be resident in processing unit(s) 2804 and/or in storage subsystem 2818. Through suitable programming, processing unit(s) 2804 can provide various functionalities described above. Computer system 2800 may additionally include a processing acceleration unit 2806, which can include a digital signal processor (DSP), a special-purpose processor, and/or the like.

I/O subsystem 2808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 280 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2800 may comprise a storage subsystem 2818 that comprises software elements, shown as being currently located within a system memory 2810. System memory 2810 may store program instructions that are loadable and executable on processing unit 2804, as well as data generated during the execution of these programs.

Depending on the configuration and type of computer system 2800, system memory 2810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2804. In some implementations, system memory 2810 may include multiple different types of memory, such as static random access memory (SRAM) or dynamic random access memory (DRAM). In some implementations, a basic input/output system (BIOS), containing the basic routines that help to transfer information between elements within computer system 2800, such as during start-up, may typically be stored in the ROM. By way of example, and not limitation, system memory 2810 also illustrates application programs 2812, which may include client applications, Web browsers, mid-tier applications, relational database management systems (RDBMS), etc., program data 2814, and an operating system 2816. By way of example, operating system 2816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2818 may also provide a tangible computer-readable storage medium for storing the basic programming and data constructs that provide the functionality of some aspects. Software (programs, code modules, instructions) that when executed by a processor provide the functionality described above may be stored in storage subsystem 2818. These software modules or instructions may be executed by processing unit 2804. Storage subsystem 2818 may also provide a repository for storing data used in accordance with the present invention.

Storage subsystem 2800 may also include a computer-readable storage media reader 2820 that can further be connected to computer-readable storage media 2823. Together and, optionally, in combination with system memory 2810, computer-readable storage media 2823 may comprehensively represent remote, local, fixed, and/or removable storage devices plus storage media for temporarily and/or more permanently containing, storing, transmitting, and retrieving computer-readable information.

Computer-readable storage media 2823 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 2800.

By way of example, computer-readable storage media 2823 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2823 may include, but is not limited to, Zip® drives, flash memory cards, universal serial bus (USB) flash drives, secure digital (SD) cards, DVD disks, digital video tape, and the like. Computer-readable storage media 2823 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2800.

Communications subsystem 2825 provides an interface to other computer systems and networks. Communications subsystem 2825 serves as an interface for receiving data from and transmitting data to other systems from computer system 2800. For example, communications subsystem 2825 may enable computer system 2800 to connect to one or more devices via the Internet. In some aspects, communications subsystem 2825 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.28 family standards, or other mobile communication technologies, or any combination thereof), global positioning system (GPS) receiver components, and/or other components. In some aspects, communications subsystem 2825 can provide wired network connectivity (e.g., Ethernet) in addition to or instead of a wireless interface.

In some aspects, communications subsystem 2825 may also receive input communication in the form of structured and/or unstructured data feeds 2828, event streams 2828, event updates 2828, and the like on behalf of one or more users who may use computer system 2800.

By way of example, communications subsystem 2825 may be configured to receive unstructured data feeds 2828 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 2825 may also be configured to receive data in the form of continuous data streams, which may include event streams 2828 of real-time events and/or event updates 2828, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2825 may also be configured to output the structured and/or unstructured data feeds 2828, event streams 2828, event updates 2828, and the like to one or more databases that may be in communication with one or more streaming data source computers coupled to computer system 2800.

Computer system 2800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various aspects.

In the foregoing specification, aspects of the invention are described with reference to specific aspects thereof, but those skilled in the art will recognize that the invention is not limited thereto. Various features and aspects of the above-described invention may be used individually or jointly. Further, aspects can be utilized in any number of environments and applications beyond those described herein without departing from the broader spirit and scope of the specification. The specification and drawings are, accordingly, to be regarded as illustrative rather than restrictive.

What is claimed is:

1. A method for detecting a request for explanation in text, the method comprising:
   receiving, from a user device, text comprising fragments;
   creating a discourse tree from a subset of the text, wherein the discourse tree comprises a plurality of nodes, each nonterminal node representing a rhetorical relationship between two of the fragments and each terminal node of the nodes of the discourse tree associated with one of the fragments;
   forming a communicative discourse tree that represents the subset of the text by matching each fragment that has a verb to a verb signature;
   identifying that the subset of the text comprises a request for an explanation by applying a classification model trained to detect a request for an explanation to the communicative discourse tree; and
   adjusting a response based on the determined request for explanation and providing the adjusted response to the user device.

2. The method of claim 1, wherein the matching comprises:
accessing a plurality of verb signatures, wherein each verb signature comprises the verb of the respective fragment and a sequence of thematic roles, wherein thematic roles describe a relationship between the verb and related words;
determining, for each verb signature of the plurality of verb signatures, a plurality of thematic roles of the signature that matches a role of a word in a respective fragment;
selecting a particular verb signature from the plurality of verb signatures based on the particular verb signature comprising a highest number of matches; and
associating the particular verb signature with the fragment.

3. The method of claim 2, wherein each verb signature of the plurality of verb signatures comprises one of (i) an adverb, (ii) a noun phrase, or (iii) a noun, and wherein associating the particular verb signature with the fragment further comprises:
identifying each of a plurality of thematic roles in the particular verb signature; and
matching, for each of the plurality of thematic roles in the particular verb signature, a corresponding word in the fragment to the thematic role.

4. The method of claim 2, wherein (i) the classification model is a support vector machine with tree kernel learning or (ii) the classification model uses nearest neighbor learning of maximal common sub-trees.

5. The method of claim 1, wherein applying the classification model further comprises:
determining similarities between the communicative discourse tree and one or more communicative discourse trees from a training set of communicative discourse trees;
selecting an additional communicative discourse tree from the one or more communicative discourse trees based on the additional communicative discourse tree having a highest number of similarities with the communicative discourse tree;
identifying whether the communicative discourse tree is from a positive set of communicative discourse trees or a negative set of communicative discourse trees by applying a classification model to the communicative discourse tree, wherein the positive set of communicative discourse trees comprises communicative discourse trees representing text containing a request for an explanation and the negative set of communicative discourse trees comprises communicative discourse trees representing text without a request for an explanation; and
determining, based on the identifying, whether the text contains a request for an explanation.

6. The method of claim 1, wherein applying the classification model to the subset of the text further comprises:
determining similarities between the communicative discourse tree and one or more communicative discourse trees from a training set of communicative discourse trees;
selecting an additional communicative discourse tree from the one or more communicative discourse trees based on the additional communicative discourse tree having a highest number of similarities with the communicative discourse tree;
identifying whether the additional communicative discourse tree is from a positive set or a negative set, wherein the positive set is associated with text containing a request for explanation and the negative set is associated with text not containing a request for explanation; and
determining, based on the identifying, whether the text contains a request for explanation.

7. The method of claim 1, wherein the classification model is trained by iteratively:
providing one of a set of training pairs to the classification model, wherein each training pair comprises a communicative discourse tree and an expected strength of a request for an explanation;
receiving, from the classification model, a classification strength of a request for explanation;
calculating a loss function by calculating a difference between the expected strength and the classification strength; and
adjusting internal parameters of the classification model to minimize the loss function.

8. A method of building a training dataset comprising:
accessing text comprising fragments;
creating a discourse tree from the text, wherein the discourse tree comprises a plurality of nodes, each nonterminal node representing a rhetorical relationship between two of the fragments and each terminal node of the nodes of the discourse tree is associated with one of the fragments;
matching each fragment that has a verb to a verb signature, thereby forming a communicative discourse tree;
accessing a positive set of communicative discourse trees and a negative set of communicative discourse trees, wherein the positive set of communicative discourse trees comprises of communicative discourse trees representing represents text containing a request for an explanation and the negative set of communicative discourse trees comprises of communicative discourse trees representing represents text without a request for an explanation;
identifying whether the communicative discourse tree is from the positive set of communicative discourse trees or the negative set of communicative discourse trees by applying a classification model to the formed communicative discourse tree; and
adding the formed communicative discourse tree to either the positive set of communicative discourse trees or the negative set of communicative discourse trees based on the identifying.

9. The method of claim 8, wherein the matching comprises:
accessing a plurality of verb signatures, wherein each verb signature comprises the verb of the respective fragment and a sequence of thematic roles, wherein thematic roles describe a relationship between the verb and related words;
determining, for each verb signature of the plurality of verb signatures, a plurality of thematic roles of the signature that matches a role of a word in a respective fragment;
selecting a particular verb signature from the plurality of verb signatures based on the particular verb signature comprising a highest number of matches; and
associating the particular verb signature with the fragment.

10. The method of claim 8, further comprising training the classification model by iteratively:

providing one of a set of training pairs to the classification model, wherein each training pair comprises a communicative discourse tree and an expected strength of a request for an explanation;

receiving, from the classification model, a classification strength of a request for explanation;

calculating a loss function by calculating a difference between the expected strength and the classification strength; and adjusting internal parameters of the classification model to minimize the loss function.

11. The method of claim 10, further comprising:

accessing additional text from a user device;

forming a communicative discourse tree that represents the additional text; and identifying that additional text comprises a request for an explanation by applying the classification model to the communicative discourse tree.

12. The method of claim 8, wherein (i) the classification model is a support vector machine with tree kernel learning or (ii) the classification model uses nearest neighbor learning of maximal common sub-trees.

13. A system comprising:

a non-transitory computer-readable medium storing computer-executable program instructions; and a processing device communicatively coupled to the non-transitory computer-readable medium for executing the computer-executable program instructions and executing the computer-executable program instructions comprising:

accessing text comprising fragments;

creating a discourse tree from a subset of the text, wherein the discourse tree comprises a plurality of nodes, each nonterminal node representing a rhetorical relationship between two of the fragments and each terminal node of the nodes of the discourse tree associated with one of the fragments;

forming a communicative discourse tree that represents the subset of the text by matching each fragment that has a verb to a verb signature;

identifying that the subset of the text comprises a request for an explanation by applying a classification model trained to detect a request for an explanation to the communicative discourse tree;

adjusting a response based on the determined request for explanation; and providing the adjusted response to a user device.

14. The system of claim 13, wherein the matching comprises:

accessing a plurality of verb signatures, wherein each verb signature comprises the verb of the respective fragment and a sequence of thematic roles, wherein thematic roles describe a relationship between the verb and related words;

determining, for each verb signature of the plurality of verb signatures, a plurality of thematic roles of the signature that matches a role of a word in a respective fragment;

selecting a particular verb signature from the plurality of verb signatures based on the particular verb signature comprising a highest number of matches; and associating the particular verb signature with the fragment.

15. The system of claim 14, wherein each verb signature of the plurality of verb signatures comprises one of (i) an adverb, (ii) a noun phrase, or (iii) a noun, and wherein associating the particular verb signature with the fragment further comprises:

identifying each of a plurality of thematic roles in the particular verb signature; and matching, for each of the plurality of thematic roles in the particular verb signature, a corresponding word in the fragment to the thematic role.

16. The system of claim 13, wherein (i) the classification model is a support vector machine with tree kernel learning or (ii) the classification model uses nearest neighbor learning of maximal common sub-trees.

17. The system of claim 13, wherein applying the classification model further comprises:

determining similarities between the communicative discourse tree and one or more communicative discourse trees from a training set of communicative discourse trees;

selecting an additional communicative discourse tree from the one or more communicative discourse trees based on the additional communicative discourse tree having a highest number of similarities with the communicative discourse tree;

identifying whether the communicative discourse tree is from a positive set of communicative discourse trees or a negative set of communicative discourse trees by applying a classification model to the communicative discourse tree, wherein the positive set of communicative discourse trees comprises communicative discourse trees representing text containing a request for an explanation and the negative set of communicative discourse trees comprises communicative discourse trees representing text without a request for an explanation; and determining, based on the identifying, whether the text contains a request for an explanation.

18. The system of claim 13, wherein applying the classification model to the subset of the text further comprises:

determining similarities between the communicative discourse tree and one or more communicative discourse trees from a training set of communicative discourse trees;

selecting an additional communicative discourse tree from the one or more communicative discourse trees based on the additional communicative discourse tree having a highest number of similarities with the communicative discourse tree;

identifying whether the additional communicative discourse tree is from a positive set or a negative set, wherein the positive set is associated with text containing a request for explanation and the negative set is associated with text not containing a request for explanation; and determining, based on the identifying, whether the text contains a request for explanation.

* * * * *

UNITED STATES PATENT AND TRADEMARK OFFICE
CERTIFICATE OF CORRECTION

PATENT NO. : 10,949,623 B2  
APPLICATION NO. : 16/260930  
DATED : March 16, 2021  
INVENTOR(S) : Galitsky Page 1 of 3

It is certified that error appears in the above-identified patent and that said Letters Patent is hereby corrected as shown below:

On the Title Page

Please delete title page and replace with attached title page.

On page 2, Column 2, under Other Publications, Line 30, delete "/tenovoy-" and insert -- /tenevoy- --, therefor.

On page 3, Column 1, under Other Publications, Line 17, delete "NPL" and insert -- NLP --, therefor.

In the Drawings

On sheet 1 of 28, in FIG. 1, under Reference Numeral 120, Line 3, delete "Clasifier" and insert -- Classifier --, therefor.

On sheet 5 of 28, in FIG. 5, under Reference Numeral 502, Line 1, delete "Copr" and insert -- Corp --, therefor.

In the Specification

In Column 12, Line 20, delete "Slack,®" and insert -- Slack®, --, therefor.

In Column 20, Line 16, delete "a an" and insert -- an --, therefor.

In Columns 45-46, Lines 55-67 (Column 45) 1-6 (Column 46), below "contains a request for an explanation." delete "6. The method of claim 1, wherein applying the classification model to the subset of the text further comprises: determining similarities between the communicative discourse tree and one or more communicative discourse trees from a training set of communicative discourse trees; selecting an additional communicative discourse tree from the one or more communicative discourse trees based on the additional communicative discourse tree having a highest number of similarities with the communicative discourse tree; identifying whether the additional communicative Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office* discourse tree is from a positive set or a negative set, wherein the positive set is associated with text containing a request for explanation and the negative set is associated with text not containing a request for explanation; and determining, based on the identifying, whether the text contains a request for explanation.".

In Column 48, Lines 42-61, below "contains a request for an explanation." delete "18. The system of claim 13, wherein applying the classification model to the subset of the text further comprises: determining similarities between the communicative discourse tree and one or more communicative discourse trees from a training set of communicative discourse trees; selecting an additional communicative discourse tree from the one or more communicative discourse trees based on the additional communicative discourse tree having a highest number of similarities with the communicative discourse tree; identifying whether the additional communicative discourse tree is from a positive set or a negative set, wherein the positive set is associated with text containing a request for explanation and the negative set is associated with text not containing a request for explanation; and determining, based on the identifying, whether the text contains a request for explanation.".

(12) United States Patent
Galitsky

(10) Patent No.: US 10,949,623 B2
(45) Date of Patent: Mar. 16, 2021

(54) USING COMMUNICATIVE DISCOURSE TREES TO DETECT A REQUEST FOR AN EXPLANATION

(71) Applicant: Oracle International Corporation, Redwood Shores, CA (US)

(72) Inventor: Boris Galitsky, San Jose, CA (US)

(73) Assignee: Oracle International Corporation, Redwood Shores, CA (US)

(*) Notice: Subject to any disclaimer, the term of this patent is extended or adjusted under 35 U.S.C. 154(b) by 123 days.

(21) Appl. No.: 16/260,930

(22) Filed: Jan. 29, 2019

(65) Prior Publication Data
US 2019/0236134 A1   Aug. 1, 2019

Related U.S. Application Data

(60) Provisional application No. 62/646,711, filed on Mar. 22, 2018, provisional application No. 62/624,001, filed on Jan. 30, 2018.

(51) Int. Cl.
| | |
|---|---|
| *G06F 40/35* | (2020.01) |
| *G06F 16/35* | (2019.01) |
| *G06N 20/10* | (2019.01) |
| *G06F 40/131* | (2020.01) |

(52) U.S. Cl.
CPC ............. *G06F 40/35* (2020.01); *G06F 16/35* (2019.01); *G06F 40/131* (2020.01); *G06N 20/10* (2019.01)

(58) Field of Classification Search
None
See application file for complete search history.

(56) References Cited

U.S. PATENT DOCUMENTS

| | | |
|---|---|---|
| 5,495,605 A | 2/1996 | Cadot |
| 6,112,168 A | 8/2000 | Corston et al. |
| 6,181,909 B1 | 1/2001 | Burstein et al. |
| 6,731,307 B1 | 5/2004 | Strubbe et al. |
| 7,152,031 B1 | 12/2006 | Jensen et al. |
| 7,519,529 B1 | 4/2009 | Horvitz |

(Continued)

FOREIGN PATENT DOCUMENTS

WO   2015089822   6/2015

OTHER PUBLICATIONS

U.S. Appl. No. 15/975,683, "Non-Final Office Action", dated Mar. 19, 2020, 16 pages.

(Continued)

*Primary Examiner* — Stella L. Woo
(74) *Attorney, Agent, or Firm* — Kilpatrick Townsend & Stockton LLP

(57) ABSTRACT

Systems, devices, and methods of the present invention relate to detecting a request for explanation in text. In an example, a method creates a discourse tree from a subset of text. The discourse tree includes nodes, each nonterminal node representing a rhetorical relationship between two of the fragments and each terminal node of the nodes of the discourse tree is associated with one of the fragments. The method forms a communicative discourse tree from the discourse tree by matching each fragment that has a verb to a verb signature. The method further identifies that the subset of text comprises a request for an explanation by applying a classification model trained to detect a request for an explanation to the communicative discourse tree.

16 Claims, 28 Drawing Sheets